United States Patent
Griffith et al.

(10) Patent No.: US 11,042,548 B2
(45) Date of Patent: Jun. 22, 2021

(54) AGGREGATION OF ANCILLARY DATA ASSOCIATED WITH SOURCE DATA IN A SYSTEM OF NETWORKED COLLABORATIVE DATASETS

(71) Applicants: David Lee Griffith, Austin, TX (US); Bryon Kristen Jacob, Austin, TX (US); Shad William Reynolds, Austin, TX (US)

(72) Inventors: David Lee Griffith, Austin, TX (US); Bryon Kristen Jacob, Austin, TX (US); Shad William Reynolds, Austin, TX (US)

(73) Assignee: data world, Inc., Austin, TX (US)

( * ) Notice: Subject to any disclaimer, the term of this patent is extended or adjusted under 35 U.S.C. 154(b) by 437 days.

(21) Appl. No.: 15/927,006

(22) Filed: Mar. 20, 2018

(65) Prior Publication Data

US 2019/0034491 A1    Jan. 31, 2019

Related U.S. Application Data

(63) Continuation-in-part of application No. 15/186,514, filed on Jun. 19, 2016, now Pat. No. 10,102,258, and
(Continued)

(51) Int. Cl.
  *G06F 16/2455* (2019.01)
  *G06F 16/23* (2019.01)
  *G06F 16/25* (2019.01)

(52) U.S. Cl.
  CPC .... *G06F 16/24553* (2019.01); *G06F 16/2379* (2019.01); *G06F 16/256* (2019.01); *G06F 16/258* (2019.01)

(58) Field of Classification Search
  None
  See application file for complete search history.

(56) References Cited

U.S. PATENT DOCUMENTS 6,144,962 A    11/2000   Weinberg et al.
6,317,752 B1   11/2001   Lee et al.
(Continued)

FOREIGN PATENT DOCUMENTS

CA    2820994 A1    1/2014
CN   103425734 B    6/2017
(Continued)

OTHER PUBLICATIONS

Boutros et al., "Computerized Tools to Develop and Manage Data-Driven Projects Collaboratively via a Networked Computing Platform and Collaborative Datasets," U.S. Appl. No. 15/985,702, filed May 22, 2018.
(Continued)

*Primary Examiner* — Kim T Nguyen
(74) *Attorney, Agent, or Firm* — Kokka & Backus, PC

(57) ABSTRACT

Various embodiments relate generally to data science and data analysis, computer software and systems, and, more specifically, to a computing and data storage platform that facilitates consolidation of one or more datasets, whereby logic is configured to remediate anomalies in a data set originating in a first format prior to enrichment and conversion into a second format that facilitates forming collaborative dataset and, for example, interrelations among a system of networked collaborative datasets, whereby, at least in some implementations, data interrelations between different formats may be disposed in one or more data layers (e.g., layered data files and/or data arrangements). In some examples, a method may converting a dataset from a data format at a format converter to form an atomized dataset in a graph data arrangement, the atomized dataset being a collaborative dataset including atomized descriptor data and atomized source data.

16 Claims, 36 Drawing Sheets

Related U.S. Application Data a continuation-in-part of application No. 15/186,516, filed on Jun. 19, 2016, now Pat. No. 10,452,677, and a continuation-in-part of application No. 15/454,923, filed on Mar. 9, 2017, now Pat. No. 10,353,911.

(56) References Cited

U.S. PATENT DOCUMENTS

| | | |
|---|---|---|
| 6,529,909 B1 | 3/2003 | Bowman-Amuah |
| 6,768,986 B2 | 7/2004 | Cras et al. |
| 6,961,728 B2 | 11/2005 | Wynblatt et al. |
| 7,080,090 B2 | 7/2006 | Shah et al. |
| 7,146,375 B2 | 12/2006 | Egilsson et al. |
| 7,680,862 B2 | 3/2010 | Chong et al. |
| 7,761,407 B1 | 7/2010 | Stern |
| 7,836,063 B2 | 11/2010 | Salazar et al. |
| 7,853,081 B2 | 12/2010 | Thint |
| 7,856,416 B2 | 12/2010 | Hoffman et al. |
| 7,877,350 B2 | 1/2011 | Stanfill et al. |
| 7,953,695 B2 | 5/2011 | Roller et al. |
| 7,987,179 B2 | 7/2011 | Ma et al. |
| 8,037,108 B1 | 10/2011 | Chang |
| 8,060,472 B2 | 11/2011 | Itai et al. |
| 8,099,382 B2 | 1/2012 | Liu et al. |
| 8,170,981 B1 | 5/2012 | Tewksbary |
| 8,275,784 B2 | 9/2012 | Cao et al. |
| 8,296,200 B2 | 10/2012 | Mangipudi et al. |
| 8,312,389 B2 | 11/2012 | Crawford et al. |
| 8,429,179 B1 | 4/2013 | Mirhaji |
| 8,521,565 B2 | 8/2013 | Faulkner et al. |
| 8,538,985 B2 | 9/2013 | Betawadkar-Norwood et al. |
| 8,583,631 B1 | 11/2013 | Ganapathi et al. |
| 8,616,443 B2 | 12/2013 | Butt et al. |
| 8,640,056 B2 | 1/2014 | Helfman et al. |
| 8,719,252 B2 | 5/2014 | Miranker et al. |
| 8,762,160 B2 | 6/2014 | Lulla |
| 8,799,240 B2 | 8/2014 | Stowe et al. |
| 8,831,070 B2 | 9/2014 | Huang et al. |
| 8,843,502 B2 | 9/2014 | Elson et al. |
| 8,856,643 B2 | 10/2014 | Drieschner |
| 8,892,513 B2 | 11/2014 | Forsythe |
| 8,935,272 B2 | 1/2015 | Ganti et al. |
| 8,943,313 B2 | 1/2015 | Glew et al. |
| 8,965,915 B2 | 2/2015 | Ganti et al. |
| 8,990,236 B2 | 3/2015 | Mizrahy et al. |
| 8,996,559 B2 | 3/2015 | Ganti et al. |
| 9,002,860 B1 | 4/2015 | Ghemawat |
| 9,218,365 B2 | 12/2015 | Irani et al. |
| 9,244,952 B2 | 1/2016 | Ganti et al. |
| 9,396,283 B2 | 7/2016 | Miranker et al. |
| 9,495,429 B2 | 11/2016 | Miranker |
| 9,560,026 B1 | 1/2017 | Worsley |
| 9,607,042 B2 | 3/2017 | Long |
| 9,613,152 B2 | 4/2017 | Kucera |
| 9,659,081 B1 | 5/2017 | Ghodsi et al. |
| 9,690,792 B2 | 6/2017 | Bartlett et al. |
| 9,696,981 B2 | 7/2017 | Martin et al. |
| 9,710,526 B2 | 7/2017 | Couris et al. |
| 9,710,568 B2 | 7/2017 | Srinivasan et al. |
| 9,720,958 B2 | 8/2017 | Bagehorn et al. |
| 9,760,602 B1 | 9/2017 | Ghodsi et al. |
| 9,769,032 B1 | 9/2017 | Ghodsi et al. |
| 9,798,737 B2 | 10/2017 | Palmer |
| 9,836,302 B1 | 12/2017 | Hunter et al. |
| 9,959,337 B2 | 5/2018 | Ghodsi et al. |
| 9,990,230 B1 | 6/2018 | Stoica et al. |
| 10,095,735 B2 | 10/2018 | Ghodsi et al. |
| 10,102,258 B2 | 10/2018 | Jacob et al. |
| 10,176,234 B2 * | 1/2019 | Gould ............ G06F 16/176 |
| 10,216,860 B2 | 2/2019 | Miranker et al. |
| 10,248,297 B2 | 4/2019 | Beechuk et al. |
| 10,296,329 B2 | 5/2019 | Hunter et al. |
| 10,324,925 B2 | 6/2019 | Jacob et al. |
| 10,346,429 B2 | 7/2019 | Jacob et al. |
| 10,353,911 B2 | 7/2019 | Reynolds et al. |
| 10,361,928 B2 | 7/2019 | Ghodsi et al. |
| 10,438,013 B2 | 10/2019 | Jacob et al. |
| 10,452,677 B2 | 10/2019 | Jacob et al. |
| 10,452,975 B2 | 10/2019 | Jacob et al. |
| 10,474,501 B2 | 11/2019 | Ghodsi et al. |
| 10,474,736 B1 | 11/2019 | Stoica et al. |
| 10,545,986 B2 | 1/2020 | Tappan et al. |
| 10,546,001 B1 | 1/2020 | Nguyen et al. |
| 10,558,664 B2 | 2/2020 | Armbrust et al. |
| 10,606,675 B1 | 3/2020 | Luszczak et al. |
| 10,645,548 B2 | 5/2020 | Reynolds et al. |
| 10,664,509 B1 | 5/2020 | Reeves et al. |
| 10,673,887 B2 | 6/2020 | Crabtree et al. |
| 10,678,536 B2 | 6/2020 | Hunter et al. |
| 10,691,299 B2 | 6/2020 | Broek et al. |
| 10,691,433 B2 | 6/2020 | Shankar et al. |
| 10,769,130 B1 | 9/2020 | Armbrust et al. |
| 10,769,535 B2 * | 9/2020 | Lindsley ............ G06F 16/90335 |
| 10,810,051 B1 | 10/2020 | Shankar et al. |
| 2002/0133476 A1 | 9/2002 | Reinhardt |
| 2002/0143755 A1 | 10/2002 | Wynblatt et al. |
| 2003/0093597 A1 | 5/2003 | Marshak et al. |
| 2003/0120681 A1 | 6/2003 | Baclawski |
| 2003/0208506 A1 | 11/2003 | Greenfield et al. |
| 2004/0064456 A1 | 4/2004 | Fong et al. |
| 2005/0004888 A1 | 1/2005 | McCrady et al. |
| 2005/0010550 A1 | 1/2005 | Potter et al. |
| 2005/0010566 A1 | 1/2005 | Cushing et al. |
| 2005/0234957 A1 | 10/2005 | Olson et al. |
| 2005/0246357 A1 | 11/2005 | Geary et al. |
| 2005/0278139 A1 | 12/2005 | Glaenzer et al. |
| 2006/0100995 A1 | 5/2006 | Albomoz et al. |
| 2006/0129605 A1 | 6/2006 | Doshi |
| 2006/0161545 A1 | 7/2006 | Pura |
| 2006/0168002 A1 | 7/2006 | Chesley |
| 2006/0218024 A1 | 9/2006 | Lulla |
| 2006/0235837 A1 | 10/2006 | Chong et al. |
| 2007/0027904 A1 | 2/2007 | Chow et al. |
| 2007/0139227 A1 | 6/2007 | Speirs et al. |
| 2007/0179760 A1 | 8/2007 | Smith |
| 2007/0203933 A1 | 8/2007 | Iversen et al. |
| 2007/0271604 A1 | 11/2007 | Webster et al. |
| 2007/0276875 A1 | 11/2007 | Brunswig et al. |
| 2008/0046427 A1 | 2/2008 | Lee et al. |
| 2008/0091634 A1 | 4/2008 | Seeman |
| 2008/0162550 A1 | 7/2008 | Fey |
| 2008/0162999 A1 | 7/2008 | Schlueter et al. |
| 2008/0216060 A1 | 9/2008 | Vargas |
| 2008/0240566 A1 | 10/2008 | Thint |
| 2008/0256026 A1 | 10/2008 | Hays |
| 2008/0294996 A1 | 11/2008 | Hunt et al. |
| 2008/0319829 A1 | 12/2008 | Hunt et al. |
| 2009/0006156 A1 | 1/2009 | Hunt et al. |
| 2009/0013281 A1 | 1/2009 | Helfman et al. |
| 2009/0018996 A1 | 1/2009 | Hunt et al. |
| 2009/0064053 A1 | 3/2009 | Crawford et al. |
| 2009/0106734 A1 | 4/2009 | Riesen et al. |
| 2009/0119254 A1 | 5/2009 | Cross et al. |
| 2009/0132474 A1 | 5/2009 | Ma et al. |
| 2009/0132503 A1 | 5/2009 | Sun et al. |
| 2009/0138437 A1 | 5/2009 | Krishnamoorthy et al. |
| 2009/0150313 A1 | 6/2009 | Heilper et al. |
| 2009/0157630 A1 | 6/2009 | Yuan |
| 2009/0182710 A1 | 7/2009 | Short et al. |
| 2009/0198693 A1 | 8/2009 | Pura |
| 2009/0234799 A1 | 9/2009 | Betawadkar-Norwood et al. |
| 2009/0300054 A1 | 12/2009 | Fisher et al. |
| 2010/0114885 A1 | 5/2010 | Bowers et al. |
| 2010/0138388 A1 | 6/2010 | Wakeling et al. |
| 2010/0235384 A1 | 9/2010 | Itai et al. |
| 2010/0241644 A1 | 9/2010 | Jackson et al. |
| 2010/0250576 A1 | 9/2010 | Bowers et al. |
| 2010/0250577 A1 | 9/2010 | Cao et al. |
| 2010/0268722 A1 | 10/2010 | Yalamanchi et al. |
| 2010/0332453 A1 | 12/2010 | Prahlad et al. |
| 2011/0153047 A1 | 6/2011 | Cameron et al. |
| 2011/0202560 A1 | 8/2011 | Bowers et al. |
| 2011/0298804 A1 | 12/2011 | Hao et al. |
| 2012/0016895 A1 | 1/2012 | Butt et al. |

(56) References Cited

U.S. PATENT DOCUMENTS

| | | |
|---|---|---|
| 2012/0036162 A1 | 2/2012 | Gimbel |
| 2012/0102022 A1 | 4/2012 | Miranker et al. |
| 2012/0154633 A1 | 6/2012 | Rodriguez |
| 2012/0179644 A1 | 7/2012 | Miranker |
| 2012/0254192 A1 | 10/2012 | Gelbard |
| 2012/0278902 A1 | 11/2012 | Martin et al. |
| 2012/0284301 A1 | 11/2012 | Mizrahy et al. |
| 2012/0310674 A1 | 12/2012 | Faulkner et al. |
| 2012/0330908 A1 | 12/2012 | Stowe et al. |
| 2012/0330979 A1 | 12/2012 | Elson et al. |
| 2013/0031208 A1 | 1/2013 | Linton et al. |
| 2013/0031364 A1 | 1/2013 | Glew et al. |
| 2013/0041893 A1 | 2/2013 | Strike |
| 2013/0054517 A1 | 2/2013 | Beechuk et al. |
| 2013/0110775 A1 | 5/2013 | Forsythe |
| 2013/0114645 A1 | 5/2013 | Huang et al. |
| 2013/0138681 A1 | 5/2013 | Abrams et al. |
| 2013/0156348 A1 | 6/2013 | Irani et al. |
| 2013/0238667 A1 | 9/2013 | Carvalho et al. |
| 2013/0262443 A1 | 10/2013 | Leida et al. |
| 2013/0263019 A1 | 10/2013 | Castellanos et al. |
| 2013/0321458 A1 | 12/2013 | Miserendino et al. |
| 2014/0006448 A1 | 1/2014 | McCall |
| 2014/0019426 A1 | 1/2014 | Palmer |
| 2014/0067762 A1 | 3/2014 | Carvalho |
| 2014/0115013 A1 | 4/2014 | Anderson |
| 2014/0198097 A1 | 7/2014 | Evans |
| 2014/0214857 A1 | 7/2014 | Srinivasan et al. |
| 2014/0229869 A1 | 8/2014 | Chiantera et al. |
| 2014/0244623 A1 | 8/2014 | King |
| 2014/0279640 A1 | 9/2014 | Moreno et al. |
| 2014/0279845 A1 | 9/2014 | Ganti et al. |
| 2014/0280067 A1 | 9/2014 | Ganti et al. |
| 2014/0280286 A1 | 9/2014 | Ganti et al. |
| 2014/0280287 A1 | 9/2014 | Ganti et al. |
| 2014/0337331 A1 | 11/2014 | Hassanzadeh et al. |
| 2014/0337436 A1 | 11/2014 | Hoagland et al. |
| 2014/0372434 A1 | 12/2014 | Smith et al. |
| 2015/0052125 A1 | 2/2015 | Ellis et al. |
| 2015/0081666 A1 | 3/2015 | Long |
| 2015/0095391 A1 | 4/2015 | Gajjar et al. |
| 2015/0120643 A1 | 4/2015 | Dantressangle et al. |
| 2015/0142829 A1 | 5/2015 | Lee et al. |
| 2015/0143248 A1 | 5/2015 | Beechuk et al. |
| 2015/0149879 A1 | 5/2015 | Miller et al. |
| 2015/0186653 A1 | 7/2015 | Gkoulalas-Divanis et al. |
| 2015/0213109 A1 | 7/2015 | Kassko et al. |
| 2015/0234884 A1 | 8/2015 | Henriksen |
| 2015/0242867 A1 | 8/2015 | Prendergast et al. |
| 2015/0269223 A1 | 9/2015 | Miranker et al. |
| 2015/0277725 A1* | 10/2015 | Masterson .......... G06F 3/04842 715/753 |
| 2015/0278273 A1 | 10/2015 | Wigington et al. |
| 2015/0356144 A1* | 12/2015 | Chawla ............... G06F 16/2465 707/741 |
| 2015/0372915 A1 | 12/2015 | Shen et al. |
| 2015/0379079 A1 | 12/2015 | Kota |
| 2016/0019091 A1* | 1/2016 | Leber .................. G06F 11/3024 718/106 |
| 2016/0055184 A1 | 2/2016 | Fokoue-Nkoutche et al. |
| 2016/0055261 A1 | 2/2016 | Reinhardt et al. |
| 2016/0063017 A1 | 3/2016 | Bartlett et al. |
| 2016/0063271 A1 | 3/2016 | Bartlett et al. |
| 2016/0092090 A1 | 3/2016 | Stojanovic et al. |
| 2016/0092474 A1 | 3/2016 | Stojanovic et al. |
| 2016/0092475 A1 | 3/2016 | Stojanovic et al. |
| 2016/0098418 A1 | 4/2016 | Dakshinamurthy et al. |
| 2016/0100009 A1* | 4/2016 | Zoldi .................... H04L 43/045 709/213 |
| 2016/0117362 A1 | 4/2016 | Bagehorn et al. |
| 2016/0132572 A1 | 5/2016 | Chang et al. |
| 2016/0132787 A1* | 5/2016 | Drevo ................... G06N 20/10 706/12 |
| 2016/0147837 A1 | 5/2016 | Nguyen et al. |
| 2016/0171380 A1* | 6/2016 | Kennel ................. G06N 7/005 706/12 |
| 2016/0203196 A1 | 7/2016 | Schnall-Levin et al. |
| 2016/0232457 A1 | 8/2016 | Gray et al. |
| 2016/0275204 A1 | 9/2016 | Miranker et al. |
| 2016/0283551 A1 | 9/2016 | Fokoue-Nkoutche et al. |
| 2016/0292206 A1 | 10/2016 | Velazquez et al. |
| 2016/0314143 A1 | 10/2016 | Hiroshige |
| 2016/0321316 A1 | 11/2016 | Pennefather et al. |
| 2016/0322082 A1 | 11/2016 | Davis et al. |
| 2016/0371288 A1 | 12/2016 | Biannic et al. |
| 2016/0371355 A1 | 12/2016 | Massari et al. |
| 2017/0017537 A1 | 1/2017 | Razin et al. |
| 2017/0053130 A1 | 2/2017 | Hughes et al. |
| 2017/0075973 A1 | 3/2017 | Miranker |
| 2017/0132401 A1 | 5/2017 | Gopi et al. |
| 2017/0161323 A1 | 6/2017 | Simitsis et al. |
| 2017/0161341 A1 | 6/2017 | Hrabovsky et al. |
| 2017/0177729 A1 | 6/2017 | Duke et al. |
| 2017/0220615 A1 | 8/2017 | Bendig et al. |
| 2017/0220667 A1 | 8/2017 | Ghodsi et al. |
| 2017/0228405 A1 | 8/2017 | Ward et al. |
| 2017/0236060 A1 | 8/2017 | Ignatyev |
| 2017/0316070 A1 | 11/2017 | Krishnan et al. |
| 2017/0357653 A1 | 12/2017 | Bicer et al. |
| 2017/0364538 A1 | 12/2017 | Jacob et al. |
| 2017/0364539 A1 | 12/2017 | Jacob et al. |
| 2017/0364553 A1 | 12/2017 | Jacob et al. |
| 2017/0364564 A1 | 12/2017 | Jacob et al. |
| 2017/0364568 A1 | 12/2017 | Reynolds et al. |
| 2017/0364569 A1 | 12/2017 | Jacob et al. |
| 2017/0364570 A1 | 12/2017 | Jacob et al. |
| 2017/0364694 A1 | 12/2017 | Jacob et al. |
| 2017/0364703 A1 | 12/2017 | Jacob et al. |
| 2017/0371881 A1 | 12/2017 | Reynolds et al. |
| 2017/0371926 A1 | 12/2017 | Shiran et al. |
| 2018/0025027 A1 | 1/2018 | Palmer |
| 2018/0025307 A1 | 1/2018 | Hui et al. |
| 2018/0032327 A1 | 2/2018 | Adami et al. |
| 2018/0040077 A1 | 2/2018 | Smith et al. |
| 2018/0046668 A1 | 2/2018 | Ghodsi et al. |
| 2018/0048536 A1 | 2/2018 | Ghodsi et al. |
| 2018/0121194 A1 | 5/2018 | Hunter et al. |
| 2018/0210936 A1 | 7/2018 | Reynolds et al. |
| 2018/0262864 A1 | 9/2018 | Reynolds et al. |
| 2018/0300354 A1 | 10/2018 | Liang et al. |
| 2018/0300494 A1 | 10/2018 | Avidan et al. |
| 2018/0314556 A1 | 11/2018 | Ghodsi et al. |
| 2018/0314705 A1 | 11/2018 | Griffith et al. |
| 2018/0314732 A1 | 11/2018 | Armbrust et al. |
| 2018/0330111 A1 | 11/2018 | Käbisch et al. |
| 2019/0005104 A1 | 1/2019 | Prabhu et al. |
| 2019/0042606 A1 | 2/2019 | Griffith et al. |
| 2019/0050445 A1 | 2/2019 | Griffith et al. |
| 2019/0050459 A1 | 2/2019 | Griffith et al. |
| 2019/0057107 A1 | 2/2019 | Bartlett et al. |
| 2019/0065567 A1 | 2/2019 | Griffith et al. |
| 2019/0065569 A1 | 2/2019 | Boutros et al. |
| 2019/0066052 A1 | 2/2019 | Boutros et al. |
| 2019/0079968 A1 | 3/2019 | Griffith et al. |
| 2019/0095472 A1 | 3/2019 | Griffith |
| 2019/0121807 A1 | 4/2019 | Boutros et al. |
| 2019/0155852 A1 | 5/2019 | Miranker et al. |
| 2019/0258479 A1 | 8/2019 | Hunter et al. |
| 2019/0266155 A1 | 8/2019 | Jacob et al. |
| 2019/0272279 A1 | 9/2019 | Jacob et al. |
| 2019/0295296 A1 | 9/2019 | Gove, Jr. |
| 2019/0317961 A1 | 10/2019 | Brener et al. |
| 2019/0332606 A1 | 10/2019 | Kee et al. |
| 2019/0347244 A1 | 11/2019 | Jacob et al. |
| 2019/0347258 A1 | 11/2019 | Jacob et al. |
| 2019/0347259 A1 | 11/2019 | Jacob et al. |
| 2019/0347268 A1 | 11/2019 | Griffith |
| 2019/0347347 A1 | 11/2019 | Griffith |
| 2019/0370230 A1 | 12/2019 | Jacob et al. |
| 2019/0370262 A1 | 12/2019 | Reynolds et al. |
| 2019/0370266 A1 | 12/2019 | Jacob et al. |
| 2019/0370481 A1 | 12/2019 | Jacob et al. |
| 2020/0073644 A1 | 3/2020 | Shankar et al. |

(56) References Cited

U.S. PATENT DOCUMENTS

| | | | |
|---|---|---|---|
| 2020/0073865 | A1 | 3/2020 | Jacob et al. |
| 2020/0074298 | A1 | 3/2020 | Jacob et al. |
| 2020/0097504 | A1 | 3/2020 | Sequeda et al. |
| 2020/0117665 | A1 | 4/2020 | Jacob et al. |
| 2020/0117688 | A1 | 4/2020 | Sequeda et al. |
| 2020/0175012 | A1 | 6/2020 | Jacob et al. |
| 2020/0175013 | A1 | 6/2020 | Jacob et al. |
| 2020/0201854 | A1 | 6/2020 | Miller |
| 2020/0218723 | A1 | 7/2020 | Jacob et al. |
| 2020/0241950 | A1 | 7/2020 | Luszczak et al. |
| 2020/0252766 | A1 | 8/2020 | Reynolds et al. |
| 2020/0252767 | A1 | 8/2020 | Reynolds et al. |
| 2020/0257689 | A1 | 8/2020 | Armbrust et al. |
| 2020/0301684 | A1 | 9/2020 | Shankar et al. |
| 2020/0409768 | A1 | 12/2020 | Shankar et al. |
| 2021/0011901 | A1 | 1/2021 | Armbrust et al. |
| 2021/0019327 | A1 | 1/2021 | Reynolds et al. |

FOREIGN PATENT DOCUMENTS

| | | |
|---|---|---|
| EP | 2631817 A1 | 8/2013 |
| EP | 2631819 A1 | 8/2013 |
| EP | 2685394 A3 | 6/2017 |
| GB | 2519779 A | 5/2015 |
| JP | 2013175181 A | 9/2013 |
| JP | 2013246828 A | 12/2013 |
| WO | 2012054860 A1 | 4/2012 |
| WO | 2017190153 A1 | 11/2017 |
| WO | 2017222927 A1 | 12/2017 |
| WO | 2018156551 A1 | 8/2018 |
| WO | 2018164971 A1 | 9/2018 |

OTHER PUBLICATIONS

Boutros et al., "Computerized Tools to Facilitate Data Project Development via Data Access Layering Logic in a Networked Computing Platform Including Collaborative Datasets," U.S. Appl. No. 15/985,704, filed May 22, 2018.

Boutros et al., "Dynamic Composite Data Dictionary to Facilitate Data Operations via Computerized Tools Configured to Access Collaborative Datasets in a Networked Computing Platform," U.S. Appl. No. 15/985,705, filed May 22, 2018.

Boutros et al., "Graphical User Interface for a Display Screen or Portion Thereof," U.S. Appl. No. 29/648,465, filed May 22, 2018.

Boutros et al., "Graphical User Interface for a Display Screen or Portion Thereof," U.S. Appl. No. 29/648,466, filed May 22, 2018.

Boutros et al., "Graphical User Interface for a Display Screen or Portion Thereof," U.S. Appl. No. 29/648,46, filed May 22, 2018.

Bullock, Joshua, Non-Final Office Action dated Jun. 28, 2018 for U.S. Appl. No. 15/439,908.

Bullock, Joshua, Non-Final Office Action dated Jun. 28, 2018 for U.S. Appl. No. 15/439,911.

Copenheaver, Blaine R., Notification of Transmittal of the International Search Report and the Written Opinion of the International Searching Authority, or the Declaration dated Jul. 5, 2017 for International Patent Application No. PCT/US2017/030474.

Hoang, Hau Hai, Non-Final Office Action dated May 3, 2018 for U.S. Appl. No. 15/186,515.

Joshi, Amit Krishna et al., "Alignment-based Querying of Linked Open Data," Lecture Notes in Computer Science, 7566, 807-824, 2012.

Kahn, Yasar et al., "SAFE: Policy Aware SPARQL Query Federation Over RDF Data Cubes," Proceedings of the 7th International Workshop on Semantic Web Applications and Tools for Life Sciences, Berlin, Germany, Dec. 9-11, 2014.

Krishnan et al., U.S. Appl. No. 15/583,966, filed May 1, 2017 and titled "Automatic Generation of Structured Data from Semi-Structured Data."

Martin et al., U.S. Appl. No. 13/457,925, filed Apr. 27, 2012 and titled "Incremental Deployment of Computer Software Program Logic."

Martin et al., U.S. Appl. No. 61/479,621, filed Apr. 27, 2011 and titled "Incremental Deployment of Computer Software Program Logic."

Nguyen, Kim T., Non-Final Office Action dated Jun. 14, 2018 for U.S. Appl. No. 15/186,514.

Parashar et al., U.S. Appl. No. 62/329,982, filed Apr. 29, 2016 and titled "Automatic Parsing of Semi-Structured Data and Identification of Missing Delimiters."

Raab, Christopher J., Non-Final Office Action dated Jun. 28, 2018 for U.S. Appl. No. 15/186,520.

Skevakis, Giannis et al., Metadata management, interoperability and Linked Data publishing support for Natural History Museums, Int J Digit Libr (2014), published online: Apr. 11, 2014; Springer-Verlag Berlin Heidelberg.

Young, Lee W., Notification of Transmittal of the International Search Report and the Written Opinion of the International Searching Authority, or the Declaration dated May 29, 2018 for International Patent Application No. PCT/US2018/018906.

Bullock, Joshua, Final Office Action dated Oct. 30, 2018 for U.S. Appl. No. 15/186,517.

Bullock, Joshua, Non-Final Office Action dated Jul. 12, 2018 for U.S. Appl. No. 15/186,517.

Ganti et al., U.S. Appl. No. 14/058,208, filed Oct. 18, 2013 and entitled "Editable and Searchable Markup Pages Automatically Populated Through User Query Monitoring."

Griffith et al., "Extended Computerized Query Language Syntax for Analyzing Multiple Tabular Data Arrangements in Data-Driven Collaborative Projects," U.S. Appl. No. 16/036,834, filed Jul. 16, 2018.

Griffith et al., "Localized Link Formation to Perform Implicitly Federated Queries Using Extended Computerized Query Language Syntax," U.S. Appl. No. 16/036,836, filed Jul. 16, 2018.

Griffith, David Lee, "Determining a Degree of Similarity of a Subset of Tabular Data Arrangements to Subsets of Graph Data Arrangements at Ingestion Into a Data-Driven Collaborative Dataset Platform," U.S. Appl. No. 16/137,297, filed Sep. 20, 2018.

Griffith, David Lee, "Matching Subsets of Tabular Data Arrangements to Subsets of Graphical Data Arrangements at Ingestion Into Data Driven Collaborative Datasets," U.S. Appl. No. 16/137,292, filed Sep. 20, 2018.

Griffith, David Lee, "Predictive Determination of Constraint Data for Application With Linked Data in Graph-Based Datasets Associated With a Data-Driven Collaborative Dataset Platform," U.S. Appl. No. 16/139,374, filed Sep. 24, 2018.

Haveliwala et al., "Evaluating Strategies for Similarity Search on the Web," Proceedings of the 11th international conference on World Wide Web, May 7-11, 2002, Honolulu, Hawaii, USA (ACM), p. 432-442.

Htay, Lin Lin M., Non-Final Office Action dated Sep. 14, 2018 for U.S. Appl. No. 15/186,516.

Jacob et al., "Collaborative Dataset Consolidation via Distributed Computer Networks," U.S. Appl. No. 16/120,057, filed Aug. 31, 2018.

Pandit et al., "Using Ontology Design Patterns to Define SHACL Shapes," CEUR Workshop Proceedings, Proceedings of the 9th Workshop on Ontology Design and Patterns (WOP 2018), Monterey, USA, Oct. 9, 2018.

Young, Lee W., International Searching Authority, Notification of Transmittal of the International Search Report and the Written Opinion of the International Searching Authority, or the Declaration for International Patent Application No. PCT/US2018/020812, dated Aug. 8, 2018.

Young, Lee W., Invitation to Pay Additional Fees and, Where Applicable, Protest Fee, dated Jun. 14, 2018 for International Application No. PCT/US2018/020812.

Griffith et al., "Data Ingestion to Generate Layered Dataset Interrelations to Form a System of Networked Collaborative Datasets," U.S. Appl. No. 15/926,999, filed Mar. 20, 2018.

Griffith et al., "Layered Data Generation and Data Remediation to Facilitate Formation of Interrelated Data in a System of Networked Collaborative Datasets," U.S. Appl. No. 15/927,004, filed Mar. 20, 2018.

(56) References Cited

OTHER PUBLICATIONS

Griffith et al., "Link-Formative Auxiliary Queries Applied at Data Ingestion to Facilitate Data Operations in a System of Networked Collaborative Datasets," U.S. Appl. No. 15/943,633, filed Apr. 2, 2018.
Griffith et al., "Transmuting Data Associations Among Data Arrangements to Facilitate Data Operations in a System of Networked Collaborative Datasets," U.S. Appl. No. 15/943,629, filed Apr. 2, 2018.
Jacob et al., "Platform Management of Integrated Access of Public and Privately-Accessible Datasets Utilizing Federated Query Generation and Schema Rewriting Optimization," International Patent Application No. PCT/US2018/018906 filed Feb. 21, 2018.
Reynolds et al., "Computerized Tool Implementation of Layered Data Files to Discover, Form, or Analyze Dataset Interrelations of Networked Collaborative Datasets," U.S. Appl. No. 15/454,981, filed Mar. 9, 2017.
Reynolds et al., "Computerized Tools to Discover, Form, and Analyze Dataset Interrelations Among a System of Networked Collaborative Datasets," International Patent Application No. PCT/US2018/020812 filed Mar. 3, 2018.
Reynolds et al., "Interactive Interfaces to Present Data Arrangement Overviews and Summarized Dataset Attributes for Collaborative Datasets," U.S. Appl. No. 15/454,969, filed Mar. 9, 2017.
Young, Lee W., International Searching Authority, Notification of Transmittal of the International Search Report and the Written Opinion of the International Searching Authority, or the Declaration for International Patent Application No. PCT/US2017/037846, dated Nov. 9, 2017.
Angles, R., Gutierrez. C., "The Expressive Power of SPARQL," Proceedings of the 7th International Semantic Web Conference (ISWC2008). 2008.
Arenas, M., et al., "A Direct Mapping of Relational Data to RDF," W3C Recommendation, Sep. 27, 2012, Retrieved from the Internet [retrieved Mar. 7, 2019].
Beckett, D., Berners-Lee, T., "Turtle—Terse RDF Triple Language," W3C Team Submission, Jan. 14, 2008, Retrieved from the Internet [retrieved Mar. 7, 2019].
Beckett, D., Broekstra, J., "SPARQL Query Results XML Format," W3C Recommendation, Jan. 15, 2008, Retrieved from the Internet [retrieved Mar. 7, 2019].
Beckett, Dave, "RDF/XML Syntax Specification (Revised)," W3C Recommendation, Feb. 10, 2004, Retrieved from the Internet [retrieved Mar. 7, 2019].
Berners-Lee, Tim, "Notation 3," 2006, Retrieved from the Internet [retrieved on Mar. 7, 2019].
Berners-Lee, Tim, "Linked Data," 2009, Retrieved from the Internet [retrieved on Mar. 7, 2019].
Brener et al., "Computerized Tools Configured to Determine Subsets of Graph Data Arrangements for Linking Relevant Data to Enrich Datasets Associated With a Data-Driven Collaborative Dataset Platform," U.S. Appl. No. 16/395,036, filed Apr. 25, 2019.
Brickley, D., Guha, R.V., "RDF Vocabulary Description Language 1.0: RDF Schema," W3C Recommendation, Feb. 10, 2004, Retrieved from the Internet [retrieved Mar. 7, 2019].
Buche et al., "Flexible SPARQL Querying of Web Data Tables Driven by an Ontology," FQAS 2009, LNAI 5822, Springer, 2009, pp. 345-357.
Bullock, Joshua, Final Office Action dated Jan. 22, 2019 for U.S. Appl. No. 15/439,908.
Bullock, Joshua, Final Office Action dated Jan. 22, 2019 for U.S. Appl. No. 15/439,911.
Clark, K., Feigenbaum, L., Torres, E., "SPARQL Protocol for RDF," W3C Recommendation, Jan. 15, 2008, Retrieved from the Internet [retrieved Mar. 7, 2019].
Czajkowski, K., et al., "Grid Information Services for Distributed Resource Sharing," 10th IEEE International Symposium on High Performance Distributed Computing, pp. 181-184. IEEE Press, New York (2001).
Dean, M., Schreiber, G., "OWL Web Ontology Language Reference," W3C Recommendation, Feb. 10, 2004, Retrieved from the Internet [retrieved Mar. 7, 2019].
Feigenbaum, L., et al., "Semantic Web in Action," Scientific American, pp. 90-97, Dec. 2007.
Fernandez, J., et al., "Lightweighting the Web of Data through Compact RDF/HDT," Lozano J.A., Moreno J.A. (eds) Advances in Artificial Intelligence. CAEPIA 2011. Lecture Notes in Computer Science, vol. 7023. Springer, Berlin, Hidelberg.
Foster, I., Kesselman, C., "The Grid: Blueprint for a New Computing Infrastructure," Morgan Kaufmann, San Francisco (1999).
Foster, I. Kesselman, C., Nick, J., Tuecke, S., "The Physiology of the Grid: An Open Grid Services Architecture for Distributed Systems Integration," Technical Report, Global Grid Forum (2002).
Ganti et al., U.S. Appl. No. 14/058,184, filed Oct. 18, 2013 and entitled, "Assisted Query Formation, Validation, and Result Previewing in a Database Having a Complex Schema."
Ganti et al., U.S. Appl. No. 14/058,189, filed Oct. 18, 2013 and entitled, "Assisted Query Formation, Validation, and Result Previewing in a Database Having a Complex Schema."
Ganti et al., U.S. Appl. No. 14/058,206, filed Oct. 18, 2013 and entitled, "Curated Answers Community Automatically Populated Through User Query Monitoring."
Ganti et al., U.S. Appl. No. 61/802,716, filed Mar. 17, 2013 and entitled, "Data Profile Driven Query Builder."
Ganti et al., U.S. Appl. No. 61/802,742, filed Mar. 18, 2013 and entitled, "Developing a Social Data Catalog by Crowd-Sourcing."
Ganti et al., U.S. Appl. No. 61/802,743, filed Mar. 18, 2013 and entitled, "Creating a Data Catalog by Mining Queries."
Ganti et al., U.S. Appl. No. 61/802,744, filed Mar. 18, 2013 and entitled, "Auto-Completion of Queries With Data Object Names and Data Profiles."
Garcia-Molina, H., Ullman, J., Widom, J., Database Systems: The Complete Book. Editorial Pearson Prentice Hall. Second Edition.
Gawinecki, Maciej, "How schema mapping can help in data integration?—integrating the relational databases with ontologies," ITC School, Computer Science, XXIII Cycle DII, University of Modena and Reggio Emilia, Italy, 2008.
Girma, Anteneh B., Final Office Action for U.S. Appl. No. 13/278,907, dated Apr. 18, 2013.
Girma, Anteneh B., Non-Final Office Action for U.S. Appl. No. 13/278,907, dated Jul. 25, 2012.
Grant, J., Beckett, D., "RDF Test Cases," W3C Recommendation, Feb. 10, 2004, Retrieved from the Internet [retrieved Mar. 7, 2019].
Hayes, Patrick, "RDF Semantics," W3C Recommendation, Feb. 10, 2004, Retrieved from the Internet [retrieved Mar. 7, 2019].
Heflin, J., "OWL Web Ontology Language Use Cases and Requirements," W3C Recommendation, Feb. 10, 2004, Retrieved from the Internet [retrieved Mar. 7, 2019].
Hoang, Hau Hai, Final Office Action dated Nov. 26, 2018 for U.S. Appl. No. 15/186,515.
Hoang, Hau Hai, Non-Final Office Action dated Apr. 16, 2019 for U.S. Appl. No. 15/186,515.
Htay, Lin Lin M., Notice of Allowance and Fee(s) Due and Notice of Allowability for U.S. Appl. No. 15/186,516, dated Jan. 25, 2019.
Hu, Xiaoqin, Final Office Action dated Apr. 5, 2019 for U.S. Appl. No. 15/454,969.
Hu, Xiaoqin, Final Office Action dated Apr. 5, 2019 for U.S. Appl. No. 15/454,981.
Hu, Xiaoqin, Non-Final Office Action for U.S. Appl. No. 15/454,969 dated Dec. 7, 2018.
Hu, Xiaoqin, Non-Final Office Action for U.S. Appl. No. 15/454,981 dated Dec. 12, 2018.
J. Perez, M. Arenas, C. Gutierrez, "Semantics and Complexity of SPARQL," ACM Transactions on Database Systems (TODS), Vo. 34, No. 3, Article 16, Publication Date: Aug. 2009.
Jacob et al., "Collaborative Dataset Consolidation via Distributed Computer Networks," U.S. Appl. No. 16/287,967, filed Feb. 27, 2019.
Jacob et al., "Dataset Analysis and Dataset Attribute Inferencing to Form Collaborative Datasets," U.S. Appl. No. 16/292,120, filed Mar. 4, 2019.

(56) References Cited

OTHER PUBLICATIONS

Langedgger, Andreas, "XL Wrap—Spreadsheet-to-RDF Wrapper," 2009, Retrieved from the Internet [retrieved Mar. 7, 2019].
Lee, Mark B., Non-Final Office Action for U.S. Appl. No. 13/180,444 dated Jul. 2, 2012.
Lenz, H.J., Shoshani, A., "Summarizability in OLAP and Statistical Data Bases," Proceedings of the Ninth International Conference on Scientific and Statistical Database Management, 1997.
Manola, F., Miller, E., "RDF Primer," W3C Recommendation, Feb. 10, 2004, Retrieved from the Internet [retrieved Mar. 7, 2019].
May, P., Ehrlich, H.C., Steinke, T., "ZIB Structure Prediction Pipeline: Composing a Complex Biological Workflow through Web Services," In: Nagel, W.E., Walter, W.V., Lehner, W. (eds.) Euro-Par 2006. LNCS, vol. 4128, pp. 1148-1158. Springer, Heidelberg (2006).
McGuiness, D., Van Harmelen, F., "OWL Web Ontology Language Overview," W3C Recommendation, Feb. 10, 2004, Retrieved from the Internet [retrieved Mar. 7, 2019].
Miranker, Daniel Paul, "Accessing Relational Databases as Resource Description Framework Databases," U.S. Appl. No. 61/406,021, filed Oct. 22, 2010.
Miranker, Daniel Paul, "Automatic Synthesis and Presentation of OLAP Cubes from Semantically Enriched Data Sources," U.S. Appl. No. 61/362,781, filed Jul. 9, 2010.
National Center for Biotechnology Information, Website, Retrieved from the Internet [retrieved Mar. 7, 2019].
Nguyen, Kim T., Non-Final Office Action dated Mar. 20, 2019 for U.S. Appl. No. 15/454,923.
Niinimaki et al., "An ETL Process for OLAP Using RDF/OWL Ontologies," Journal on Data Semantics XIII, LNCS 5530, Springer, pp. 97-119, Aug. 12, 2009.
Patel-Schneider, P., Hayes, P., Horrocks, I., "OWL Web Ontology Language Semantics and Abstract Syntax," W3C Recommendation, Feb. 10, 2004, Retrieved from the Internet [retrieved Mar. 7, 2019].
Perez, J., Arenas, M., Gutierrez, C., "Semantics and Complexity of SPARQL," In Proceedings of the International Semantic Web Conference (ISWC2006). 2006.
Prud'hommeaux, E., Seaborne, A., "SPARQL Query Language for RDF," W3C Recommendation, Jan. 15, 2008, Retrieved from the Internet [retrieved Mar. 7, 2019].
Raab, Christopher J., Notice of Allowance and Fee(s) Due and Notice of Allowability for U.S. Appl. No. 15/186,520, dated Jan. 2, 2019.
RDB2RDF Working Group Charter, Sep. 2009, Retrieved from the Internet [retrieved Mar. 7, 2019].
Sahoo, S., et al., "A Survey of Current Approaches for Mapping of Relational Databases to RDF," W3C RDB2RDF XG Report, Incubator Group, Published Jan. 8, 2009.
Sequeda, J., Depena, R., Miranker. D., "Ultrawrap: Using SQL Views for RDB2RDF," Poster in the 8th International Semantic Web Conference (ISWC2009), Washington DC, US, 2009.
Sequeda, J., et al., "Direct Mapping SQL Databases to the Semantic Web," Technical Report 09-04. The University of Texas at Austin, Department of Computer Sciences. 2009.
Sequeda, J., et al., "Ultrawrap: SPARQL Execution on Relational Data," Technical Report. The University of Texas at Austin, Department of Computer Sciences. 2012.
Sequeda, J., Tirmizi, S., Miranker, D., "SQL Databases are a Moving Target," Position Paper for W3C Workshop on RDF Access to Relational Databases, Cambridge, MA, USA, 2007.
Smith, M., Welty, C., McGuiness, D., "OWL Web Ontology Language Guide," W3C Recommendation, Feb. 10, 2004, Retrieved from the Internet [retrieved Mar. 7, 2019].
Smith, T.F., Waterman, M.S., "Identification of Common Molecular Subsequences," J. Mol. Biol. 147, 195-197 (1981).
Tirmizi, S., Sequeda, J., Miranker, D., "Translating SQL Applications to the Semantic Web," In Proceedings of the 19th International Databases and Expert Systems Application Conference (DEXA2008). Turin, Italy. 2008.
U.S. Appl. No. 16/251,408, filed Jan. 18, 2019.
Ultrawrap Mapper, U.S. Appl. No. 62/169,268, filed Jun. 1, 2015 (Expired).
Vy, Hung T., Final Office Action for U.S. Appl. No. 13/180,444, dated Dec. 3, 2014.
Vy, Hung T., Final Office Action for U.S. Appl. No. 13/180,444 dated Dec. 9, 2015.
Vy, Hung T., Final Office Action for U.S. Appl. No. 13/180,444 dated Feb. 22, 2013.
Vy, Hung T., Non-Final Office Action for U.S. Appl. No. 13/180,444 dated Jun. 18, 2015.
Vy, Hung T., Non-Final Office Action for U.S. Appl. No. 13/180,444 dated Mar. 26, 2014.
Vy, Hung T., Non-Final Office Action for U.S. Appl. No. 15/273,930 dated Dec. 20, 2017.
Yen, Syling, Final Office Action dated Apr. 10, 2019 for U.S. Appl. No. 15/186,519.
Yen, Syling, Non-Final Office Action dated Feb. 8, 2019 for U.S. Appl. No. 15/186,519.
Young, Lee W., Notification of Transmittal of the International Search Report and the Written Opinion of the International Searching Authority, or the Declaration for International Application No. PCT/US2011/057334, dated. Mar. 22, 2012.
Jacob et al., "Dataset Analysis and Dataset Attribute Inferencing to Form Collaborative Datasets," U.S. Appl. No. 16/271,263, filed Feb. 8, 2019.
Jacob et al., "Management of Collaborative Datasets via Distributed Computer Networks," U.S. Appl. No. 16/271,687, filed Feb. 8, 2019.
Jacob et al., "Management of Collaborative Datasets via Distributed Computer Networks," U.S. Appl. No. 16/292,135, filed Mar. 4, 2019.
Jacob et al., "Query Generation for Collaborative Datasets," U.S. Appl. No. 16/395,043, filed Apr. 25, 2019.
Jacob et al., "Query Generation for Collaborative Datasets," U.S. Appl. No. 16/395,049, filed Apr. 25, 2019.
Khong, Alexander, Non-Final Office Action for U.S. Appl. No. 15/165,775, dated Jun. 14, 2018.
Klyne, G., Carroll, J., "Resource Description Framework (RDF): Concepts and Abstract Syntax," W3C Recommendation, Feb. 10, 2004, Retrieved from the Internet [retrieved Mar. 7, 2019].
"Data.World Comes Out of Stealth to Make Open Data Easier." Americaninno.com, AustinInno, Jul. 11, 2016, www. americaninno.com/austin/open-data-tech-brett-hurts-startup-data-world-launches/.
Dwivedi, Mahesh H., Non-Final Office Action dated Jan. 30, 2020 for U.S. Appl. No. 15/454,955.
Gillin, Paul, "Neo4j Connector Integrates Graph Data With Business Intelligence Tools," SiliconANGLE, Published Mar. 24, 2020, Retrieved from on Mar. 25, 2020.
Woo, Isaac M., Non-Final Office Action dated May 5, 2020 for U.S. Appl. No. 16/137,292.
Yotova, Polina, Supplementary European Search Report and Examiner Search Opinion for European Patent Application No. 17815970.3, dated Feb. 21, 2020.
Hoang, Hau Hai, Final Office Action dated Jul. 30, 2019 for U.S. Appl. No. 15/186,515.
Hu, Xiaoqin, Final Office Action dated Oct. 31, 2019 for U.S. Appl. No. 15/454,969.
Hu, Xiaoqin, Final Office Action dated Sep. 24, 2019 for U.S. Appl. No. 15/454,981.
Hu, Xiaoqin, Non-Final Office Action dated Aug. 1, 2019 for U.S. Appl. No. 15/454,981.
Hu, Xiaoqin, Non-Final Office Action dated Jul. 26, 2019 for U.S. Appl. No. 15/454,969.
Nguyen, Kim T., Notice of Allowance and Fee(s) Due, dated May 15, 2019 for U.S. Appl. No. 15/454,923.
Yen, Syling, Final Office Action dated Oct. 25, 2019 for U.S. Appl. No. 15/186,519.
Yen, Syling, Non-Final Office Action dated Sep. 12, 2019 for U.S. Appl. No. 15/186,519.
Alaoui et al., "SQL to SPARQL Mapping for RDF querying based on a new Efficient Schema Conversion Technique," International Journal of Engineering Research & Technology (IJERT); ISSN:

(56) References Cited

OTHER PUBLICATIONS 2278-0181; vol. 4 Issue 10, Oct. 1, 2015, Retrieved from internet: ,,https://www.ijert.org/research/sql-to-sparql-mapping-for-rdf-querying-based-on-a-new-efficient-schema-conversion-technique-IJERTV4IS1--1-5.pdf>> Retrieved on Oct. 6, 2020.
Doung, Hien, Non-Final Office Action dated Dec. 9, 2020 for U.S. Appl. No. 16/899,544.
Ellis, Matthew J., Non-Final Office Action dated Sep. 25, 2020 for U.S. Appl. No. 16/139,374.
European Patent Office, Extended European Search Report for European Patent Application No. 18757122.9 dated Oct. 15, 2020.
European Patent Office, Extended European Search Report for European Patent Application No. 18763855.6 dated Sep. 28, 2020.
Nguyen, Kim T., Non-Final Office Action dated Dec. 10, 2020 for U.S. Appl. No. 16/137,297.
Nguyen, Kim T., Non-Final Office Action dated Dec. 8, 2020 for U.S. Appl. No. 15/985,704.
Nguyen, Kim T., Non-Final Office Action dated Nov. 24, 2020 for U.S. Appl. No. 16/036,834.
Nguyen, Kim T., Non-Final Office Action dated Nov. 24, 2020 for U.S. Appl. No. 16/036,836.
Nguyen, Kim T., Non-Final Office Action dated Nov. 27, 2020 for U.S. Appl. No. 15/985,705.
Nguyen, Kim T., Non-Final Office Action dated Oct. 14, 2020 for U.S. Appl. No. 15/943,629.
Nguyen, Kim T., Non-Final Office Action dated Oct. 14, 2020 for U.S. Appl. No. 15/943,633.
Nguyen, Kim T., Non-Final Office Action dated Oct. 27, 2020 for U.S. Appl. No. 15/985,702.
Nguyen, Kim T., Non-Final Office Action dated Oct. 5, 2020 for U.S. Appl. No. 15/927,004.
Nguyen, Kim T., Non-Final Office Action dated Sep. 21, 2020 for U.S. Appl. No. 15/926,999.
Raab, Christopher J., Non-Final Office Action dated Jul. 24, 2020 for U.S. Appl. No. 16/271,687.
Raab, Christopher J., Non-Final Office Action dated Oct. 16, 2020 for U.S. Appl. No. 16/287,967.
Rachapalli et al., "RETRO: A Framework for Semantics Preserving SQL-to-SPARQL Translation," The University of Texas at Dallas; Sep. 18, 2011, XP055737294, Retrieved from internet: <> Retrieved on Oct. 6, 2020.
Uddin, MD I., Final Office Action dated Jan. 1, 2021 for U.S. Appl. No. 16/404,113.
Uddin, MD I., Non-Final Office Action dated Oct. 6, 2020 for U.S. Appl. No. 16/404,113.

\* cited by examiner

AGGREGATION OF ANCILLARY DATA ASSOCIATED WITH SOURCE DATA IN A SYSTEM OF NETWORKED COLLABORATIVE DATASETS

CROSS-REFERENCE TO APPLICATIONS

This application is a continuation-in-part application of U.S. patent application Ser. No. 15/186,514, filed on Jun. 19, 2016 and titled "COLLABORATIVE DATASET CONSOLIDATION VIA DISTRIBUTED COMPUTER NETWORKS," U.S. patent application Ser. No. 15/186,516, filed on Jun. 19, 2016 and titled "DATASET ANALYSIS AND DATASET ATTRIBUTE INFERENCING TO FORM COLLABORATIVE DATASETS," and U.S. patent application Ser. No. 15/454,923, filed on Mar. 9, 2017 and titled "COMPUTERIZED TOOLS TO DISCOVER, FORM, AND ANALYZE DATASET INTERRELATIONS AMONG A SYSTEM OF NETWORKED COLLABORATIVE DATASETS," all of which is herein incorporated by reference in its entirety for all purposes.

FIELD

Various embodiments relate generally to data science and data analysis, computer software and systems, and wired and wireless network communications to provide an interface between repositories of disparate datasets and computing machine-based entities that seek access to the datasets, and, more specifically, to a computing and data storage platform that facilitates consolidation of one or more datasets, whereby logic is configured to remediate anomalies (or predicted anomalies) in a data set originating in a first format prior to enrichment and conversion into a second format that facilitates forming collaborative dataset and, for example, interrelations among a system of networked collaborative datasets, whereby, at least in some implementations, data interrelations between different formats may be disposed in one or more data layers (e.g., layered data files and/or data arrangements).

BACKGROUND

Advances in computing hardware and software have fueled exponential growth in the generation of vast amounts of data due to increased computations and analyses in numerous areas, such as in the various scientific and engineering disciplines, as well as in the application of data science techniques to endeavors of good-will (e.g., areas of humanitarian, environmental, medical, social, etc.). Also, advances in conventional data storage technologies provide the ability to store the increasing amounts of generated data. Consequently, traditional data storage and computing technologies have given rise to a phenomenon in which numerous desperate datasets have reached sizes and complexities that tradition data-accessing and analytic techniques are generally not well-suited for assessing conventional datasets.

Conventional technologies for implementing datasets typically rely on different computing platforms and systems, different database technologies, and different data formats, such as CSV, TSV, HTML, JSON, XML, etc. Further, known data-distributing technologies are not well-suited to enable interoperability among datasets. Thus, many typical datasets are warehoused in conventional data stores, which are known as "data silos." These data silos have inherent barriers that insulate and isolate datasets. Further, conventional data systems and dataset accessing techniques are generally incompatible or inadequate to facilitate data interoperability among the data silos.

Conventional approaches to generate and manage datasets, while functional, suffer a number of other drawbacks. For example, conventional data implementation typically may require manual importation of data from data files having "free-form" data formats. Without manual intervention, such data may be imported into data files with inconsistent or non-standard data structures or relationships. Thus, data practitioners generally are required to intervene to manually standardize the data arrangements. Further, manual intervention by data practitioners is typically required to decide how to group data based on types, attributes, etc. Manual interventions for the above, as well as other known conventional techniques, generally cause sufficient friction to dissuade the use of such data files. Thus, valuable data and its potential to improve the public well-being may be thwarted.

Moreover, traditional dataset generation and management are not well-suited to reducing efforts by data scientists and data practitioners to interact with data, such as via user interface ("UI") metaphors, over complex relationships that link groups of data in a manner that serves their desired objectives, as well as the application of those groups of data to third party (e.g., external) applications or endpoints processes, such as statistical applications.

Other drawbacks in conventional approaches to generating and managing datasets arise from difficulties in perfecting data prior to performing analysis and other data operations. Typically, data scientists expend much time reviewing the data to locate missing data, testing whether a data value is an outlier (i.e., erroneous), conforming data structures (e.g., columns) to arrange data, for example, uniformly, and other data defects. While known routine diagnostics are designed for each of a number of different formats, such uniquely-tailored diagnostics are not well-suited or adapted to detect a vast array of possible anomalies, such as, for example, a mislabeled or misdefined description of a subset of data, among many other issues. Thus, conventional approaches are less effective in data "wrangling" (i.e., cleaning and integrating 'messy' and 'sophisticated' data arrangements), which, in turn causes formation of unreliable data sets. Unfortunately, the relative unreliability of conventional techniques to remove defects in data thereby reduces others' confidence in using such data, which frustrates or impedes the repurposing or sharing of a dataset generated by the aforementioned techniques.

Thus, what is needed is a solution for facilitating techniques to optimize linking of datasets, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1A:
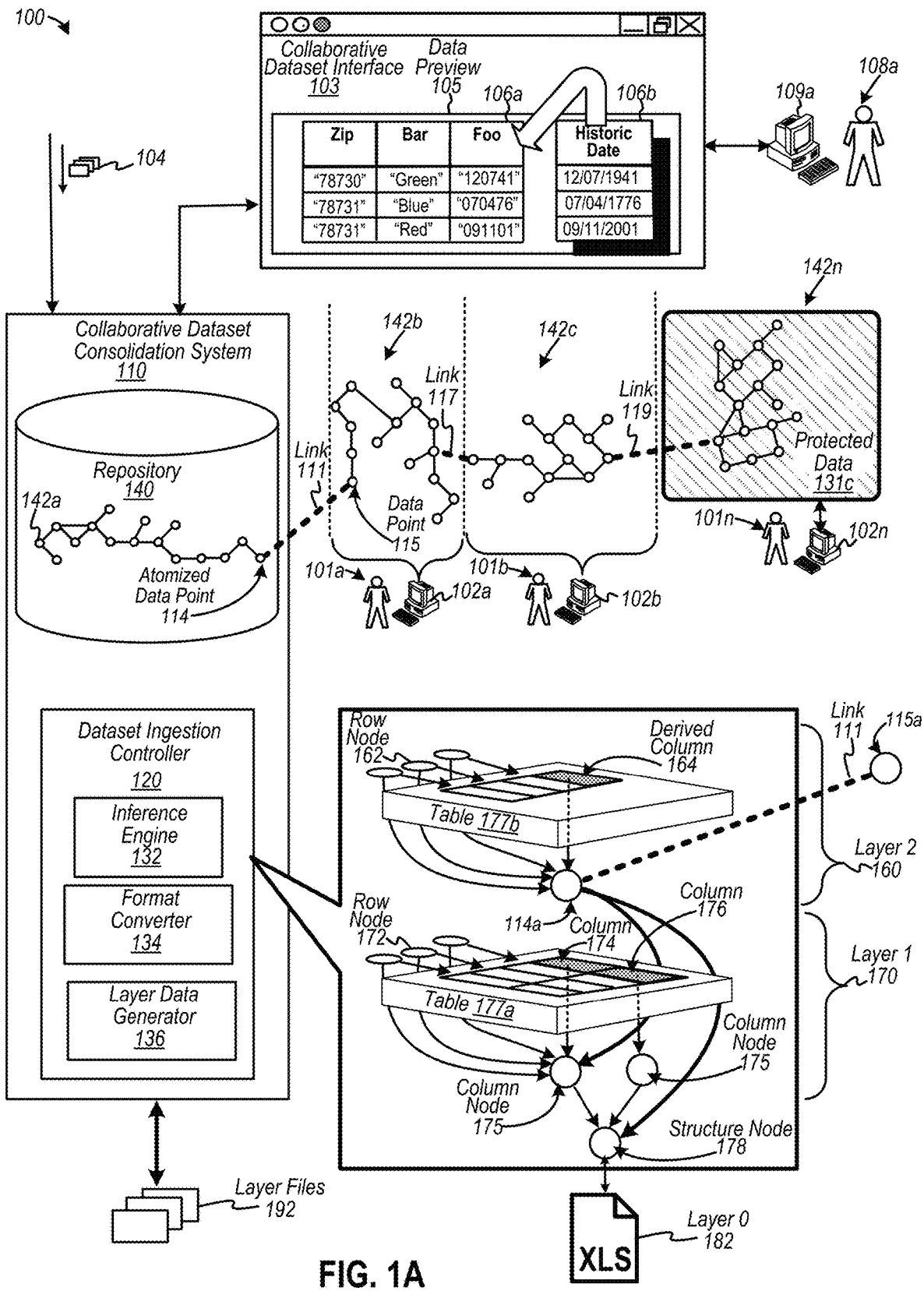
FIG. 1A is a diagram depicting an example of a collaborative dataset consolidation system configured to form subsets of layered interrelated data, according to some embodiments.

FIG. 1A is a diagram depicting an example of a collaborative dataset consolidation system configured to form subsets of layered interrelated data, according to some embodiments. Diagram 100 depicts an example of a collaborative dataset consolidation system 110 that may be configured to consolidate one or more datasets to form collaborative datasets. A collaborative dataset, according to some non-limiting examples, is a set of data that may be configured to facilitate data interoperability over disparate computing system platforms, architectures, and data storage devices. Further, a collaborative dataset may also be associated with data configured to establish one or more associations (e.g., metadata) among subsets of dataset attribute data for datasets and multiple layers of layered data, whereby attribute data may be used to determine correlations (e.g., data patterns, trends, etc.) among the collaborative datasets. Further, collaborative dataset consolidation system 110 may be configured to convert a dataset in a first format (e.g., a tabular data structure or an unstructured data arrangement) into a second format (e.g., a graph), and is further configured to interrelate data between a table and a graph. Thus, data operations, such as queries, that are designed for either a tabular or graph data structure may be implemented to access data in both formats or data arrangements. For example, a query on a collaborative dataset may be accomplished using either a query designed to access a tabular or relational data arrangement (e.g., a SQL query or variant thereof) or another query designed to access a graph data arrangement (e.g., a SPARQL operation or a variant thereof) that includes data for the collaborative dataset. Therefore, a collaborative dataset of common data may be configured to be accessible by different queries and programming languages, according to some examples.

Collaborative dataset consolidation system 110 may present the correlations via, for example, computing device 109a to disseminate dataset-related information to user 108a. Computing device 109a may be configured to interoperate with collaborative dataset consolidation system 110 to perform any number of data operations, including queries over interrelated or linked datasets. Thus, a community of users 108, as well as any other participating user, may discover, share, manipulate, and query dataset-related information of interest in association with collaborative datasets. Collaborative datasets, with or without associated dataset attribute data, may be used to facilitate easier collaborative dataset interoperability (e.g., consolidation) among sources of data that may be differently formatted at origination.

Diagram 100 depicts an example of a collaborative dataset consolidation system 110, which is shown in this example as including a repository 140 configured to store datasets, such as dataset 142a, and a dataset ingestion controller 120, which, in turn, is shown to include an inference engine 132, a format converter 134, and a layer data generator 136. In some examples, format converter 134 may be configured to receive data representing a set of data 104 having, for example, a particular data format, and may be further configured to convert dataset 104 into a collaborative data format for storage in a portion of data arrangement 142a in repository 140. Set of data 104 may be received in the following examples of data formats: CSV, XML, JSON, XLS, My SQL, binary, free-form, unstructured data formats (e.g., data extract from a PDF file using optical character recognition), etc., among others.

According to some embodiments, a collaborative data format may be configured to, but need not be required to, format converted dataset 104 as an atomized dataset. An atomized dataset may include a data arrangement in which data is stored as an atomized data point 114 that, for example, may be an irreducible or simplest data representation (e.g., a triple is a smallest irreducible representation for a binary relationship between two data units) that are linkable to other atomized data points, according to some embodiments. As atomized data points may be linked to each other, data arrangement 142a may be represented as a graph, whereby the converted dataset 104 (i.e., atomized dataset 104a) forms a portion of the graph (not shown). In some cases, an atomized dataset facilitates merging of data irrespective of whether, for example, schemas or applications differ. Further, an atomized data point 114 may represent a triple or any portion thereof (e.g., any data unit representing one of a subject, a predicate, or an object), according to at least some examples.

As shown in diagram 100, dataset ingestion controller 120 may be configured to extend a dataset (e.g., a converted set of data 104 stored in a format suitable to data arrangement 142a) to include, reference, combine, or consolidate with other datasets within data arrangement 142a or external thereto. Specifically, dataset ingestion controller 120 may extend an atomized dataset 142a to form a larger or enriched dataset, by associating or linking (e.g., via links 111, 117 and 119) to other datasets, such as external datasets 142b, 142c, and 142n, each of which may be an atomized dataset. An external dataset, at least in this one case, can be referred to a dataset generated externally to system 110 and may or may not be formatted as an atomized dataset. In some examples, datasets 142b and 142c may be public datasets originating externally to collaborative dataset consolidation system 110, such as at computing device 102a and computing device 102b, respectively. Users 101a and 101b are shown to be associated with computing devices 102a and 102b, respectively.

In some embodiments, collaborative dataset consolidation system 110 may provide limited access (e.g., via use of authorization credential data) to otherwise inaccessible "private datasets." For example, dataset 142n is shown as a "private dataset" that includes protected data 131c. Access to dataset 142n may be permitted via computing device 102n by administrative user 101n. Therefore, user 108a via computing device 109a may initiate a request to access protected data 131c through secured link 119 by, for example, providing authorized credential data to retrieve data via secured link 119. Collaborative dataset 142a then may be supplemented by linking, via the use of one or more layers, to protected data 131c to form a larger atomized dataset that includes data from datasets 142a, 142b, 142c, and 142n. According to various examples, a "private dataset" may have one or more levels of security. For example, a private dataset as well as metadata describing the private dataset may be entirely inaccessible by non-authorized users of collaborative dataset consolidation system 110. Thus, a private dataset may be shielded or invisible to searches performed on data in repository 140 or on data linked thereto. In another example, a private dataset may be classified as "restricted," or inaccessible (e.g., without authorization), whereby its associated metadata describing dataset attributes of the private dataset may be accessible publicly so the dataset may be discovered via searching or by any other mechanism. A restricted dataset may be accessed via authorization credentials, according to some examples.

Layer data generator 136 may be configured to generate layer data describing data, such as a dataset, that may be configured to reference source data (e.g., originally formatted data 104) directly and/or indirectly via other layers of layer data. A subset of layer data may be stored in a layer file, which may be configured to generate and/or identify attributes that may be used to, for example, modify presentation or implementation of the underlying data. Data describing layer data in a layer file may be configured to provide for "customization" of the usage of the underlying data, according to some cases. Data in layer files are configured to reference the underlying data, and thus need not include the underlying data. As such, layer data files are portable independent of the underlying data and may be created through collaboration, such as among users 101a, 101b, and 101n to add layer file data to dataset 142a associated with user 108a.

According to some examples, layer data generator 136 may be configured to generate hierarchical layer data files, whereby the layer data among layer files are hierarchically referenced or linked such that relatively higher layers reference layer data in lower layers. In some examples, higher layer data may "inherit" or link to lower layer data. In other examples, higher layer data may optionally exclude one or more preceding or lower layers of layer data based on, for example, a context of an operation. For example, a query of a dataset may include layers A and B, but not layer C.

Layer data generator 136 may be configured to generate referential data, such as node data, that links data via data structures associated with a layer. Accordingly, a higher layer data may be linked to the underlying source data, which may have been ingested via set of data 104. In the example shown, layer data generator 136 may be configured to extract or identify data in a data arrangement, such as in XLS data format. As shown, the raw data and data arrangement of set of data 104 may be depicted as layer ("0") 182. Layer data generator 136 may be configured to implement a structure node 178 to identify the underlying data in layer 182. Further to the example shown, format converter 134 may be configured to format the source data into, for example, a tabular data format 177a, and layer data generator 136 may be configured to implement row nodes 172 to identify rows of underlying data and column nodes 175 to identify columns 174 and 176 of underlying data. In at least one example, layer ("1") 170 may indicate data that may be stored or otherwise associated with a layer one ("1") data file.

Consider a further example in which inference engine 132 is configured to derive data representative of a new or modified column of data. As described in various examples herein, inference engine 132 may be configured to derive or infer a dataset attribute from data. For example, inference engine 132 may be configured to infer (e.g., automatically) that a column includes one of the following datatypes: an integer, a string, a Boolean data item, a categorical data item, a time, etc. In this example, consider that column 176 includes strings of data, such as "120741," "070476," and "091101" for column 106a of data preview 105, which is depicted in a user interface configured to depict a collaborative dataset interface 103. Inference engine 132 may be configured to determine that strings of data represent historic dates of Dec. 7, 1941, Jul. 4, 1776, and Sep. 11, 2001 for respective data strings "120741," "070776," and "091101." Further, inference engine 132 may be configured to generate a derived column 106b with a header "historic date."

Layered data generator 136 may further be configured to generate referential data, including node data that links derived data of derived column 164 (e.g., data of historical date column 106b) to underlying data in layer 170 and layer 182. Further, format converter 134 may be configured to format derived data into, for example, a tabular data format 177b, and layer data generator 136 may be configured to implement row nodes 162 to identify rows of derived data and a column node 114a to identify column 164 of derived data. By implementing column node 114a to refer or link to derived data, the derived data may be linkable to other equivalent data (and associated datasets). For example, node 114a and node 115a may be representative of data points 114 of dataset 142a and 115 of dataset 142b, respectively. In at least one example, layer ("2") 160 may indicate data that may be stored or otherwise associated with a layer two ("2") data file. Layer 160 may be viewed as a higher hierarchical layer that may link to one or more lower hierarchical layers, such as layer 170 and layer 182. Layer files including layer data may be formed as layer files 192.

In view of the foregoing, the structures and/or functionalities depicted in FIG. 1A illustrate dataset ingestion controller 120 being configured to ingest a set of data 104 to form data representing layered data files and data arrangements to facilitate, for example, interrelations among a system of networked collaborative datasets, according to some embodiments. According to some examples, layers of data (and associated layer data files) may be selectively implementable by an authorized user. As such, any particular layer may be "turned on" or "turned off" in the processing (e.g., querying) of collaborative datasets. Further, implementations of layer data files may facilitate the use of supplemental data (e.g., derived or added data, etc.) that can be linked to an original source dataset. Thus, collaboration and data storage requirements may occur independent of the original source dataset. Next, consider the following example of a supplemental dataset in which a user of a baseball-based dataset collaborates to generate labels in Japanese, whereby the Japanese language-based labels may be configured to be disposed in a higher layer of data that references English language-based labels disposed in a lower hierarchical data layer. Therefore, data may be annotated with either Japanese or English based on, for example, a context, whereby the context (or other factors) may cause selection of one layer file including Japanese labels or another layer file containing English labels. The above-described examples illustrate a few implementations that are not intended to be limiting.

According to various examples, collaborative dataset consolidation system 110 may be configured to implement layer files that include data that is linkable to, but independent of, underlying source data. In some cases, data transfer sizes may be reduced when transmitting layer files rather including the layer zero data (or string data in layer one), thereby facilitating collaboration in the development of additional linked layer files, which, in turn, facilitates adaption and adoption of the underlying source data. In some implementations, data associated with one or more layer files may be implemented or otherwise stored as linked data in a graph database. Further, layer files and the data therein provide a tabular data arrangement or a template with which to construct a tabular data arrangement. Layer files and the data therein may provide other data structures that may be suitable for certain types of data access (e.g., via SQL or other similar database languages). Note, too, the layer files include data structure elements, such as nodes and linkages, that facilitate implementation as a graph database, such as an RDF database or a triplestore. Therefore, collaborative dataset consolidation system 110 may be configured to present or provide access to the data as a tabular data arrangement in some cases (e.g., to provide access via SQL, etc.), and as a graph database in other cases (e.g., to provide access via SPARQL, etc.). Additionally, implementation of one or more layer files provide for "lossless" transformation of data that may be reversible. For example, transformations of the underlying source data from one database schema or structure to another database schema or structure may be reversed without loss of information (or substantially without negligible loss of information).

According to some examples, dataset 104 may include data originating from repository 140 or any other source of data. Hence, dataset 104 need not be limited to, for example, data introduced initially into collaborative dataset consolidation system 110, whereby format converter 134 converts a dataset from a first format into a second format (e.g., a graph-related data arrangement). In instances when dataset 104 originates from repository 140, dataset 104 may include links formed within a graph data arrangement (i.e., dataset 142a). Subsequent to introduction into collaborative dataset consolidation system 110, data in dataset 104 may be included in a data operation as linked data in dataset 142a, such as a query. In this case, one or more components of dataset ingestion controller 120 and a dataset attribute manager (not shown) may be configured to enhance dataset 142a by, for example, detecting and linking to additional datasets that may have been formed or made available subsequent to ingestion or use of data in dataset 142a.

In at least one example, additional datasets to enhance dataset 142a may be determined through collaborative activity, such as identifying that a particular dataset may be relevant to dataset 142a based on electronic social interactions among datasets and users. For example, data representations of other relevant dataset to which links may be formed may be made available via a dataset activity feed. A dataset activity feed may include data representing a number of queries associated with a dataset, a number of dataset versions, identities of users (or associated user identifiers) who have analyzed a dataset, a number of user comments related to a dataset, the types of comments, etc.). An example of a dataset activity feed is set forth in U.S. patent application Ser. No. 15/454,923, filed on Mar. 9, 2017, which is hereby incorporated by reference. Thus, dataset 142a may be enhanced via "a network for datasets" (e.g., a "social" network of datasets and dataset interactions). While "a network for datasets" need not be based on electronic social interactions among users, various examples provide for inclusion of users and user interactions (e.g., social network of data practitioners, etc.) to supplement the "network of datasets." According to various embodiments, one or more structural and/or functional elements described in FIG. 1A, as well as below, may be implemented in hardware or software, or both.

Figure 1B:
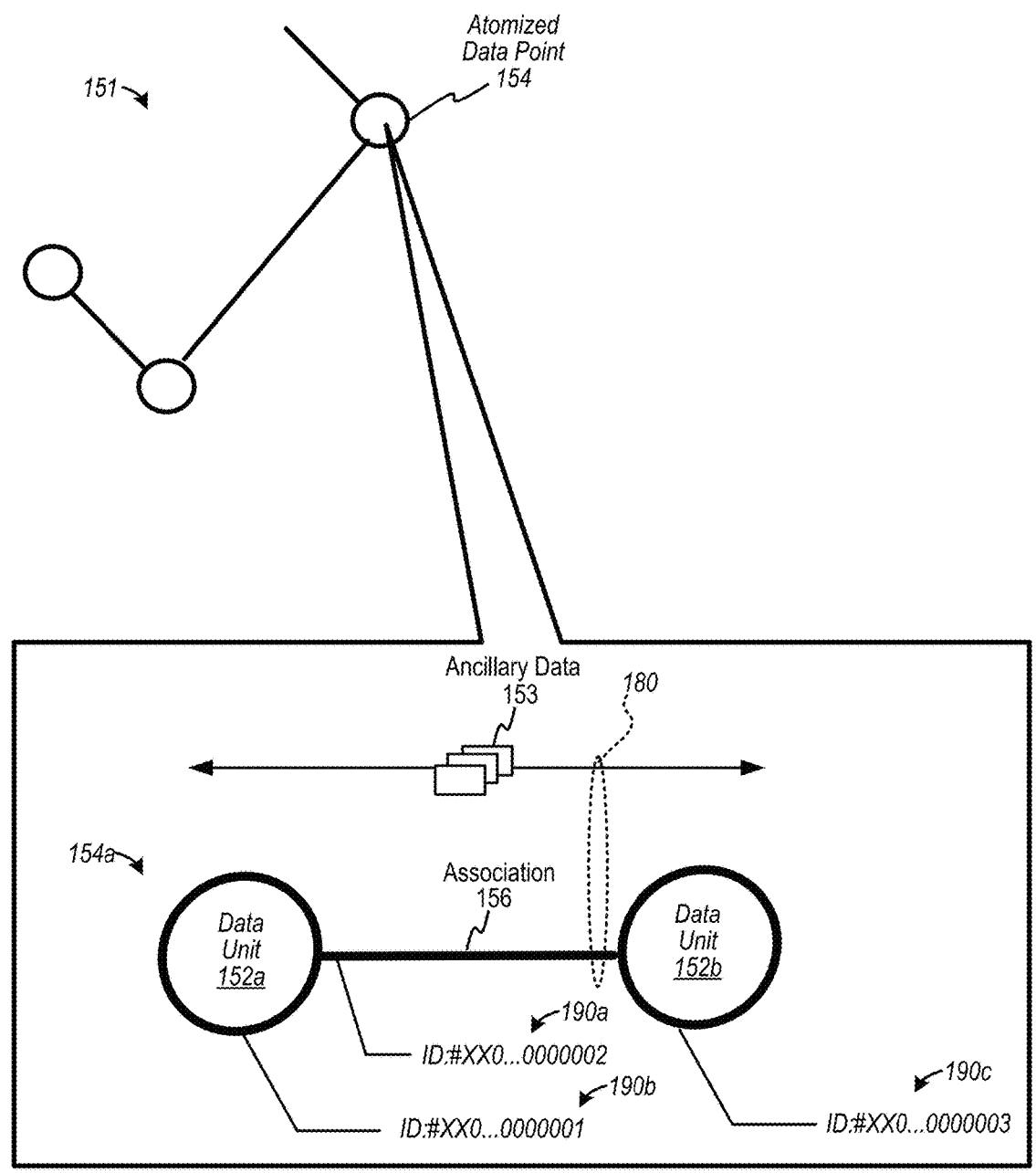
FIG. 1B is a diagram depicting an example of an atomized data point, according to some embodiments.

FIG. 1B is a diagram depicting an example of an atomized data point, according to some embodiments. Diagram 150 depicts a portion 151 of an atomized dataset that includes an atomized data point 154. In some examples, the atomized dataset is formed by converting a data format into a format associated with the atomized dataset. In some cases, portion 151 of the atomized dataset can describe a portion of a graph that includes one or more subsets of linked data. Further to diagram 150, one example of atomized data point 154 is shown as a data representation 154a, which may be represented by data representing two data units 152a and 152b (e.g., objects) that may be associated via data representing an association 156 with each other. One or more elements of data representation 154a may be configured to be individually and uniquely identifiable (e.g., addressable), either locally or globally in a namespace of any size. For example, elements of data representation 154a may be identified by identifier data 190a, 190b, and 190c.

In some embodiments, atomized data point 154a may be associated with ancillary data 503 to implement one or more ancillary data functions. For example, consider that association 156 spans over a boundary between an internal dataset, which may include data unit 152a, and an external dataset (e.g., external to a collaboration dataset consolidation), which may include data unit 152b. Ancillary data 153 may interrelate via relationship 180 with one or more elements of atomized data point 154a such that when data operations regarding atomized data point 154a are implemented, ancillary data 153 may be contemporaneously (or substantially contemporaneously) accessed to influence or control a data operation. In one example, a data operation may be a query and ancillary data 153 may include data representing authorization (e.g., credential data) to access atomized data point 154a at a query-level data operation (e.g., at a query proxy during a query). Thus, atomized data point 154a can be accessed if credential data related to ancillary data 153 is valid (otherwise, a request to access atomized data point 154a (e.g., for forming linked datasets, performing analysis, a query, or the like) without authorization data may be rejected or invalidated). According to some embodiments, credential data (e.g., passcode data), which may or may not be encrypted, may be integrated into or otherwise embedded in one or more of identifier data 190a, 190b, and 190c. Ancillary data 153 may be disposed in other data portion of atomized data point 154a, or may be linked (e.g., via a pointer) to a data vault that may contain data representing access permissions or credentials.

Atomized data point 154a may be implemented in accordance with (or be compatible with) a Resource Description Framework ("RDF") data model and specification, according to some embodiments. An example of an RDF data model and specification is maintained by the World Wide Web Consortium ("W3C"), which is an international standards community of Member organizations. In some examples, atomized data point 154a may be expressed in accordance with Turtle (e.g., Terse RDF Triple Language), RDF/XML, N-Triples, N3, or other like RDF-related formats. As such, data unit 152a, association 156, and data unit 152b may be referred to as a "subject," "predicate," and "object," respectively, in a "triple" data point. In some examples, one or more of identifier data 190a, 190b, and 190c may be implemented as, for example, a Uniform Resource Identifier ("URI"), the specification of which is maintained by the Internet Engineering Task Force ("IETF"). According to some examples, credential information (e.g., ancillary data 153) may be embedded in a link or a URI (or in a URL) or an Internationalized Resource Identifier ("IRI") for purposes of authorizing data access and other data processes. Therefore, an atomized data point 154 may be equivalent to a triple data point of the Resource Description Framework ("RDF") data model and specification, according to some examples. Note that the term "atomized" may be used to describe a data point or a dataset composed of data points represented by a relatively small unit of data. As such, an "atomized" data point is not intended to be limited to a "triple" or to be compliant with RDF; further, an "atomized" dataset is not intended to be limited to RDF-based datasets or their variants. Also, an "atomized" data store is not intended to be limited to a "triplestore," but these terms are intended to be broader to encompass other equivalent data representations.

Examples of triplestores suitable to store "triples" and atomized datasets (and portions thereof) include, but are not limited to, any triplestore type architected to function as (or similar to) a BLAZEGRAPH triplestore, which is developed by Systap, LLC of Washington, D.C., U.S.A.), any triplestore type architected to function as (or similar to) a STARDOG triplestore, which is developed by Complexible, Inc. of Washington, D.C., U.S.A.), any triplestore type architected to function as (or similar to) a FUSEKI triplestore, which may be maintained by The Apache Software Foundation of Forest Hill, Md., U.S.A.), and the like.

Figure 2:
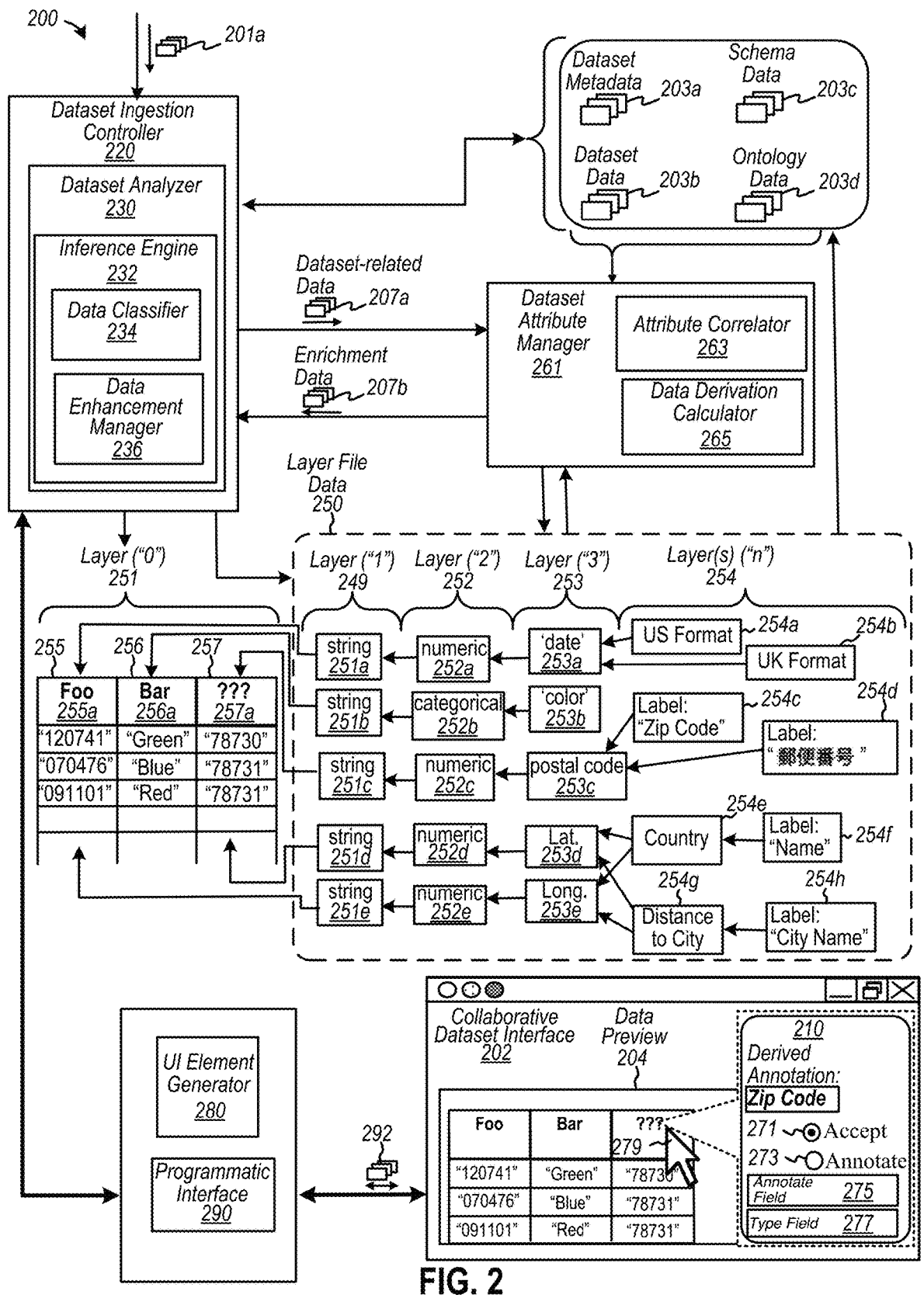
FIG. 2 is a diagram depicting an example of a dataset ingestion controller configured to generate a set of layer data files, according to some examples.

FIG. 2 is a diagram depicting an example of a data ingestion controller configured to generate a set of layer data files, according to some examples. Diagram 200 depicts a dataset ingestion controller 220 communicatively coupled to a dataset attribution manager 261, and is further coupled communicatively to one or both of a user interface ("UI") element generator 280 and a programmatic interface 290 to exchange data and/or commands (e.g., executable instructions) with a user interface, such as a collaborative dataset interface 202. According to various examples, dataset ingestion controller 220 and its constituent elements may be configured to detect exceptions or anomalies among subsets of data (e.g., columns of data) of an imported or uploaded set of data, and to facilitate corrective actions to negate data anomalies, whether automatically, semi-automatically (e.g., one or more calculated or predicted solutions from which a user may select), and manually (e.g., the user may annotate or otherwise correct exceptions). Further, dataset ingestion controller 220 may be configured to identify, infer, and/or derive dataset attributes with which to: (1) associate with a dataset via, for example, annotations (e.g., column headers), (2) determine a datatype (e.g., as a dataset attribute) for a subset of data in the dataset, (3) determine an inferred datatype for the subset of data (e.g., as an inferred dataset attribute), (4) determine a data classification for a subset of data in the dataset, (5), determine an inferred data classification, (6) derive one or more data structures, such as the creation of an additional column of data (e.g., temperature data expressed in degrees Fahrenheit) based on a column of temperature data expressed in degrees Celsius, (7) identify similar or equivalent dataset attributes associated with previously-uploaded or previously-accessed datasets to "enrich" the dataset by linking the dataset via the dataset attributes to other datasets, and (8) perform other data actions.

Dataset attribution manager 261 and its constituent elements may be configured to manage dataset attributes over any number of datasets, including correlating data in a dataset against any number of datasets to, for example, determine a pattern that may be predictive of a dataset attribute. For example, dataset attribution manager 261 may analyze a column that includes a number of cells that each includes five digits and matches a pattern of valid zip codes. Thus, dataset attribution manager 261 may classify the column as containing zip code data, which may be used to annotate, for example, a column header as well as forming links to other datasets with zip code data. One or more elements depicted in diagram 200 of FIG. 2 may include structures and/or functions as similarly-named or similarly-numbered elements depicted in other drawings, or as otherwise described herein, in accordance with one or more examples. Note, too, that while data structures described in this example, as well as in other examples described herein, may refer to a tabular data format, various implementation herein may be described in the context of any type of data arrangement. The descriptions of using a tabular data structure are illustrative and are not intended to be limiting. Therefore, the various implementations described herein may be applied to many other data structures.

Dataset ingestion controller 220, at least in some embodiments, may be configured to generate layer file data 250, which may include a number of data arrangements that each may constitute a layer file. Notably, a layer file may be used to enhance, modify or annotate data associated with a dataset, and may be implemented as a function of contextual data, which includes data specifying one or more characteristics of the context or usage of the data. Data and datasets may be enhanced, modified or annotated based on contextual data, such as data-related characteristics (e.g., type of data, qualities and quantities of data accesses, including queries, purpose or objective of datasets, such as deriving vaccines for Zika virus, etc.), time of day, user-related characteristics (e.g., type of user, demographics of user, citizenship of user, location of user, etc.), and other contextually-related characteristics that may guide creation of a dataset or the linking thereof. Note, too, that the use of layer files need not modify the underlying data. Further to the example shown, a layer file may include a link or pointer that references a location (directly or indirectly) at which related dataset data persists or may be accessed. Arrowheads are used in this example to depict references to layered data. A layer file may include layer property information describing how to treat (i.e., use) the data in the dataset (e.g., functionally, visually, etc.). In some instances, "layer files" may be layered upon (e.g., in reference to) another layer, whereby layers may be added, for example, to sequentially augment underlying data of the dataset. Therefore, layer files may provide enhanced information regarding an atomized dataset, and adaptability to present data or consume data based on the context (e.g., based on a user or data practitioner viewing or querying the data, a time of day, a location of the user, the dataset attributes associated with linked datasets, etc.). A system of layer files may be adaptive to add or remove data items, under control of the dataset ingestion controller 220 (or any of its constituent components), at the various layers responsive to expansions and modifications of datasets (e.g., responsive to additional data, such as annotations, references, statistics, etc.).

To illustrate generation of layer file data 250, consider the following example. Dataset ingestion controller 220 is configured to receive data from data file 201*a*, which may be arranged in a tabular format including columns and rows (e.g., based on XLS file format), or may be in CSV or free-form format. In this example, the tabular data is depicted at layer ("0") 251. In this example, layer ("0") 251 includes a data structure including subsets of data 255, 256, and 257. As shown, subset of data 255 is shown to be a column of numeric data associated with "Foo" as column header 255*a*. Subset of data 256 is shown to be a column of categorical data (e.g., text strings representing colors) associated with "Bar" as column header 256*a*. And subset of data 257 is a column of string data that may be of numeric datatype and is without an annotated column header ("???") 257*a*.

Next, consider operation of dataset ingestion controller 220 in relation to ingested data ("layer '0'") 251. Dataset ingestion controller 220 includes a dataset analyzer 230, which may be configured to analyze data 251 to detect data entry exceptions and irregularities (e.g., whether a cell is empty or includes non-useful data, whether a cell includes non-conforming data, whether there are any missing annotations or column headers, etc.). In this example, dataset analyzer 230 may analyze data in columns of data 255, 256, and 257 to detect that column 257 is without descriptive data representing a column header 257*a*. As shown, dataset analyzer 230 includes an inference engine 232 that may be configured to infer or interpret a dataset attribute (e.g., as a derived attribute) based on analyzed data. Further, inference engine 232 may be configured to infer corrective actions to resolve or compensate for the exceptions and irregularities, and to identify tentative data enrichments (e.g., by joining with, or linking to, other datasets) to extend the data beyond that which is in data file 201*a*. So in this example, dataset analyzer 230 may instruct inference engine 232 to participate in correcting the absence of the column description.

In at least one example, raw or original source data may be extracted from or identified in layer 251 to form a layer ("1") 249. In this case, layer ("1") 249 is formed to include strings of data (e.g., strings 251*a* to 251*e*), such as strings of alpha-numeric characters. At layer 249, may be viewed as "raw" data that may be used to preserve the underlying source of data regardless of, for example, subsequent links from subsequent layer file data. Hence, a transformation may be performed in a lossless manner that may be reversible (e.g., such as in a case in which at least portion of data is transformed between tabular data structures, relational data schemas, etc., and graph data structures, linked data schema, etc.). Inference engine 232 may be configured to infer or derive dataset attributes or other information from analyzing one or more data strings 251*a* to 251*e*.

Inference engine 232 is shown to include a data classifier 234, which may be configured to classify subsets of data (e.g., each subset of data as a column) in data file 201*a* as a particular data classification, such as a particular data type, a particular annotation, etc. According to some examples, data classifier 234 may be configured to analyze a column of data to infer a datatype of the data in the column or a categorical variable associated with the column. For instance, data classifier 234 may analyze the column data to automatically infer that the columns include one of the following datatypes: an integer, a string, a Boolean data item, a categorical data item, a time, etc. In the example shown, data classifier 234 may determine or infer, automatically or otherwise, that data in columns 255 and 256 (and string data 251*a* and 251*b*, respectively) are a numeric datatype and categorical data type, respectively. This information may be stored as dataset attribute ("numeric") 252*a* and dataset attribute ("categorical") 252*b* at layer ("2") 252 (e.g., in a layer file). Similarly, data classifier 234 may determine or infer data in column 257 (and string data 251*c*) is a numeric datatype and may be stored as dataset attribute ("numeric") 252*c* at layer 252. The dataset attributes in layer 252 are shown to reference respective columns via, for example, pointers.

Data classifier 234 may be configured to analyze a column of data to infer or derive a data classification for the data in the column. In some examples, a datatype, a data classification, etc., as well any dataset attribute, may be derived based on known data or information (e.g., annotations), or based on predictive inferences using patterns in data 203*a* to 203*d*. As an example of the former, consider that data classifier 234 may determine data in columns 255 and 256 can be classified as a "date" (e.g., MM/DD/YYYY) and a "color," respectively. "Foo" 255*a*, as an annotation, may represent the word "date," which can replace "Foo" (not shown). Similarly, "Bar" 256*a* may be an annotation that represents the word "color," which can replace "Bar" (not shown). Using text-based annotations, data classifier 234 may be configured to classify the data in columns 255 and 256 as "date information" and "color information," respectively. Data classifier 234 may generate data representing as dataset attributes ("date") 253*a* and ("color") 253*b* for storage as at layer ("3") 253 of a layer file, or in any other layer file that references dataset attributes 252*a* and 252*b* at layer 252. As to the latter, a datatype, a data classification, etc., as well any dataset attribute, may be derived based on predictive inferences (e.g., via deep and/or machine learning, etc.) using patterns in data 203*a* to 203*d*. In this case, inference engine 232 and/or data classifier 234 may detect an absence of annotations for column header 257*a*, and may infer that the numeric values in column 257 (and string data 251*c*) each includes five digits, and match patterns of number indicative of valid zip codes. Thus, dataset classifier 234 may be configured to classify (e.g., automatically) the digits as constituting a "zip code" as a categorical variable, and to generate, for example, an annotation "postal code" to store as dataset attribute 253*c*. While not shown in FIG. 2, consider another illustrative example. Data classifier 234 may be configured to "infer" that two letters in a "column of data" (not shown) of a tabular, pre-atomized dataset includes country codes. As such, data classifier 234 may "derive" an annotation (e.g., representing a data type, data classification, etc.) as a "country code," such country codes AF, BR, CA, CN, DE, JP, MX, UK, US, etc. Therefore, the derived classification of "country code" may be referred to as a derived attribute, which, for example, may be stored in one or more layer files in layer file data 250. According to some embodiments, data classifier 234 may be configured to generate data representing classified dataset attributes or categorical data, or the like.

Also, a dataset attribute, datatype, a data classification, etc. may be derived based on, for example, data from user interface data 292 (e.g., based on data representing an annotation entered via user interface 202). As shown, collaborative dataset interface 202 is configured to present a data preview 204 of the set of data 201*a* (or dataset thereof), with "???" indicating that a description or annotation is not included. A user may move a cursor, a pointing device, such as pointer 279, or any other instrument (e.g., including a finger on a touch-sensitive display) to hover or select the column header cell. An overlay interface 210 may be presented over collaborative dataset interface 202, with a proposed derived dataset attribute "Zip Code." If the inference or prediction is adequate, then an annotation directed to "zip code" may be generated (e.g., semi-automatically) upon accepting the derived dataset attribute at input 271. Or, should the proposed derived dataset attribute be undesired, then a replacement annotation may be entered into annotate field 275 (e.g., manually), along with entry of a datatype in type field 277. To implement, the replacement annotation will be applied as dataset attribute 253*c* upon activation of user input 273. Thus, the "postal code" may be an inferred dataset attribute (e.g., a "derived annotation") and may indicate a column of 5 integer digits that can be classified as a "zip code," which may be stored as annotative description data stored at layer three 253 (e.g., in a layer three ("L3") file). Thus, the "postal code," as a "derived annotation," may be linked to the classification of "numeric" at layer one 252. In turn, layer one 252 data may be linked to 5 digits in a column at layer zero 251). Therefore, an annotation, such as a column header (or any metadata associated with a subset of data in a dataset), may be derived based on inferred or derived dataset attributes, as described herein.

Further to the example in diagram 200, additional layers ("n") 254 may be added to supplement the use of the dataset based on "context." For example, dataset attributes 254*a* and 254*b* may indicate a date to be expressed in U.S. format (e.g., MMDDYYYY) or U.K. format (e.g., DDMMYYYY). Expressing the date in either the US or UK format may be based on context, such as detecting a computing mobile device is in either the United States or the United Kingdom. In some examples, data enrichment manager 236 may include logic to determine the applicability of a specific one of dataset attributes 254*a* and 254*b* based on the context. In another example, dataset attributes 254*c* and 254*d* may indicate a text label for the postal code ought to be expressed in either English or in Japanese. Expressing the text in either English or Japanese may be based on context, such as detecting a computing mobile device is in either the United States or Japan. Note that a "context" with which to invoke different data usages or presentations may be based on any number of dataset attributes and their values, among other things.

In yet another example, data classifier 234 may classify a column of integers as either a latitudinal or longitudinal coordinate and may be formed as a derived dataset attribute for a particular column, which, in turn, may provide for an annotation describing geographic location information (e.g., as a dataset attribute). For instance, consider dataset attributes 252d and 252e describe numeric datatypes for columns 255 and 257, respectively, and dataset attributes 253d and 253e are classified as latitudinal coordinates in column 255 and longitudinal coordinates in column 257. Dataset attribute 254e, which identifies a "country" that references dataset attributes 253d and 253, is shown associated with a dataset attribute 254f, which is an annotation indicating a name of the country and references dataset attribute 254e. Similarly, dataset attribute 254g, which identifies a "distance to a nearest city" (e.g., a city having a threshold least a certain population level), may reference dataset attributes 253d and 253e. Further, a dataset attribute 254h, which is an annotation indicating a name of the city for dataset attribute 254g, is also shown stored in a layer file at layer 254.

Dataset attribution manager 261 may include an attribute correlator 263 and a data derivation calculator 265. Attribute correlator 263 may be configured to receive data, including attribute data (e.g., dataset attribute data), from dataset ingestion controller 220, as well as data from data sources (e.g., UI-related/user inputted data 292, and data 203a to 203d), and from system repositories (not shown). Attribute correlator 263 may be configured to analyze the data to detect patterns or data classifications that may resolve an issue, by "learning" or probabilistically predicting a dataset attribute through the use of Bayesian networks, clustering analysis, as well as other known machine learning techniques or deep-learning techniques (e.g., including any known artificial intelligence techniques). Attribute correlator 263 may further be configured to analyze data in dataset 201a, and based on that analysis, attribute correlator 263 may be configured to recommend or implement one or more added or modified columns of data. To illustrate, consider that attribute correlator 263 may be configured to derive a specific correlation based on data 207a that describe two (2) columns 255 and 257, whereby those two columns may be sufficient to add a new column as a derived column.

In some cases, data derivation calculator 265 may be configured to derive the data in a new column mathematically via one or more formulae, or by performing any computational calculation. First, consider that dataset attribute manager 261, or any of its constituent elements, may be configured to generate a new derived column including the "name" 254f of the "country" 254e associated with a geolocation indicated by latitudinal and longitudinal coordinates in columns 255 and 257. This new column may be added to layer 251 data, or it can optionally replace columns 255 and 257. Second, consider that dataset attribute manager 261, or any of its constituent elements, may be configured to generate a new derived column including the "distance to city" 254g (e.g., a distance between the geolocation and the city). In some examples, data derivation calculator 265 may be configured to compute a linear distance between a geolocation of, for example, an earthquake and a nearest city of a population over 100,000 denizens. Data derivation calculator 265 may also be configured to convert or modify units (e.g., from kilometers to miles) to form modified units based on the context, such as the user of the data practitioner. The new column may be added to layer 251 data. One example of a derived column is described in FIG. 20 and elsewhere herein. Therefore, additional data may be used to form, for example, additional "triples" to enrich or augment the initial dataset.

Inference engine 232 is shown to also include a dataset enrichment manager 236. Data enrichment manager 236 may be configured to analyze data file 201a relative to dataset-related data to determine correlations among dataset attributes of data file 201a and other datasets 203b (and attributes, such as dataset metadata 203a), as well as schema data 203c, ontology data 203d, and other sources of data. In some examples, data enrichment manager 236 may be configured to identify correlated datasets based on correlated attributes as determined, for example, by attribute correlator 263 via enrichment data 207b that may include probabilistic or predictive data specifying, for example, a data classification or a link to other datasets to enrich a dataset. The correlated attributes, as generated by attribute correlator 263, may facilitate the use of derived data or link-related data, as attributes, to form associate, combine, join, or merge datasets to form collaborative datasets. To illustrate, consider that a subset of separately-uploaded datasets are included in dataset data 203b, whereby each of these datasets in the subset include at least one similar or common dataset attribute that may be correlatable among datasets. For instance, each of datasets in the subset may include a column of data specifying "zip code" data. Thus, each of datasets may be "linked" together via the zip code data. A subsequently-uploaded set of data into dataset ingestion controller 220 that is determined to include zip code data may be linked via this dataset attribute to the subset of datasets 203b. Therefore, a dataset formatted based on data file 201a (e.g., as an annotated tabular data file, or as a CSV file) may be "enriched," for example, by associating links between the dataset of data file 201a and other datasets 203b to form a collaborative dataset having, for example, and atomized data format. While FIG. 2 depicts layer data hierarchically arranged in layer 249, in layer 252, layer 253, and layers 254 and referencing a lower layer of layer data, these depictions are not intended to be limiting. Thus, each subset of layer in a layer may link to any number of corresponding data attributes or layer data in any layer. For example, dataset attribute 254d may link to or reference layer data (e.g., dataset attribute) 254e, as well as linking to each of layer data 253c, layer data 252c, layer data 251c, or any other layer data. Accordingly, a layer, such as layer 254, may be implemented (e.g., as in a query) while referencing some lower layered data while omitting references to one or more other intervening lower layered data. Thus, an example query may be formed to use layers A (e.g., layer data 254f) and B (e.g., layer data 253d), but not layer C (e.g., layer data 254e).

Figure 3:
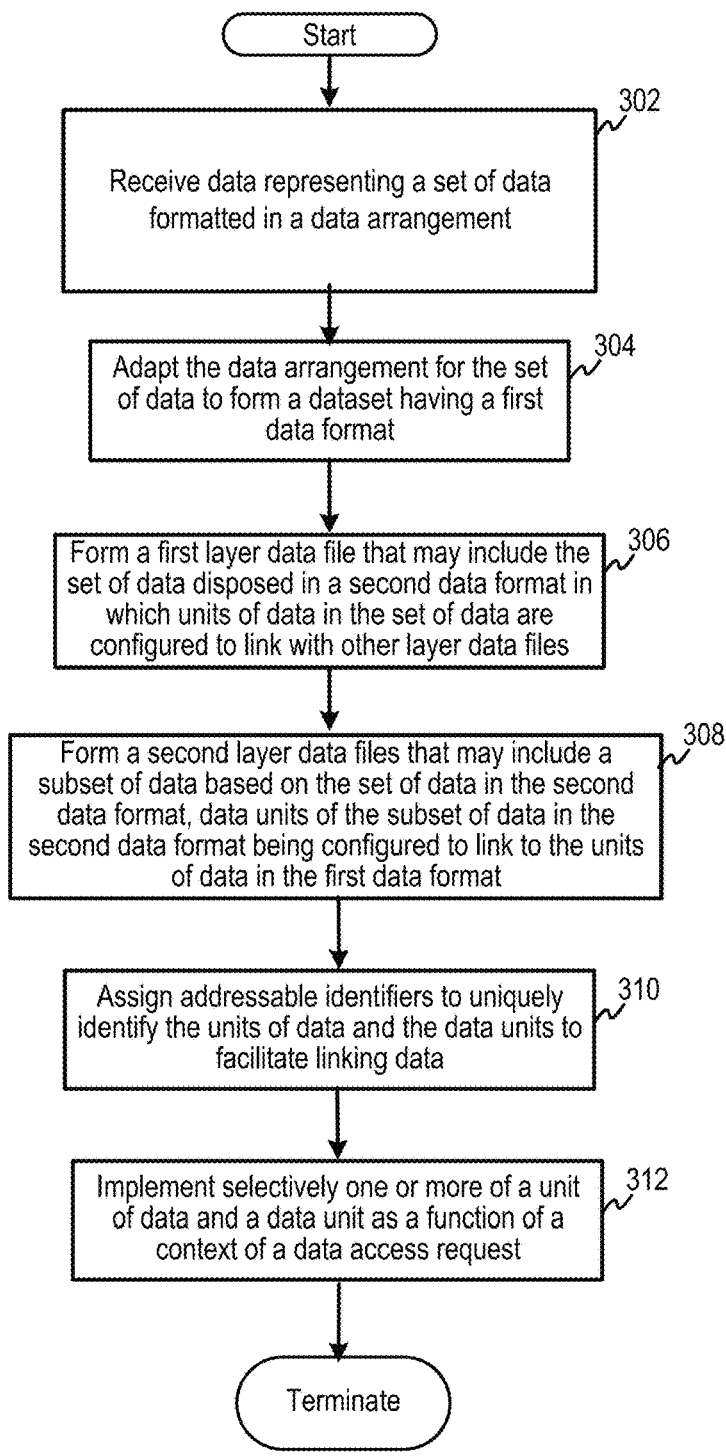
FIG. 3 is a diagram depicting a flow diagram as an example of forming layer file data for collaborative datasets, according to some embodiments.

FIG. 3 is a diagram depicting a flow diagram as an example of forming layer file data for collaborative datasets, according to some embodiments. Flow 300 may be an example of creating layered filed data associated with a dataset, such as a collaborative dataset, based on supplemental data, which may be added by deriving or inferring data or data attributes. Or, the supplemental data may be added by user (e.g., manual annotations). At 302, a set of data formatted in a data arrangement may be received, such as in example formats CSV, XML, JSON, XLS, MySQL, binary, free-form, etc. An example of a free-form data format is a spread sheet data arrangement (e.g., XLS data file) with which data is disposed in a "loose" data arrangement, such that data may not reside in an expected or fixed location.

Flow 300 may be directed to forming hierarchical layer data files including a hierarchy of subsets of data. Each hierarchical subset of data may be configured to link to units of data in a first data format, such as an original data arrangement or a tabular data arrangement format. The hierarchy of subsets of data are configured to link to original data of the set of data to provide access to the original underlying source data in a lossless manner. Thus, the hierarchical layer data files facilitate a reversible transformation without (or substantially without) loss of semantic information. Note that a hierarchy of layer data files need not imply a ranking or level of importance of one layer over another layer, and may indicate, for example, levels of interrelationships (e.g., in a tree-like sets of links). According to some embodiments, flow 300 may include selectively implementing data units by determining data representing a context of a data access request, such as a context in which a query is initiated. Also, flow 300 may include selecting one or more files of a first layer data files, a second layer data files, and any other hierarchical layer data files based on, for example, a context. At least a group of layer files may be omitted (e.g., not selected) as a function of the context (e.g., data access request). Thus, an omission of the group of layer files need not affect access to original data, or need not otherwise affect data operations that include accesses to the underlying source data. In some examples, flow 300 may include associating a first subset of nodes, such as row nodes, and a second subset of nodes, such as column nodes, to a dataset. Further, flow 300 may include associating at least a third subset of nodes, such as a derived column node, to a subset of data. The derived column node may be linked to either the row nodes or the column nodes, or both. Further, a number of subsets of nodes may be associated with a hierarchy of subsets of data (e.g., higher layers of layer files) that, in turn, link to or include one or more nodes of the row nodes, the column nodes, the derived column nodes. Any of these nodes may be selectively implemented as a function of the context of, for example, a data access request.

At 304, a data arrangement for the set of data may be adapted to form a dataset having a first data format. For example, the data arrangement may be adapted to form the dataset having the first data format by forming a tabular data arrangement format as the first data format. In some examples, the formation of a tabular data arrangement may be conceptual, whereby subsets or units of data may be associated with a position in a table (e.g., a particular row, column, or a combination thereof). Thus, a dataset may be associated with a table and the corresponding data need not be disposed in a table data structure. For example, each unit of data in the set of data may be associated with a row (e.g., via a row node representation) and a column (e.g., via a column node representation). The data is thus disposed in or associate with a tabular data arrangement.

At 306, a first layer data file may be formed such that the first layer data file may include a set of data disposed in a second data format. The units of data in the set of data may be configured to link with other layer data files. In some examples, forming one or more first layer data files at 306 may include transforming a set of data from a first format to a dataset having a second data format in which the data of the dataset includes linked data. Also, a first subset of nodes (e.g., row nodes) and a second subset of nodes (e.g., column nodes) may be associated with a dataset. At least one node from each of the row nodes and the column nodes may identify a unit of data. According to some examples, the formation of one or more first and second layer data files may include transforming the first and the second layer data files into an atomized dataset format.

At 308, a second layer data files may be formed to include a subset of data based on a set of data in a second data format. Data units of the subset of data in the second data format may be configured to link to the units of data in the first data format. In some examples, forming one or more first second layer data files at 308 may include forming a subset of data based on a set of data, the subset of data being associated with at least a third subset of nodes. An example of a third subset of nodes includes nodes associated with derived or inferred data based on deriving data from the subset of data (e.g., a column of data). The third subset of nodes may be associated with a first subset of nodes (e.g., row nodes) and a second subset of nodes (e.g., column nodes). In one example, a column may be derived to form a derived column that includes derived data representing a categorical variable.

At 310, addressable identifiers may be assigned to uniquely identify units of data and data units to facilitate linking data. For example, data attributes or layer data constituting data units in a second layer file (e.g., a higher hierarchical layer) may link or reference data attributes or layer data constituting units of data in a first layer file (e.g., a lower hierarchical layer). In some examples, the addressable identifiers may be uniquely used to identify nodes in a first subset and a second subset of nodes to facilitate linking data between a set of data in a first format and a dataset in a second data format. Examples of addressable identifiers include an Internationalized Resource Identifier ("IRP"), a Uniform Resource Identifier ("URI"), or any other identifier configured to identify a node. In some examples, a node may refer to a data point, such as a triple.

At 312, one or more of a unit of data and a data unit may be selectively implemented as a function of a context of a data access request. Thus, either a unit of data in one layer or a data unit in another layer, or both, may be implemented to perform a data operation, such as performing a query.

Figure 4:
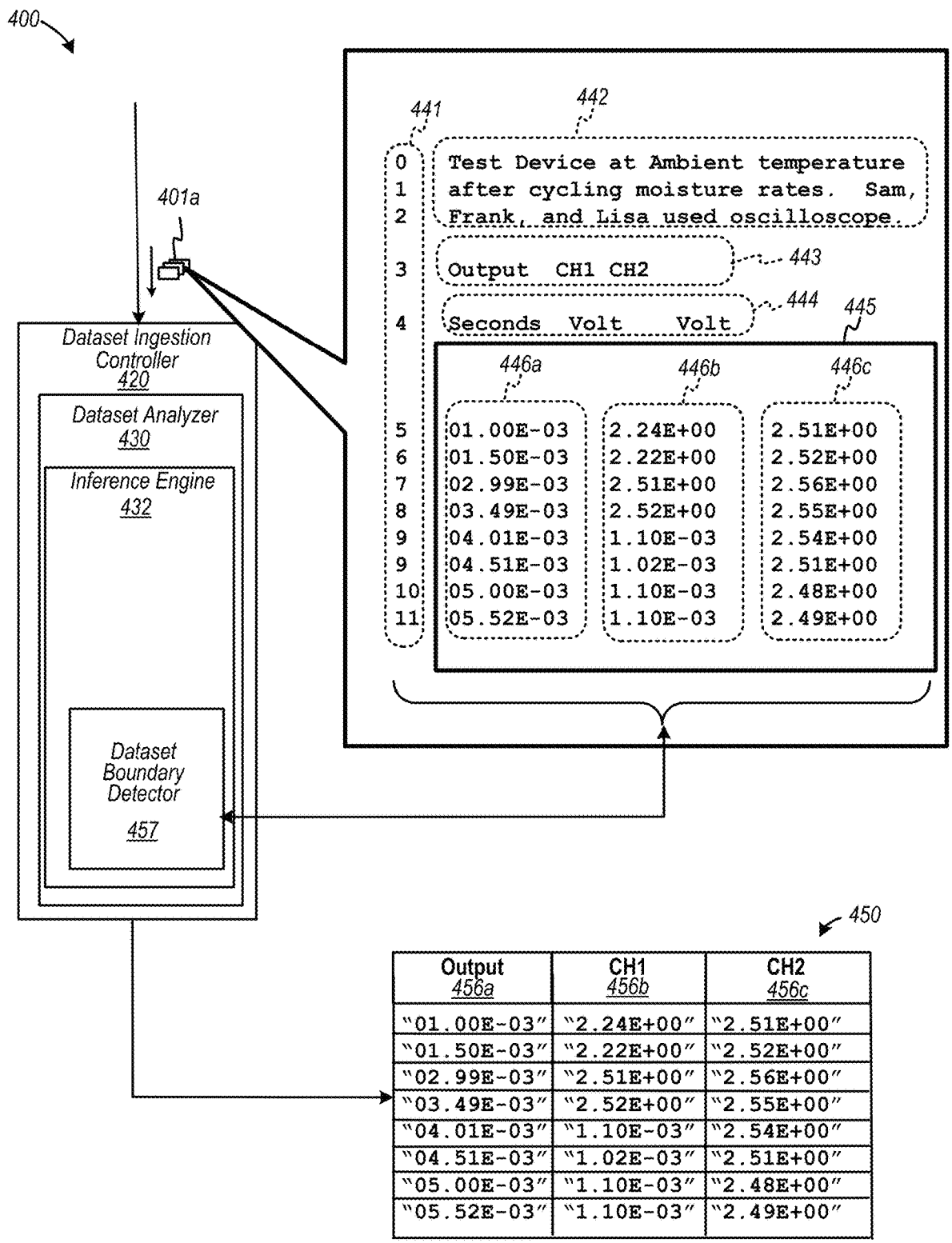
FIG. 4 is a diagram depicting a dataset ingestion controller configured to determine an arrangement of data, according to some examples.

FIG. 4 is a diagram depicting a dataset ingestion controller configured to determine an arrangement of data, according to some examples. Diagram 400 depicts a dataset ingestion controller 420 including a dataset analyzer 430, an inference engine 432, and a dataset boundary detector 457. Dataset ingestion controller 420 may receive a set of data that may be formatted loosely or in a free-form-like arrangement of data, whereby dataset data values of interest may be distributed adjacent to, or among, for example, characters that may non-dataset data, such as titles, row or column indices, descriptions of experiments, column header information, units of data (e.g., time units, such as minutes, seconds, etc., weight units, such as kilograms, grams, etc.), and other like non-dataset information. For example, spreadsheets, such as XLS-formatted data files, may include data disposed arbitrarily among a number of cells or fields, whereby a significant number of cells or fields may be empty. In some examples, inference engine 432 may be configured to infer an arrangement of a set of data, such as a number of rows and columns disposed among non-dataset data. In one or more implementations, elements depicted in diagram 400 of FIG. 4 may include structures and/or functions as similarly-named or similarly-numbered elements depicted in other drawings.

According to some examples, dataset boundary detector 457 may be configured to determine a boundary 445 that may demarcate a set of data in, for example, a tabular data arrangement. Dataset boundary detector 457 or inference engine 432, or both, may infer that values of data and arrangements of those values, such as in arrangements 446a, 446b, and 446c, constitute respective columns of a data table spanning rows 5 to 11. Further, inference engine 432 may be configured to identify non-conforming groups of data, such as group 441, which may be an index of row numbers. Group 441 may be identified as a pattern of non-dataset data, and thereby excluded from inclusion in a data table. Similarly, inference engine 432 may be configured to identify group 442 of descriptive text as a non-conforming group of data, thereby identifying group 442 to exclude from a data table.

Dataset boundary detector 457 may be configured to identify multiple rows (e.g., rows 3 and 4) as including potential header data 443 and 444. In one example, inference engine 432 may operate to identify three (3) separate strings of data in data 443 and 444, which may correspond to the number of columns in boundary 445. The strings of data 443 and 444 may be matched against a database that includes terms (e.g., engineering measurement terms, including units of voltage (i.e., "volt") and time (i.e., "second"). String portions "CH" may be identified as a common abbreviation for a "channel," whereas an "output" may be typically used in association with a circuit output voltage. Therefore, logic in inference engine 432 may identify "Output in seconds" as a first header, "Channel 1 in volts" as a second header, and "Channel 2 in volts" as a third header, which may correspond to columns 446a, 446b, and 446c, respectively. Data ingestion controller 420, thus, may generate a table of data 450 including columns 456a, 456b, and 456c. In view of the foregoing, dataset ingestion controller 420 and its elements may be configured to automate data ingestion of a set of data arranged in free-form, non-fixed, or arbitrary arrangements of data. Therefore, dataset ingestion controller 420 facilitates automated formation of atomized dataset that may be linked to tabular data formats for purposes of presentation (e.g., via a user interface), or for performing a query (e.g., using SQL or relational languages, or SPARQL or graph-querying languages), or any other data operation.

Figure 5:
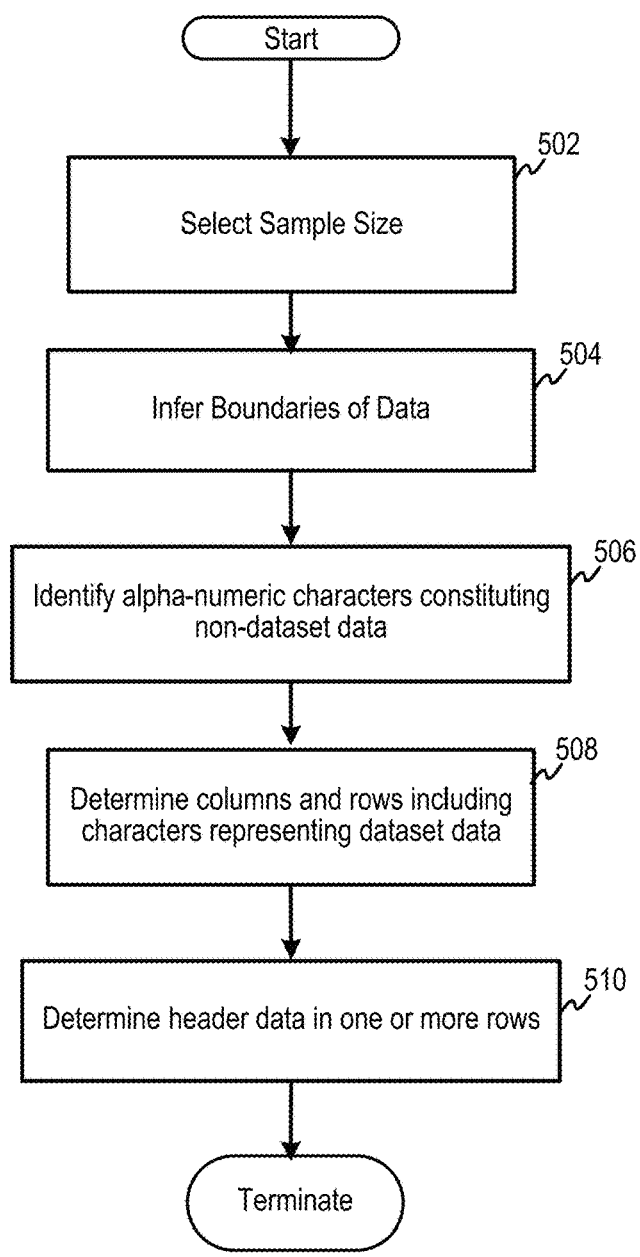
FIG. 5 is a diagram depicting a flow diagram as an example of determining an arrangement of data, according to some embodiments.

FIG. 5 is a diagram depicting a flow diagram as an example of determining an arrangement of data, according to some embodiments. Flow 500 may be directed to determining an arrangement of data disposed among other non-dataset data, and inferring, for example, a set of rows and columns constituting a set of data. At 502, a sample size is selected with which to analyze a data file from which a set of data is inferred. In one example, a sample size may be 50 rows for analysis. However, a sample size may be any number of rows or groupings of data.

At 504, boundaries of data may be inferred. In some examples, patterns of data may be identified in a sample of rows. For each row, a start column at which data is detected and an end column at which data is detected may be identified to determine a length. Over the sample, a modal start column and a modal end column may be determined to calculate a modal length and a modal maximum length, among other pattern attributes, according to some examples. A common start column and common end column, over one or more samples, may indicate a left boundary and a right boundary, respectively, of a set of data from which a dataset may be determined. Rows associated with the common (e.g., modal) start and end columns may describe the top and bottom boundaries of the set of data.

At 506, subsets of characters constituting non-dataset data may be identified. Examples of such characters include alpha-numeric characters, ASCII characters, Unicode characters, or the like. For example, an index of each row may be identified as a sequence of numbers, whereby the grouping of index values may be excluded from the determination of the set of data. Similarly, descriptive text detailing, for example, the type of experimental or conditions in which the data was generated may be accompanied by a title. Such descriptive text may be identified as non-dataset data, and, thus, excluded from the determination of the set of data. Other patterns or groupings of data may be identified as being non-conforming to an inferred set of data, and thereby be excluded from further consideration as a portion of the set of data. For instance, relatively long strings (e.g., 64 characters or greater) may be deemed data rather than descriptive text. In some cases, columns of Boolean types of data and numbers may be identified as dataset data.

At 508, columns and rows including characters representing dataset data may be determined based on boundaries of the set of data as calculated in, for example, 504. Also, a tabular arrangement of the set of data may be identified such that the rows and columns include data for forming a dataset.

At 510, header data may be determined in one or more rows of a sample of rows. In one example, a row including tentative header data may be identified tentatively as a header if, for example, the row is associated with a modal length and/or a maximum length (e.g., between an end column and a start column). In some cases, multiple rows may be analyzed to determine whether data spanning multiple rows may constitute header information. As such, header data may be identified and related to the columns of data in the set of data. Note that the above-identified approach to determining header data is non-limiting, and other approaches of determining header data may be possible in view of ordinarily skilled artisans.

Note that the above 502, 504, 506, 508, and 510 may be performed in any order, two or more of which may be performed in series or in parallel, according to various examples.

Figure 6:
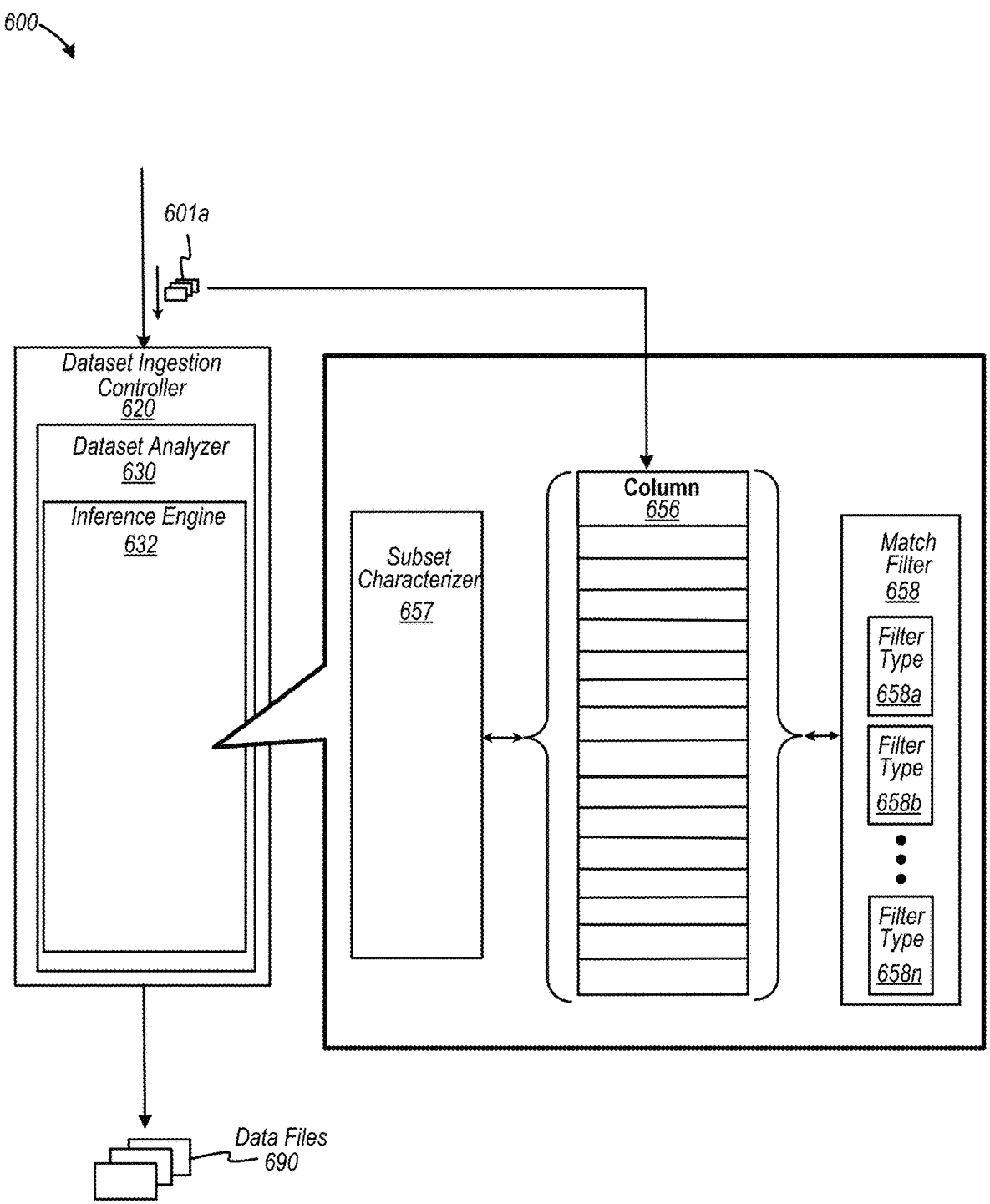
FIG. 6 is a diagram depicting another dataset ingestion controller configured to determine a classification of an arrangement of data, according to some examples.

FIG. 6 is a diagram depicting another dataset ingestion controller configured to determine a classification of an arrangement of data, according to some examples. Diagram 600 depicts a dataset ingestion controller 620 including a dataset analyzer 630, and an inference engine 632. Further, inference engine 632 may be configured to further include a subset characterizer 657 and a match filter 658, either or both of which may be implemented. According to various examples, subset characterizer 657 and match filter 658 each may be configured to classify units of data in, for example, a column 656 to determine one or more of a datatype, a categorical variable, or any dataset attribute associated with column 656. In one or more implementations, elements depicted in diagram 600 of FIG. 6 may include structures and/or functions as similarly-named or similarly-numbered elements depicted in other drawings.

Subset characterizer 657 may be configured to characterize subsets of data and form a reduced data representation of a characterized subset of data. Subset characterizer 657 may be further configured to calculate a degree of similarity among groups of characterized subsets of data, whereby characterized subsets of data that are highly similar are indicative that the subset of data include the same or equivalent data. In operation, subset characterizer 657 may be configured to access known characterized subsets of data (e.g., a column of data or portions thereof) that may be associated with data representing reduced or compressed representations. According to some examples, the reduced or compressed representations may be referred to as a signature and may be formed to implement, for example, "minhash" or "minhashing" techniques that are known to compress relatively large sets of data to determine degrees of similarity among characterized subsets, which may be compressed versions thereof. In some cases, characterized subsets may be determined by implementing "locality-sensitive hashing," or LSH. The degree of similarity may be determined by a distance between characterized subsets, whereby the distance may be computed based on a Jaccard similarity coefficient to identify a categorical variable for inclusion in data files 690, according to some examples.

Match filter 658 may include any number of filter types 658a, 658b, and 658n, each of which may be configured to receive a stream of data representing a column 656 of data. A filter type, such as filter types 658a, 658b, and 658n, may be configured to compute one of two states indicative of whether there is a match to identify a categorical variable. In at least some examples, filter types 658a, 658b, and 658n are implemented as probabilistic filters (e.g., Bloom filters) each configured to determine whether a subset of data is either "likely" or "definitely not" in a set of data. Likely subsets of data may be included in data files 690. In some examples, a stream of data representing a column 656 may be processed to compress subsets of data (e.g., via hashing) to apply to each of filter types 658a, 658b, and 658n. For example, filter types 658a, 658b, and 658n may be predetermined (e.g., prefilled as bloom filter) for categories of interest. A stream of data representing a column 656, or compressed representations thereof (e.g., hash signatures), may be applied to one or more Bloom filters to compare against categorical data. Consider an event in which column 656 includes 98% of data that matches a category "state abbreviations." Perhaps column 656 includes a typographical error or a U.S. territory, such as the U.S. Virgin Islands or Puerto Rico, which are not states but nonetheless have postal abbreviations. In some examples, inference engine 632 may be configured to infer a correction for typographical error. For example, if a state abbreviation for Alaska is "AK," and an instance of "KA" is detected in column 656, inference engine 632 may predict a transposition error and corrective action to resolve the anomaly. Dataset analyzer 630 may be configured to generate a notification to present in a user interface that may alert a user that less than 100% of the data matches the category "state abbreviations," and may further present the predicted remediation action, such as replacing "KA" with "AK," should the user so select. Or, such remedial action may be implemented automatically if a confidence level is sufficient enough (e.g., 99.8%) that the replacement of "KA" with "AK" resolves the anomalous condition. In view of the foregoing, inference engine 632 may be configured to automatically determine categorical variables (e.g., classifications of data) when ingesting, for example, data and matching against, for example, 50 to 500 categories, or greater.

Figure 7:
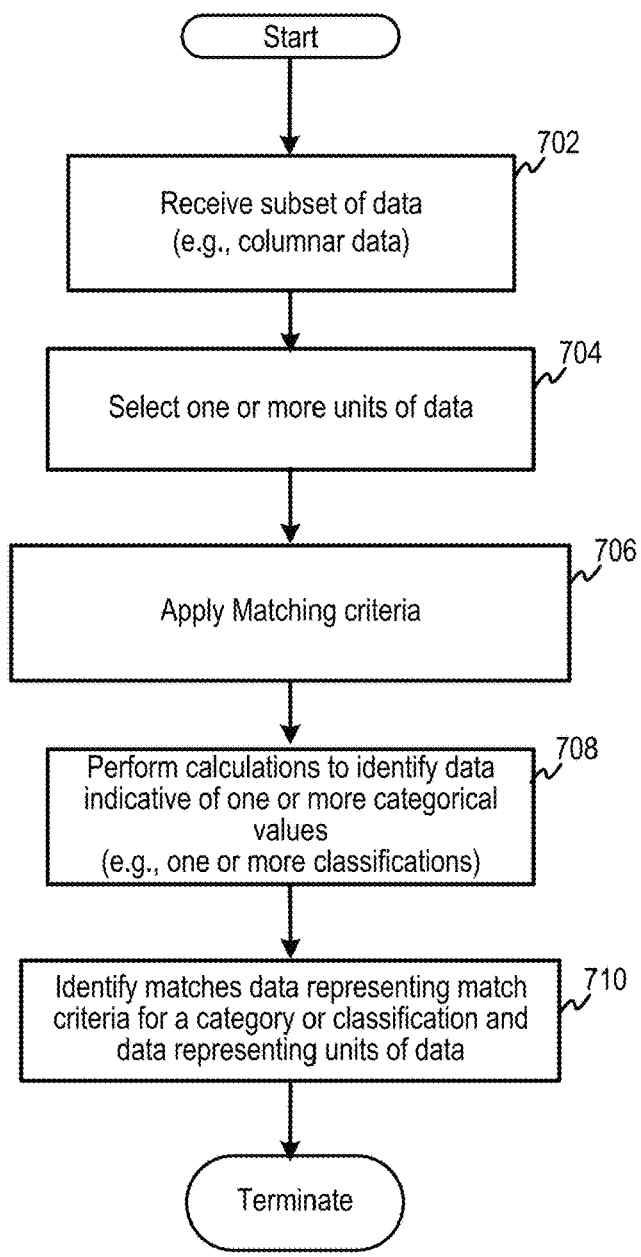
FIG. 7 is a diagram depicting a flow diagram as an example of determining a classification of an arrangement of data, according to some embodiments.

FIG. 7 is a diagram depicting a flow diagram as an example of determining a classification of an arrangement of data, according to some embodiments. Flow 700 may be directed to determining whether a column constituting a set of data includes a categorical variable. At 702, a subset of data is received, such as a column of data. At 704, one or more units of data are selected as a subset of data. In some examples, a column of data may be selected as a subset of data. At 706, matching criteria is applied to determine whether a match exists with the subset of data. Matching criteria, for example, may be defined by application of minhashing techniques, Bloom filter techniques, or any other data matching techniques to determine or match categorical variables for datasets, including collaborative atomized datasets. At 708, calculations to identify data indicative of one or more categorical values may be performed. For example, similarity calculations and/or filtering calculations may be performed. At 710, matches to data representing match criteria may be identified to indicate, for example, a relevant categorical variable. Note that flow 700 proffers minhashing techniques and Bloom filter techniques as examples, and thus is not intended to be limiting. Many other similar techniques may be applied.

Figure 8A:
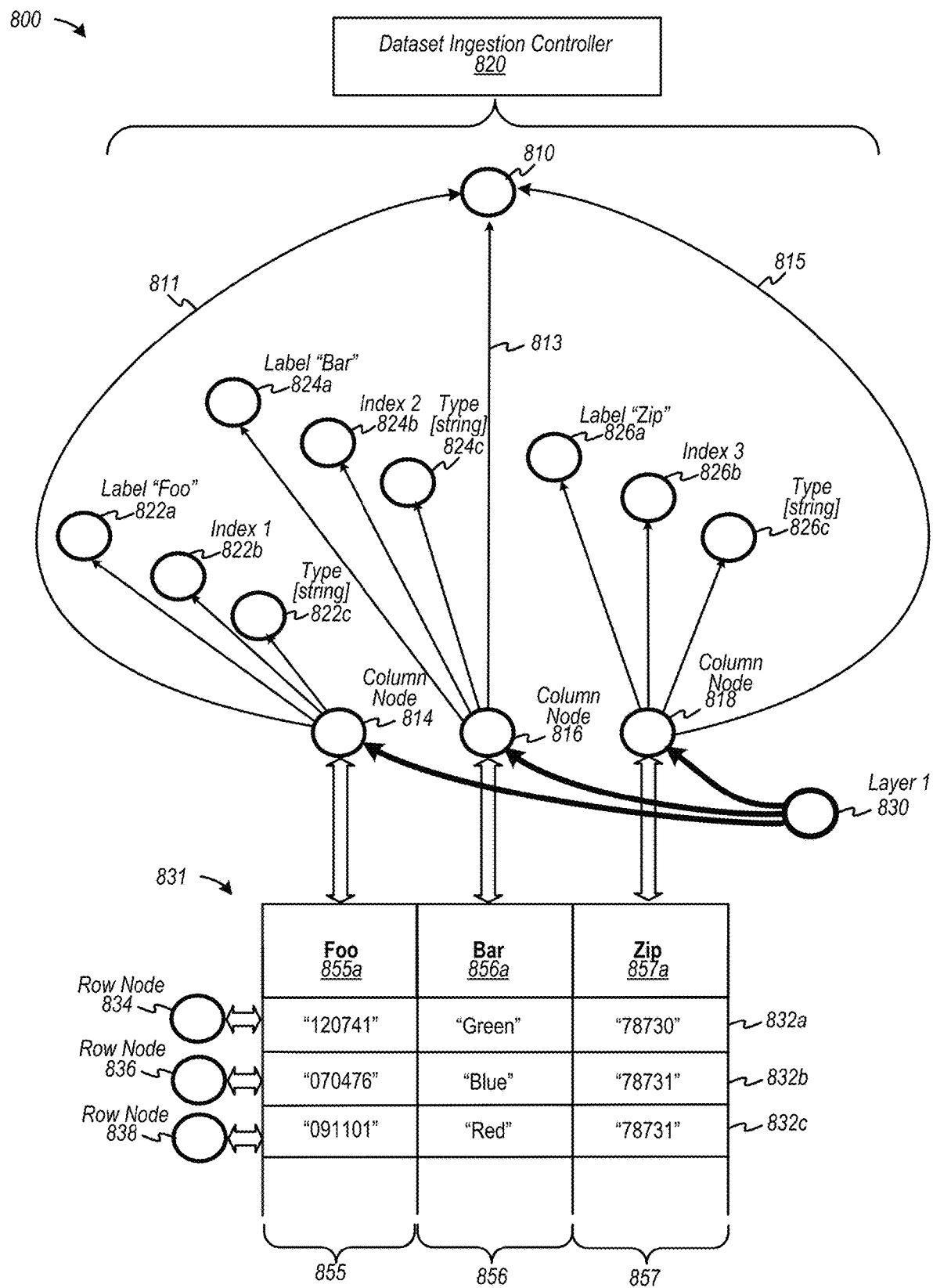
FIG. 8A is a diagram depicting an example of a dataset ingestion controller configured to form data elements of a layer file, according to some examples.

FIG. 8A is a diagram depicting an example of a dataset ingestion controller configured to form data elements of a layer file, according to some examples. Diagram 800 includes a dataset ingestion controller 820 configured to establish data elements, such as nodes and links (e.g., as interrelationship identifiers), for a modeled data structure to treat components of data universally. Examples of such components of data include, but are not limited to, datasets, tables, variables, observations, entities, etc. In the example shown, dataset ingestion controller 820 may form data elements, as metadata, for a tabular representation 831 for a set of data in rows 832a, 832b, and 832c and columns 855, 856, and 857. Column 855 includes a header ("Foo") 855a, column 856 includes a header ("Bar") 856a, and column 857 includes a header ("Zip") 857a.

Dataset ingestion controller 820 may be configured to form column nodes 814, 816, and 818 for columns 855, 856, and 857, respectively, and to form row nodes 834, 836, and 838 for rows 832a, 832b, and 832c, respectively. Also, dataset ingestion controller 820 may form a table node 810. In various examples, each of nodes 810, 814, 816, 818, 834, 836, and 838 may be associated with, or otherwise identified (e.g., for linking), an addressable identifier to identify a row, a column, and a table. In at least one embodiment, an addressable identifier may include an Internationalized Resource Identifier ("IRP"), a Uniform Resource Identifier ("URI"), a URL, or any other identifier configured to facilitate linked data. Nodes 814, 816, and 818 thus associated an addressable identifier to each column or "variable" in table 831.

Diagram 800 further depicts that each column node 814, 816, and 818 may be supplemented or "annotated" with metadata (e.g., in one or more layers) that describe a column, such as a label, an index number, a datatype, etc. In this example, table 831 includes strings as indicated by quotes. As shown, column 855 may be annotated with label "Foo," which is associated with node 822a, annotated with a column index number of "1," which is associated with node 822b, and annotated with a datatype "string," which is associated with node 822c. Nodes 822a to 822c may be linked from column node 814, which may be linked via link 811 to table node 810. Columns 856 and 857 may be annotated similarly and may be linked via column nodes 816 and 818 to annotative nodes 824a to 824c and annotative nodes 826a to 826c, respectively. Note, too, that column nodes 816 and 818 are linked to table node 810.

Figure 8B:
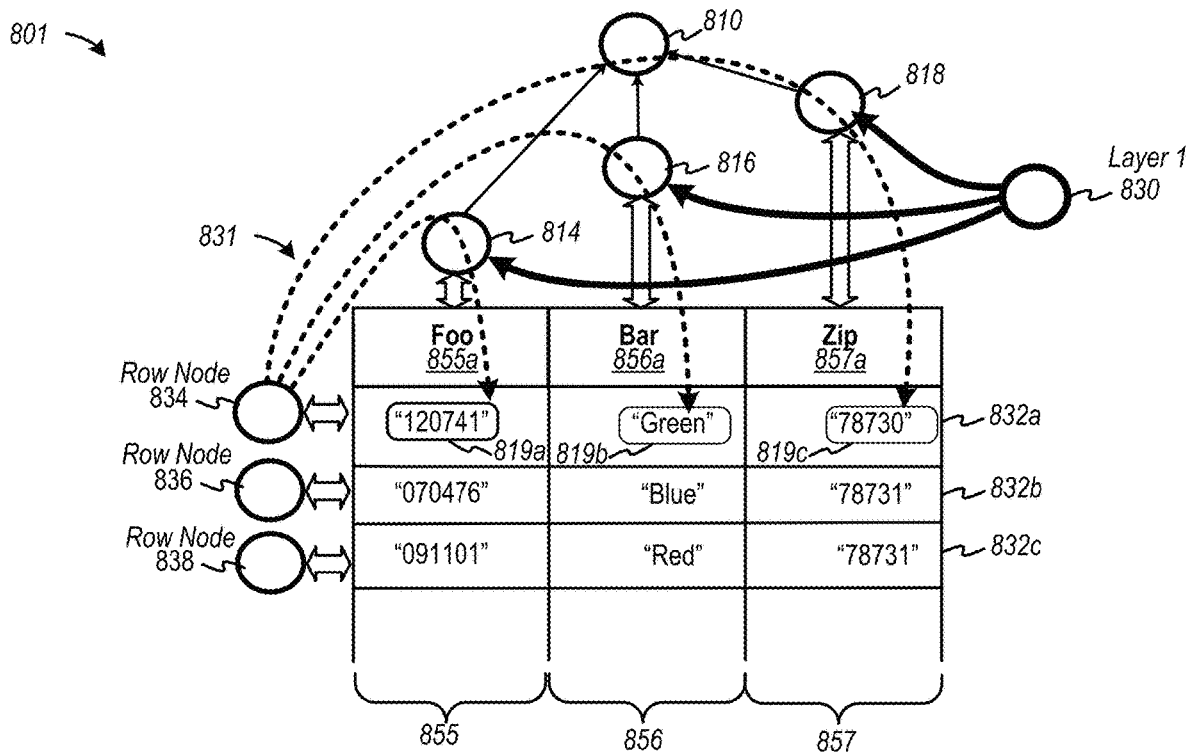
FIGS. 8B to 8D are diagrams depicting an example of a dataset ingestion controller configured to form a subset of data elements of a layer file, according to some examples.
Figure 8C:
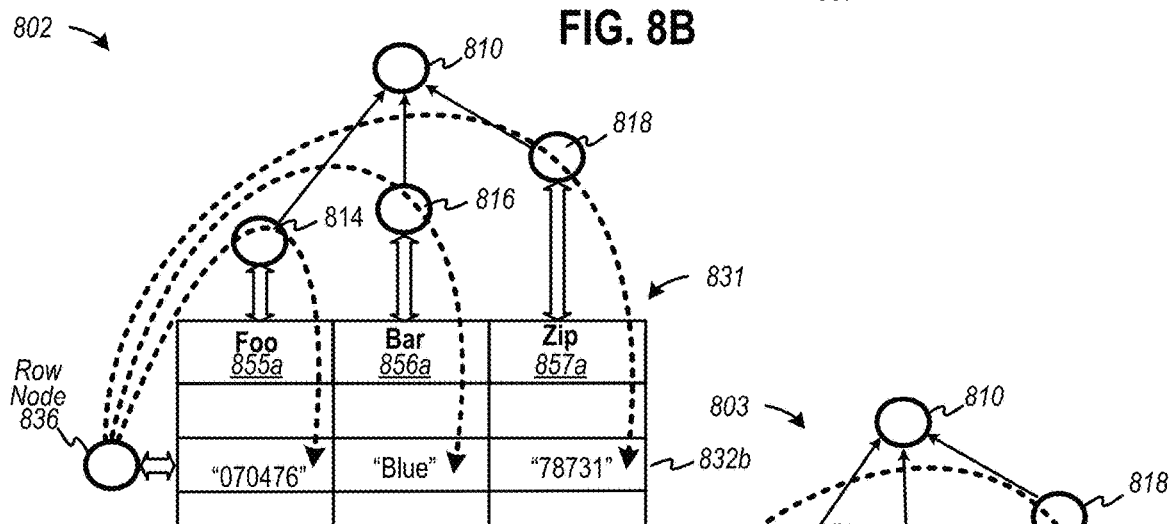
Figure 8D:
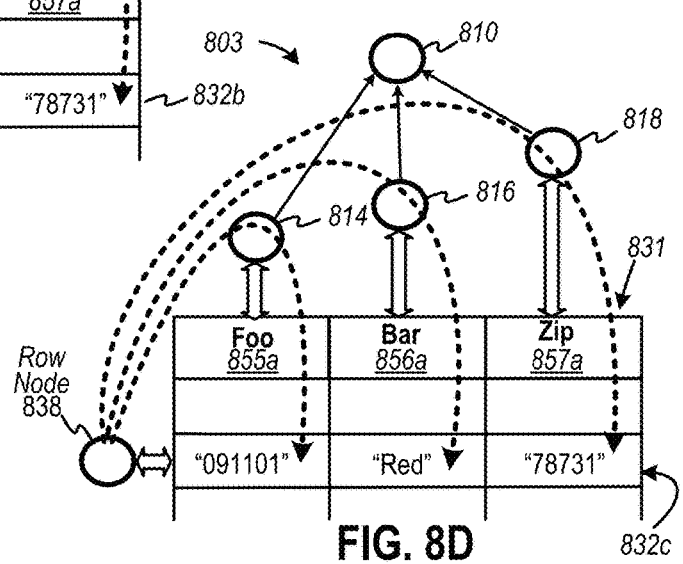

Layer data for a layer file, such as for a first layer file, may include data representing data elements and associated linked data (e.g., annotated data). As shown, a layer node 830, which may be associated with an addressable identifier, such as an IRI, may reference column nodes 814, 816, and 818, as well as other nodes (e.g., row nodes as shown in FIG. 8B to 8D). Layer node 830 and associated one or more data elements depicted in diagram 800 may form at least a portion of a layer file. In at least some examples, a layer may include data that facilitates reification (e.g., of concept LAYERS) to implement subsets of data as columns (and associated annotative data) to instantiate a tabular data arrangement. In some cases, a layer file may be a first-class item that may represent supplemental data that may append to, or augment, underlying raw data. A layer file may include data representing a collection of variables (e.g., columns) that can be presented together (e.g., to display on a user interface) or processed together (e.g., to perform a query). Implementation of a layer file may be lossless such that transformation of data may be reversible. In some cases, a layer file may be implemented in, for example, JSON. In some examples, layer files may be written to a database via RDF to, for example, establish provenance of columns in the database. As such, layer files may facilitate advance querying. In some examples, layer files may form a semi-group. Layer files may depend on one another, and the dependencies between them may be such that they are order-independent, hierarchically, as to which layers are added. Thus, a subset of layers may be implemented while others layers need not be implemented during, for example, a query.

FIGS. 8B to 8D are diagrams depicting an example of a dataset ingestion controller configured to form a subset of data elements of a layer file, according to some examples. Diagrams 801, 802, and 803 depict one or more row nodes 834 to 838 to represent or otherwise reference units of data of table 831. A unit of data may include data is disposed at a particular data field or cell, such as at a certain row and a certain column. Row nodes 834 to 838, for each row in table 831, may be associated with an addressable identifier (e.g., IRI) to represent an entity as described a particular row in rows 832a, 832b, and 832c. In some examples, such as the implementation of statistical data and analytics, an entity may describe an "observation" of "variables" represented by a column at a point in space and/or time. A first layer file (e.g., a layer 1 model) for tabular data structure 831 may facilitate visual representation, via a user interface, of table 831. In the first layer file, table 831 (and node 830), columns 855, 856, and 857 (and nodes 814, 816, and 818), and rows 832a, 832b, and 832c (and nodes 834, 836, and 838) may be configured as durable entities from which extensions are feasible to employ supplemental and annotative data, including derived subsets of data (e.g., derived columns and/or derived rows, etc.).

In one or more implementations, elements depicted in diagrams 801, 802, and 803 of FIGS. 8B to 8D may include structures and/or functions as similarly-named or similarly-numbered elements depicted in other drawings. Diagram 801 of FIG. 8B depicts row nodes 834 to 838 identifying (e.g., referencing) units of data 819a to 819c via corresponding links to column nodes 814 to 818. While not shown, layer ("1") node 830 may reference or link to row nodes 834 to 838, thereby facilitating incorporation of row nodes 834 to 838 into a first layer file. Diagram 802 of FIG. 8C depicts row node 836 identifying other units of data via links through column nodes 814, 816, and 818. Diagram 803 of FIG. 8D similarly depicts row node 838 identifying still other units of data via links to through column nodes 814, 816, and 818.

Figure 9:
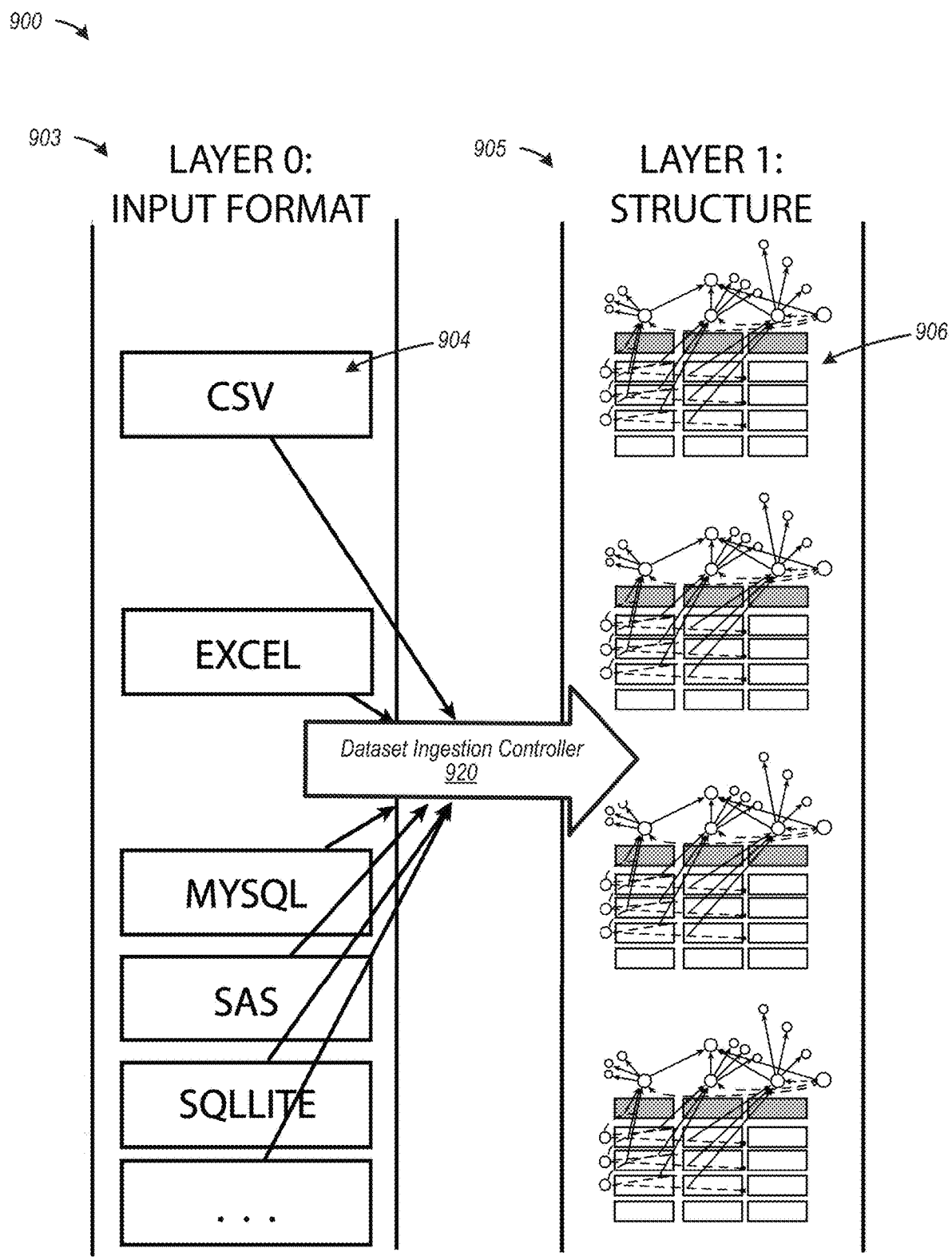
FIG. 9 is a diagram depicting a functional representation of an operation of a dataset ingestion controller, according to some examples.

FIG. 9 is a diagram depicting a functional representation of an operation of a dataset ingestion controller, according to some examples. Diagram 900 depicts a functional representation of a layer zero ("0") 903 and a layer one ("1") data structure 950. As shown, a dataset ingestion controller 920 can receive set of data in any of a number of input formats 904, such as CSV, XSL (i.e., Excel), MySQL, SAS™, SQlite™ etc. In some examples, dataset ingestion controller 920 may convert or transform a set of data in an input format into an internal format 906, such as a first file format. In some examples, the first file format may be a tabular data arrangement. In some examples, the table may have, for example, links into a graph database. The first file format may be an atomized dataset, according to a least one example.

Figure 10:
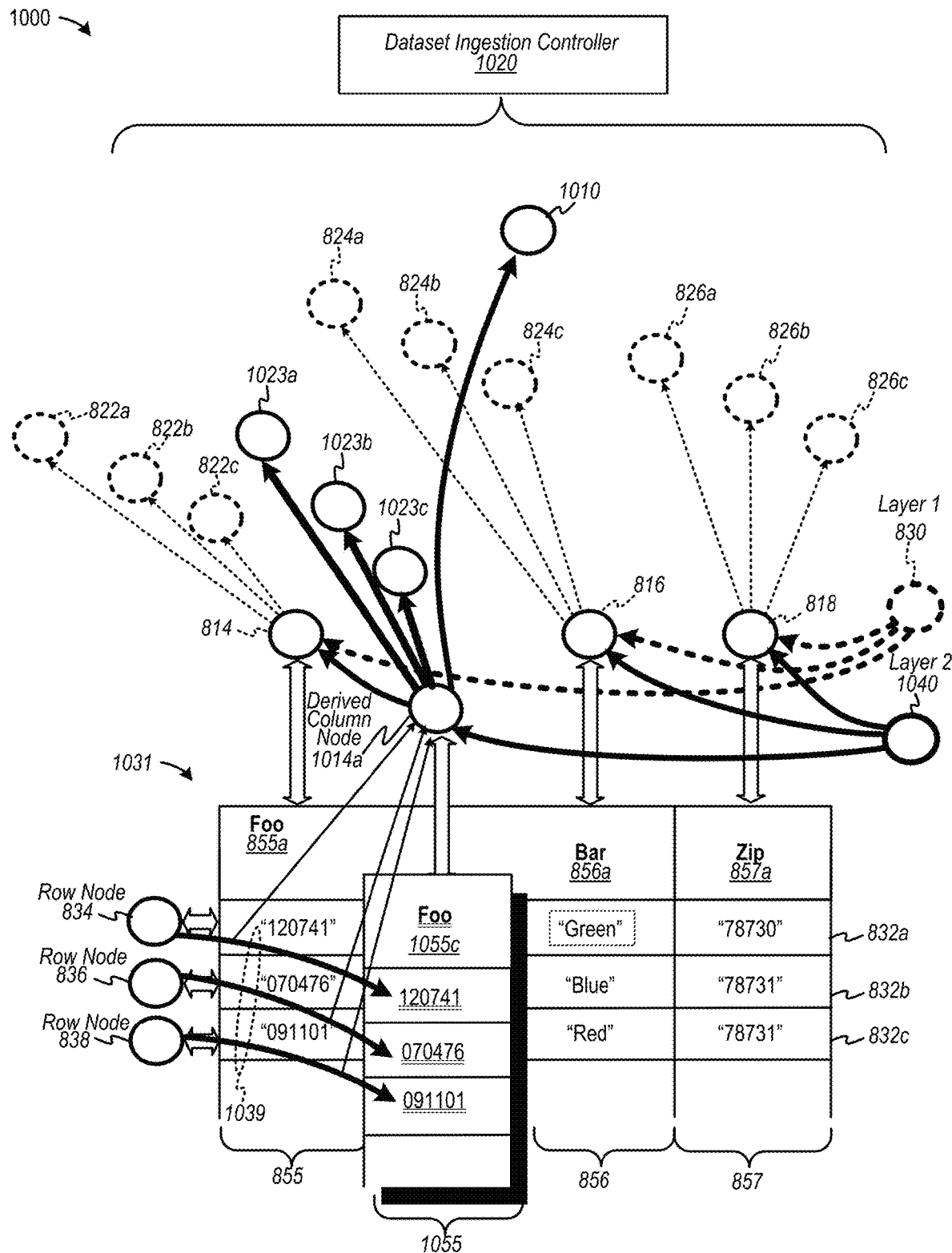
FIG. 10 is a diagram depicting another example of a dataset ingestion controller configured to form data elements of another layer file, according to some examples.

FIG. 10 is a diagram depicting another example of a dataset ingestion controller configured to form data elements of another layer file, according to some examples. Diagram 1000 includes a dataset ingestion controller 1020 configured to establish data elements, such as nodes and links (e.g., as interrelationship identifiers), for a modeled data structure based on derived or inferred data, such as a derived column. In the example shown, dataset ingestion controller 1020 may form data elements, as metadata, similar to tabular representation 831 of FIG. 8A to form tabular representation 1031 of FIG. 10. Table 1031 is shown to include columns 855, 856, and 857. Column 855 includes a header ("Foo") 855a, column 856 includes a header ("Bar") 856a, and column 857 includes a header ("Zip") 857a. Further, diagram 1000 is shown to include data elements in broken line (e.g., nodes and links) of layer 1, which is associated with layer node 830. In one or more implementations, elements depicted in diagram 1000 of FIG. 10 may include structures and/or functions as similarly-named or similarly-numbered elements depicted in other drawings, including FIG. 8A.

In this example, dataset ingestion controller 1020 may be configured to form a derived column 1055 based on, for example, column data derived from one or more columns associated with table 831 of FIG. 8A or with layer "1." Derived data is represented as "double underlined" data, whereby the double underlined indicates that the derived data are integer datatypes based on the strings of column 855. In some examples, the term derived variable may be used interchangeably with the term derived column data.

A second layer may be described by a second layer file and layer 2 data therein. In some cases, a second layer may include derived data. Derived column 1055 has column data as a derived variable that may be a function of a range of rows in table 1031. As such, derived variable data in rows 832a, 832b, and 832c of derived column 1055 may be referred to by row nodes 834, 836, and 838, respectively. Derived column 1055 may be associated with a derived column node 1014a, which may include an addressable identifier (e.g., IRI). As shown, derived column 1055 in layer 2 may be annotated with label "Foo," which is associated with node 1023a, annotated with a column index number of "2," which is associated with node 1023b, and annotated with a datatype "integer," which is associated with node 1023c, which may be derived from column 855 of layer 1.

A second layer file may include data elements representing a layer 2 node 1040, which, in turn, references (in solid dark lines) derived column node 1014a and row nodes 834 to 838 (not shown) in layer 2. Derived column node 1014a references table node 1010 in layer 2, as well as nodes 1023a, 1023b, and 1023c. Row nodes 834 to 838 also reference via links 1039 units of data in derived column 1055. Further, layer 2 node 1040 is shown to also reference column nodes 814 to 818 of layer 1. Note that layer data associated with layer 2 may also be, for example, first-class and reified. A second layer or subsequent layer may include derived columns, as well as columns from the underlying layer(s), such as layer 1.

Figure 11:
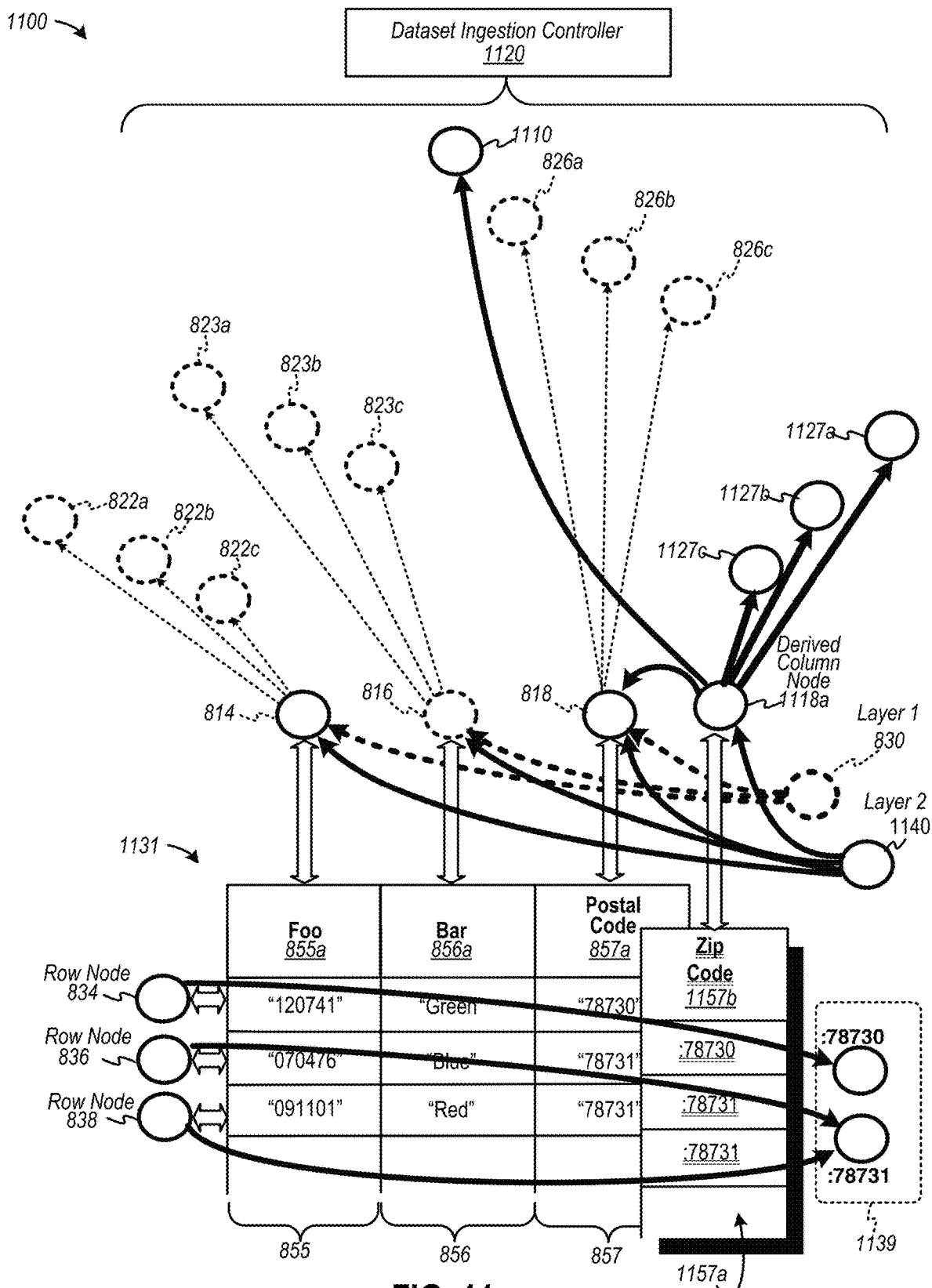
FIG. 11 is a diagram depicting yet another example of a dataset ingestion controller configured to form data elements of yet another layer file, according to some examples.

FIG. 11 is a diagram depicting yet another example of a dataset ingestion controller configured to form data elements of yet another layer file, according to some examples. Diagram 1100 includes a dataset ingestion controller 1120 configured to establish data elements, such as nodes and links based on derived or inferred data, such as a derived column. In the example shown, dataset ingestion controller 1120 may form data elements, as metadata, similar to tabular representation 831 of FIG. 8A to form tabular representation 1131 of FIG. 11. Table 1131 is shown to include columns 855, 856, and 857. Column 855 includes a header ("Foo") 855a, column 856 includes a header ("Bar") 856a, and column 857 includes a header ("Zip") 857a. Further, diagram 1100 is shown to include data elements in broken line (e.g., nodes and links) of layer 1, which is associated with layer node 830. In one or more implementations, elements depicted in diagram 1100 of FIG. 11 may include structures and/or functions as similarly-named or similarly-numbered elements depicted in other drawings, including FIGS. 8A and 10.

In this example, dataset ingestion controller 1120 may be configured to form a derived column 1157a based on, for example, column data derived from column 857 of tables 831 and 1031 of FIGS. 8A and 10 in layer "1." Derived data is represented as "double underlined" data, whereby the double underlined indicates that the derived data are "ZIP CODE" categorical values or datatypes based on analysis performed, for example, by an inference engine described herein. Header data ("Zip Code") 1157b may be derived from header data ("postal code") 857a of layer 1.

Figure 15:
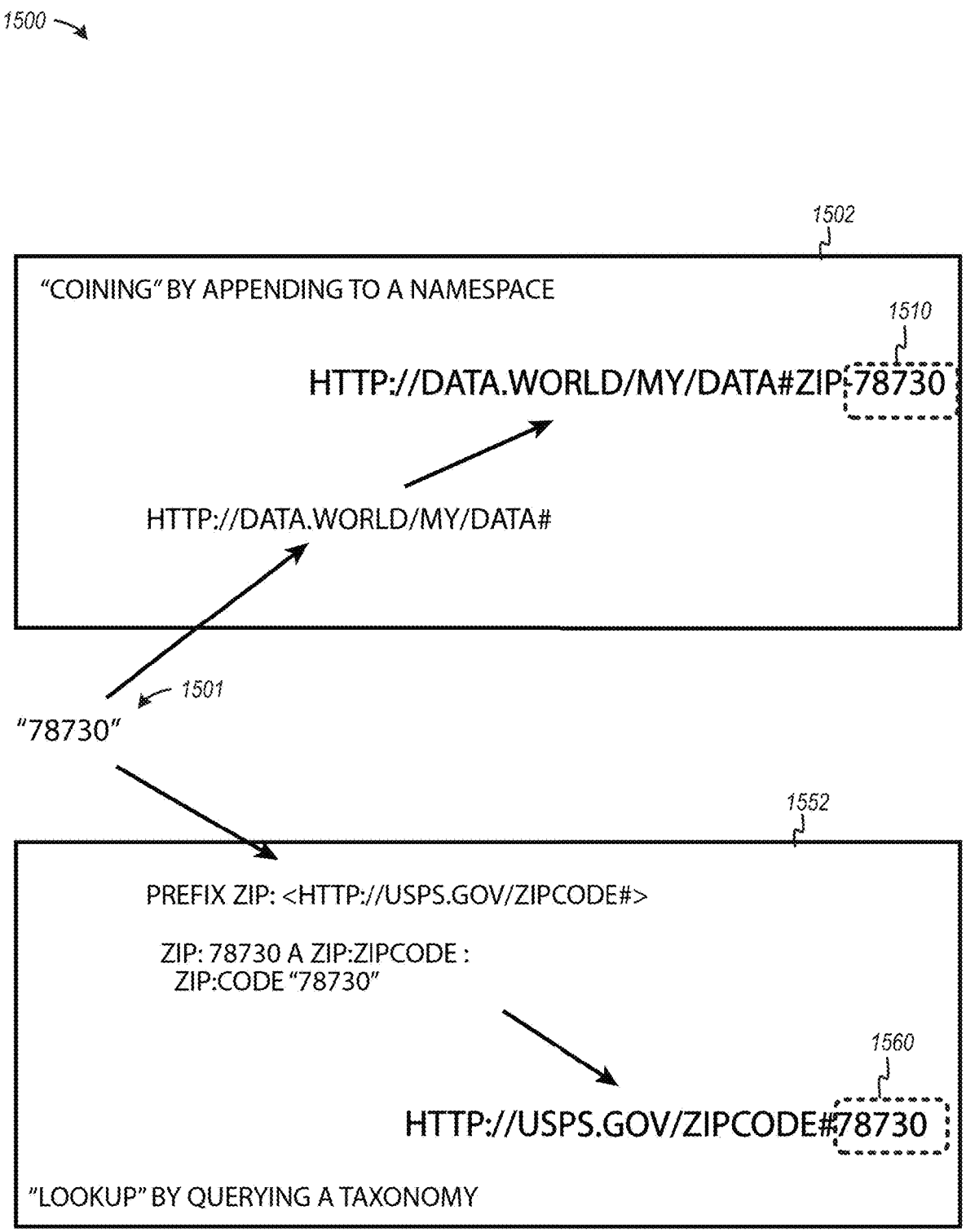
FIG. 15 depicts examples of generating addressable identifiers based on data values, according to some examples.

A second layer associated with diagram 1100 may be described by a second layer file and layer 2 data therein. In some cases, a second layer may include derived data as set forth in derived column 1157a. Layer 2 may also include layer 2 node 1140, row nodes 834 to 838, links to column nodes 814 to 818 of layer 1, and annotative nodes 1127a ("label: Zip Code"), 1127b ("index number"), and 1127c ("integer" datatype), whereby each of the foregoing nodes may be associated with a unique addressable identifier, such as a distinct IRI. Derived column 1057a of layer 2 may be associated with a derived column node 1118a, which may include an addressable identifier (e.g., IRI). Derived column 1057a in layer 2 may also reference table node 1110 and column node 818. In some examples, a categorical variable may be modeled as a node associated with a distinct addressable identifier, such as an IRI. In this example, a distinct addressable identifier or IRI may be formed by "coining," or generating, an IRI based on a data value 1139 in a cell or at a data location identified by a specific row and a specific column. The data value 1139 may be appended to a link. In another example, an addressable identifier may be formed by looking up an identifier (e.g., an IRI) in a reference data file. In some examples, a generated addressable identifier may be formed as a categorical value since the categorical value may be a reified concept to which data may attach (e.g., metadata, including addressing-related data). Examples of generating an addressable identifier are depicted in FIG. 15.

Figure 12A:
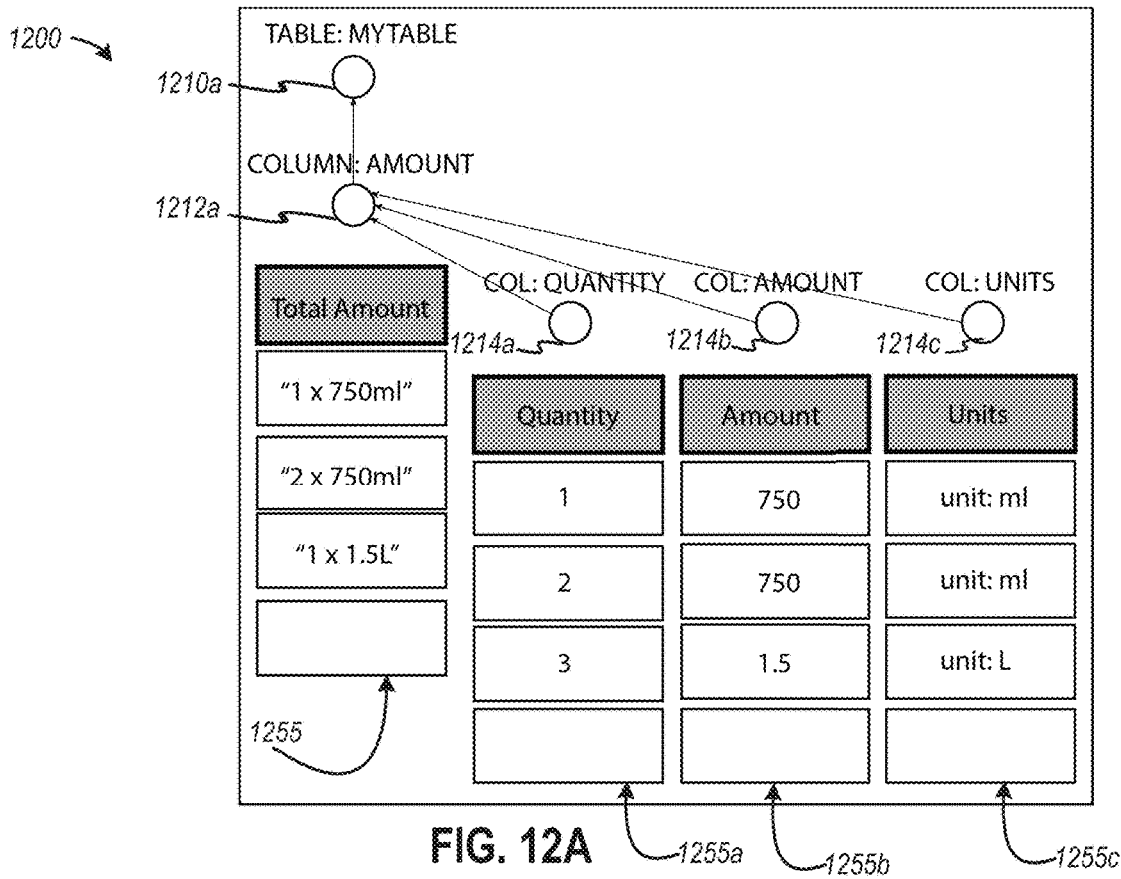
FIGS. 12A to 12C are diagrams depicting examples of deriving columns and/or categorical variables, according to some examples.
Figure 12B:
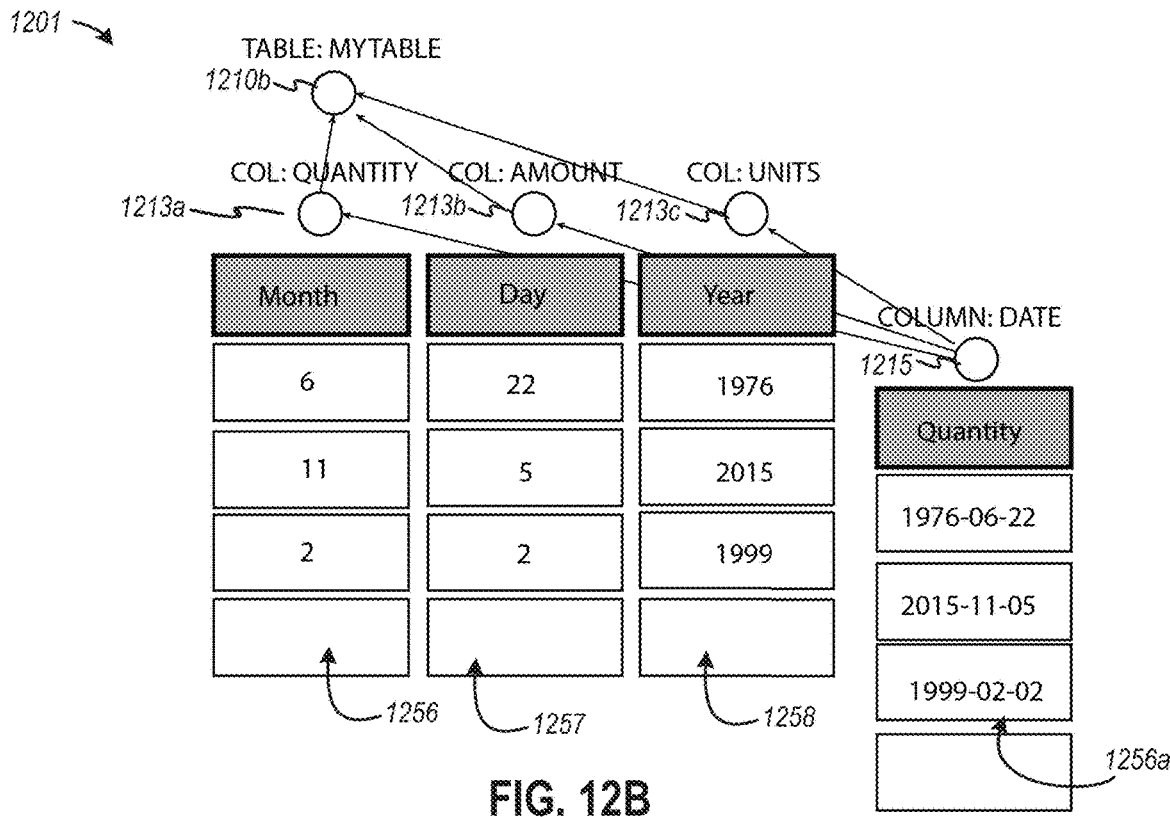
Figure 12C:
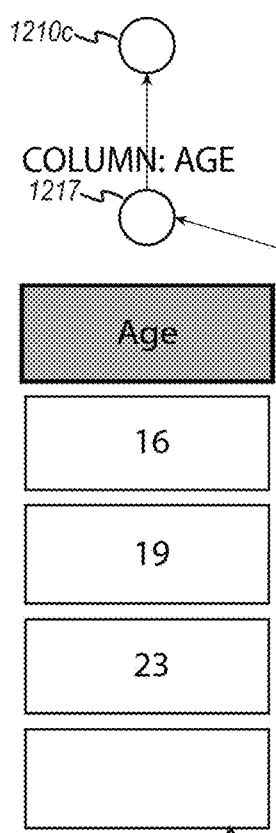
Figure 12C:
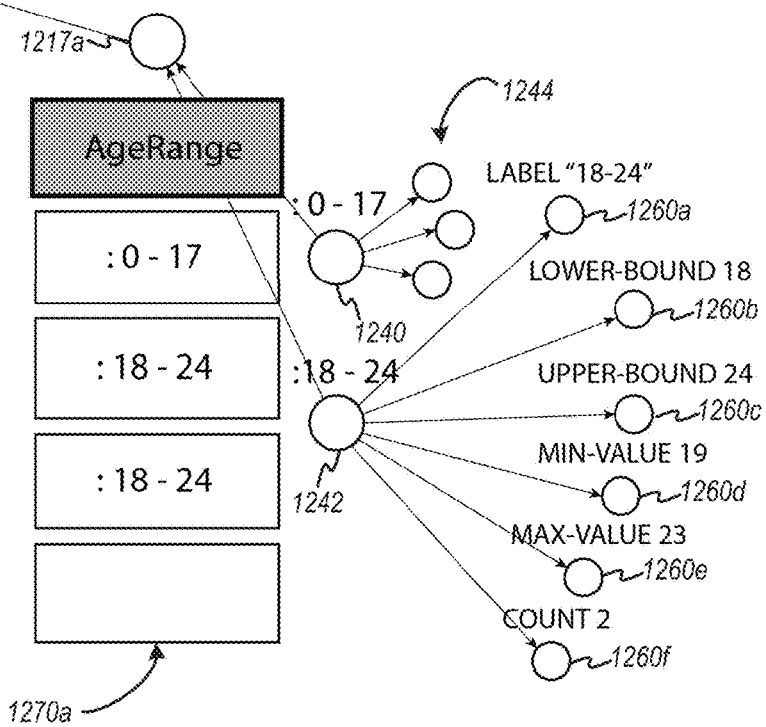

FIGS. 12A to 12C are diagrams depicting examples of deriving columns and/or categorical variables, according to some examples. Diagram 1200 of FIG. 12A depicts a column 1255 associated with a column node 1212a, which, in turn, is associated with a table node 1210a. Here, column 1255 includes a header describing columnar data as representing a "total amount." In this example, column data is derived to form three (3) derived columns 1255a, 1255b, and 1255c, which may be associated with derived column nodes 1214a, 1214b, and 1214c, respectively. Thus, a single column may be "split" into multiple derived categorical variables. In some examples, an inference engine (not shown) may perform a transform based on, for example, a regular expression, a set of mathematical functions, a script or program in, for example, an imperative programming language (e.g. Python).

Diagram 1201 of FIG. 12B depicts columns 1256, 1257, and 1258 associated with column nodes 1213a, 1213b, and 1213c, respectively, each of which, in turn, may be associated with a table node 1210b. Here, columns 1256, 1257, and 1258 include headers describing columnar data as representing a "month," a "day," and a "year." In this example, column data is derived to form one (1) derived column 1256a based on "combining" multiple columns into a reduced number, such as one column. Derived column 1256a includes a "quantity" as a numeric date format YYYY-MM-DD, and may be associated with derived column node 1215. Thus, multiple columns may be "combined" into a reduced number of categorical variables. In some examples, an inference engine (not shown) may perform the transform.

Diagram 1203 of FIG. 12C depicts a column 1270 associated with a column node 1217, which, in turn, is associated with a table node 1210c. Here, column 1217 includes a header describing columnar data as representing an "age." In this example, column data is derived to form one (1) derived column 1270a based on analyzing data values of column 1270 and forming a new categorical variable that describes a range of ages, each range being identified as a "bin." Thus, derived column 1270a may be associated with a derived column node 1217a, and may include two (2) categorical variables each associated with an age range (e.g., a first range from 0-17 years and a second range from 18-24 years). The first age range may be associated with a first age range node 1240, which, in turn, may be associated with one or more nodes 1244 that define a bin for the first age range. The second age range may be associated with a second age range node 1242, which, in turn, may be associated with nodes 1260a to 1260f that define attributes (e.g., statistical information) of a bin for the second age range. In some examples, nodes 1244 may be similar to nodes 1260a to 1260f In some examples, distinct addressable identifiers, such as unique IRIs, for each row may reference one of age range nodes 1240 and 1242, as well as associated nodes 1244 or 1260a-f.

In view of the foregoing regarding FIGS. 12A to 12C, the derived columns may be formed in a lossless manner. Thus, the transformation to form the derived columns and categorical variables may be reversed to access the lower hierarchical layers of data.

Figure 13:
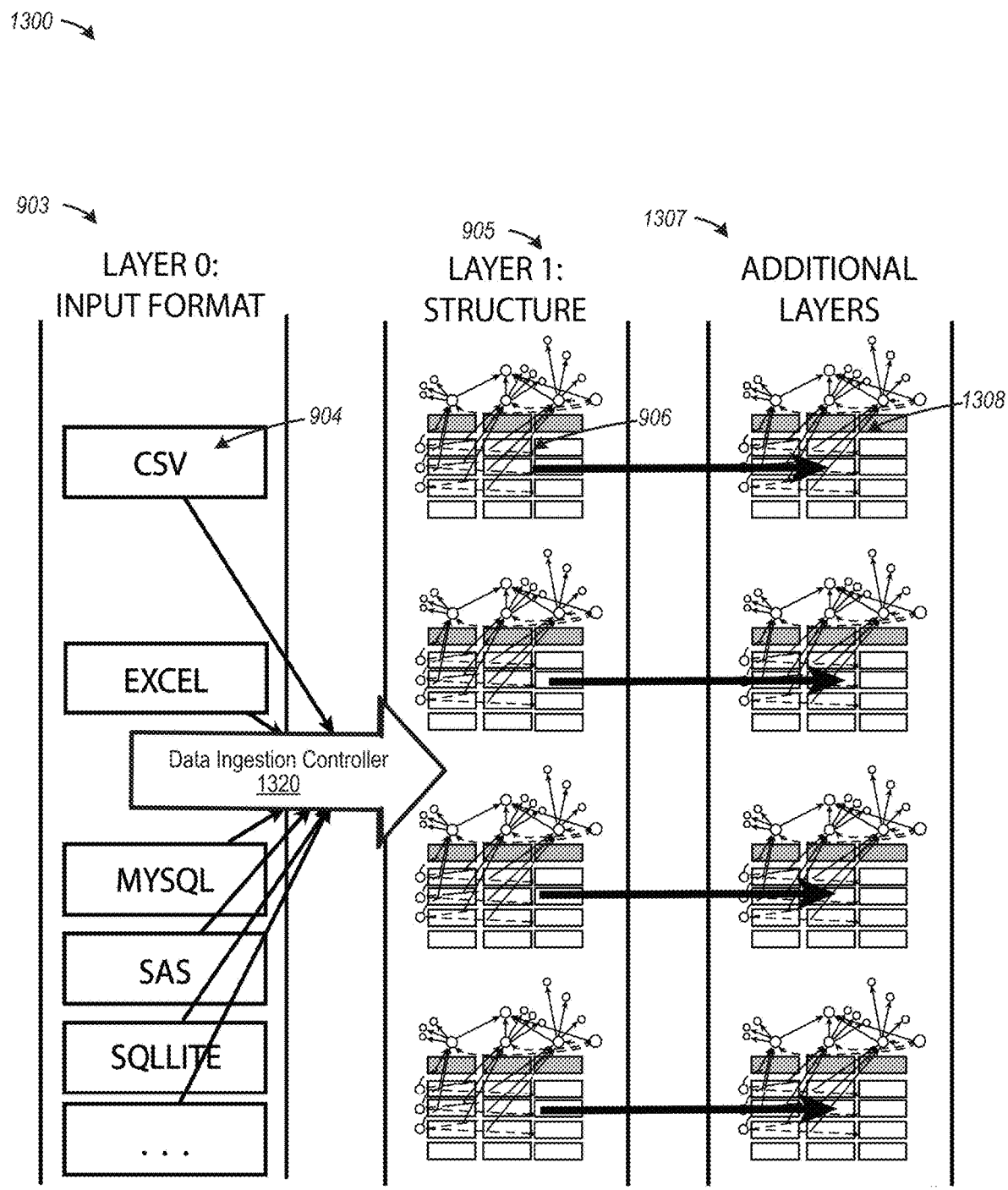
FIG. 13 is a diagram depicting another functional representation of an operation of a dataset ingestion controller, according to some examples.

FIG. 13 is a diagram depicting another functional representation of an operation of a dataset ingestion controller, according to some examples. Diagram 1300 depicts a functional representation of a layer zero ("0") 903 and a layer one ("1") data structure 950. As shown, a dataset ingestion controller 1320 can receive set of data in any of a number of input formats 904, such as CSV, XSL (i.e., Excel), My SQL, SAS™, SQlite™, etc. In some examples, dataset ingestion controller 1320 may convert or transform a set of data in an input format into an internal format 906, such as a first file format. In some examples, the first file format may be a tabular data arrangement. In some examples, the table may have, for example, links into a graph database. The first file format may be an atomized dataset, according to a least one example. In one or more implementations, elements depicted in diagram 1300 of FIG. 13 may include structures and/or functions as similarly-named or similarly-numbered elements depicted in other drawings, including FIG. 9.

Further to diagram 1300, additional layers, such as a second layer (i.e., "layer 2"), may be formed in a hierarchy layering of layer files. As shown, one or more additional layers 1307 may be formed in a format or data structure 1308 similar to layer one data structure 905 and be linked to lower layered data. Hence, newly-derived categorical variables and columns may be iteratively defined in successive additional layers without, for example, dependency or knowledge of a particular input format 904.

Figure 14:
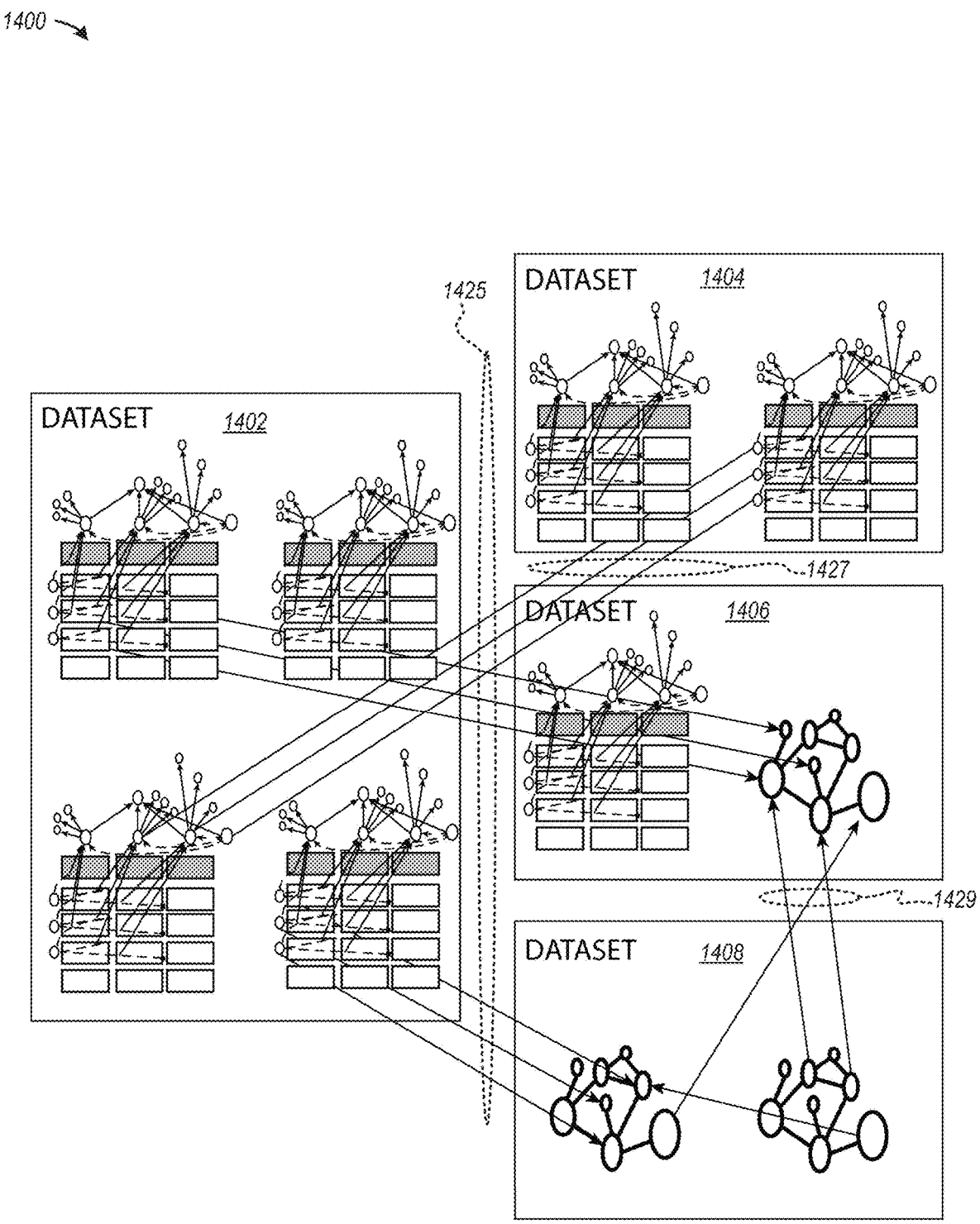
FIG. 14 depicts an example of a network of collaborative datasets interlinked based on layered data, according to some examples.

FIG. 14 depicts an example of a network of collaborative datasets interlinked based on layered data, according to some examples. Diagram 1400 depicts a network of collaborative datasets 1402, 1404, 1406, and 1408 that may be interrelated via links, such as links 1425, 1427, and 1429. Data associated with the network of collaborative datasets 1402 to 1408 include data representing tabular data arrangements or "table-like" graphs, as well as layered data files including "graph-like" graphs that include nodes and links (i.e., edges) that interrelate to other layers of layered data. Further, the nodes and links may include derived nodes and derived links, based on deriving column data and categorical variables. Derived nodes and links may give rise to identifying new links to other datasets to further enrich a particular dataset.

FIG. 15 depicts examples of generating addressable identifiers based on data values, according to some examples. Diagram 1500 depicts a first functional approach 1502 and a second functional approach 1552 to generate unique addressable identifiers, such as a distinct IRI, based on data value ("78730") 1501, which may be a zip code. According to approach 1502, data value 1510 may be appended to (e.g., by "coining") an IRI based on a namespace. In this case, "coining" may refer to an act of generating a string representation of an IRI using concatenation (e.g., with a data value) or templating. According to approach 1552, a generated IRI may be identified or deduced by "looking up" or querying a taxonomy that maps a string value, including data value 1560, to an IRI. Note that the above-described approaches 1502 and 1552 are non-limiting examples, and ordinarily skilled artisans will recognize other equivalent approaches in view of these approaches.

Figure 16:
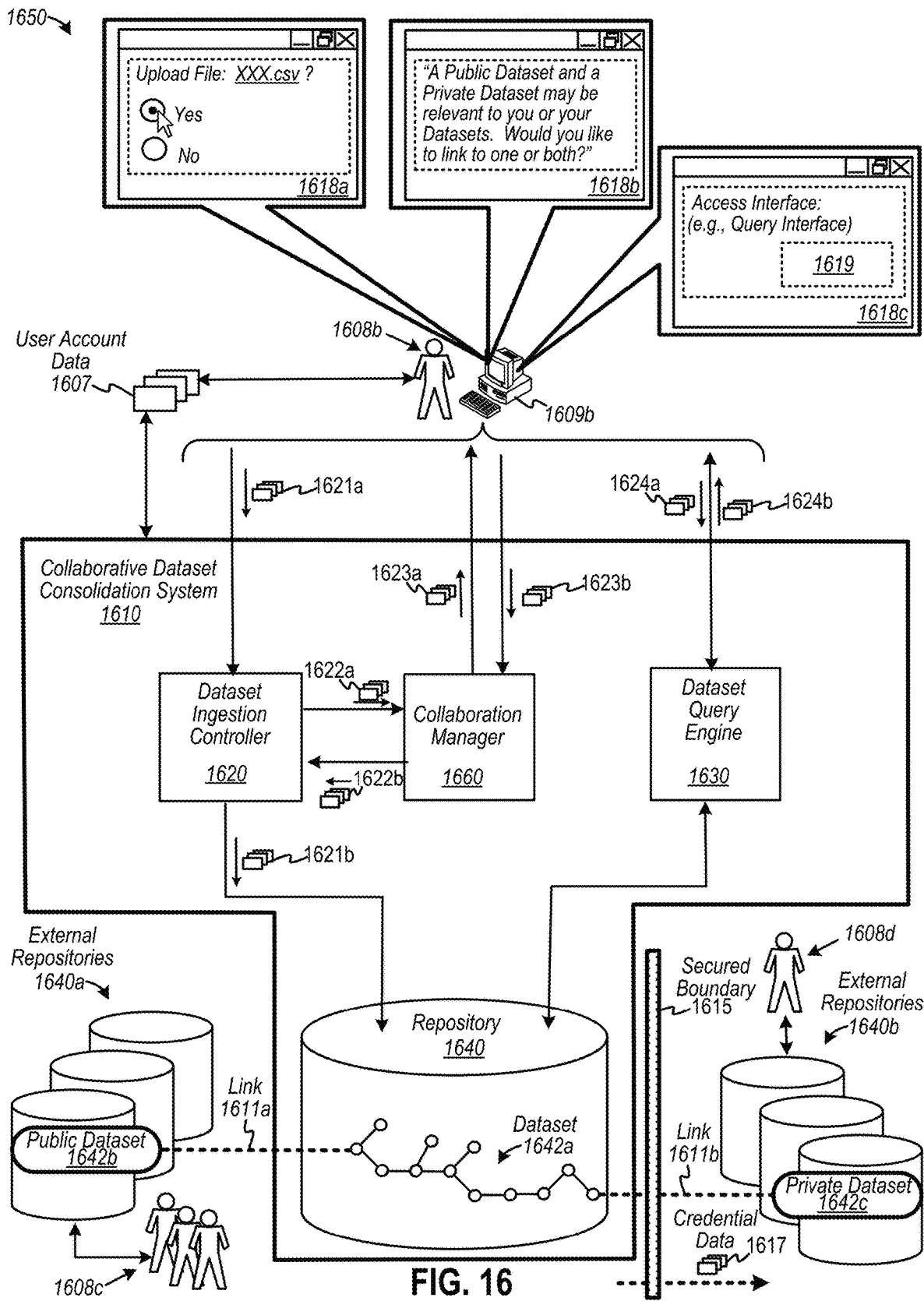
FIG. 16 is a diagram depicting operation an example of a collaborative dataset consolidation system, according to some examples.

FIG. 16 is a diagram depicting operation an example of a collaborative dataset consolidation system, according to some examples. Diagram 1650 includes a collaborative dataset consolidation system 1610, which, in turn, includes a dataset ingestion controller 1620, a collaboration manager 1660, a dataset query engine 1630, and a repository 1640, which may represent one or more data stores. In the example shown, consider that a user 1608b, which is associated with a user account data 1607, may be authorized to access (via networked computing device 1609b) collaborative dataset consolidation system to create a dataset and to perform a query. User interface 1618a of computing device 1609b may receive a user input signal to activate the ingestion of a data file, such as a CSV formatted file (e.g., "XXX.csv"), to create a dataset (e.g., an atomized dataset stored in repository 1640). Hence, dataset ingestion controller 1620 may receive data 1621a representing the CSV file and may analyze the data to determine dataset attributes during, for example, a phase in which "insights" (e.g., statistics, data characterization, etc.) may be performed. Examples of dataset attributes include annotations, data classifications, data types, a number of data points, a number of columns, a "shape" or distribution of data and/or data values, a normative rating (e.g., a number between 1 to 10 (e.g., as provided by other users)) indicative of the "applicability" or "quality" of the dataset, a number of queries associated with a dataset, a number of dataset versions, identities of users (or associated user identifiers) that analyzed a dataset, a number of user comments related to a dataset, etc.). Dataset ingestion controller 1620 may also convert the format of data file 1621a to an atomized data format to form data representing an atomized dataset 1621b that may be stored as dataset 1642a in repository 1640.

As part of its processing, dataset ingestion controller 1620 may determine that an unspecified column of data 1621a, which includes five (5) integer digits, may be a column of "zip code" data. As such, dataset ingestion controller 1620 may be configured to derive a data classification or data type "zip code" with which each set of 5 digits can be annotated or associated. Further to the example, consider that dataset ingestion controller 1620 may determine that, for example, based on dataset attributes associated with data 1621a (e.g., zip code as an attribute), both a public dataset 1642b in external repositories 1640a and a private dataset 1642c in external repositories 1640b may be determined to be relevant to data file 1621a. Individuals 1608c, via a networked computing system, may own, maintain, administer, host or perform other activities in association with public dataset 1642b. Individual 1608d, via a networked computing system, may also own, maintain, administer, and/or host private dataset 1642c, as well as restrict access through a secured boundary 1615 to permit authorized usage.

Continuing with the example, public dataset 1642b and private dataset 1642c may include "zip code"-related data (i.e., data identified or annotated as zip codes). Dataset ingestion controller 1620 may generate a data message 1622a that includes an indication that public dataset 1642b and/or private dataset 1642c may be relevant to the pending uploaded data file 1621a (e.g., datasets 1642b and 1642c include zip codes). Collaboration manager 1660 receive data message 1622a, and, in turn, may generate user interface-related data 1623a to cause presentation of a notification and user input data configured to accept user input at user interface 1618b. According to some examples, user 1608b may interact via computing device 1609b and user interface 1618b to (1) engage other users of collaborative dataset consolidation system 1610 (and other non-users), (2) invite others to interact with a dataset, (3) request access to a dataset, (4) provide commentary on datasets via collaboration manager 1660, (5) provide query results based on types of queries (and characteristics of such queries), (6) communicate changes and updates to datasets that may be linked across any number of atomized dataset that form a collaborative dataset, and (7) notify others of any other type of collaborative activity relative to datasets.

If user 1608b wishes to "enrich" dataset 1621a, user 1608b may activate a user input (not shown on interface 1618b) to generate a user input signal data 1623b indicating a request to link to one or more other datasets, including private datasets that may require credentials for access. Collaboration manager 1660 may receive user input signal data 1623b, and, in turn, may generate instruction data 1622b to generate an association (or link 1641a) between atomized dataset 1642a and public dataset 1642b to form a collaborative dataset, thereby extending the dataset of user 1608b to include knowledge embodied in external repositories 1640a. Therefore, user 1608b's dataset may be generated as a collaborative dataset as it may be based on the collaboration with public dataset 1642b, and, to some degree, its creators, individuals 1608c. Note that while public dataset 1642b may be shown external to system 1610, public dataset 1642b may be ingested via dataset ingestion controller 1620 for storage as another atomized dataset in repository 1640. Or, public dataset 1642b may be imported into system 1610 as an atomized dataset in repository 1640 (e.g., link 1611a is disposed within system 1610). Similarly, if user 1608b wishes to "enrich" atomized dataset 1621b with private dataset 1642c, user 1608b may extend its dataset 1642a by forming a link 1611b to private dataset 1642c to form a collaborative dataset. In particular, dataset 1642a and private dataset 1642c may consolidate to form a collaborative dataset (e.g., dataset 1642a and private dataset 1642c are linked to facilitate collaboration between users 1608b and 1608d). Note that access to private dataset 1642c may require credential data 1617 to permit authorization to pass through secured boundary 1615. Note, too, that while private dataset 1642c may be shown external to system 1610, private dataset 1642c may be ingested via dataset ingestion controller 1620 for storage as another atomized dataset in repository 1640. Or, private dataset 1642c may be imported into system 1610 as an atomized dataset in repository 1640 (e.g., link 1611b is disposed within system 1610). According to some examples, credential data 1617 may be required even if private dataset 1642c is stored in repository 1640. Therefore, user 1608d may maintain dominion (e.g., ownership and control of access rights or privileges, etc.) of an atomized version of private dataset 1642c when stored in repository 1640.

Should user 1608b desire not to link dataset 1642a with other datasets, then upon receiving user input signal data 1623b indicating the same, dataset ingestion controller 1620 may store dataset 1621b as atomized dataset 1642a without links (or without active links) to public dataset 1642b or private dataset 1642c. Thereafter, user 1608b may enter query data 1624a via data entry interface 1619 (of user interface 1618c) to dataset query engine 1630, which may be configured to apply one or more queries to dataset 1642a to receive query results 1624b. Note that dataset ingestion controller 1620 need not be limited to performing the above-described function during creation of a dataset. Rather, dataset ingestion controller 1620 may continually (or substantially continuously) identify whether any relevant dataset is added or changed (beyond the creation of dataset 1642a), and initiate a messaging service (e.g., via an activity feed) to notify user 1608b of such events. According to some examples, atomized dataset 1642a may be formed as triples compliant with an RDF specification, and repository 1640 may be a database storage device formed as a "triplestore." While dataset 1642a, public dataset 1642b, and private dataset 1642c may be described above as separately partitioned graphs that may be linked to form collaborative datasets and graphs (e.g., at query time, or during any other data operation, including data access), dataset 1642a may be integrated with either public dataset 1642b or private dataset 1642c, or both, to form a physically contiguous data arrangement or graph (e.g., a unitary graph without links), according to at least one example.

Figure 17:
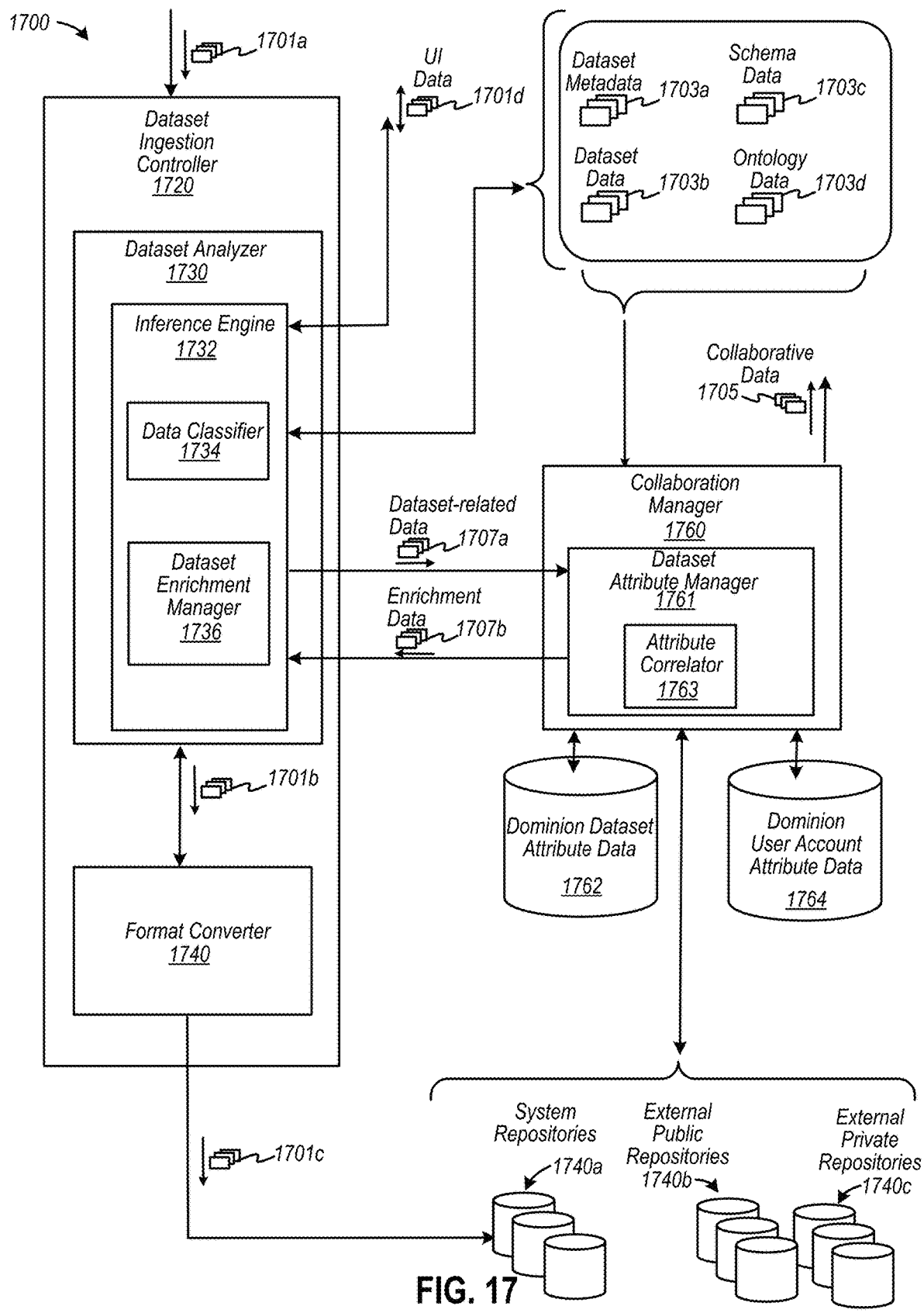
FIG. 17 is a diagram depicting an example of a dataset analyzer and an inference engine, according to some embodiments.

FIG. 17 is a diagram depicting an example of a dataset analyzer and an inference engine, according to some embodiments. Diagram 1700 includes a dataset ingestion controller 1720, which, in turn, includes a dataset analyzer 1730 and a format converter 1740. As shown, dataset ingestion controller 1720 may be configured to receive data file 1701a, which may include a set of data (e.g., a dataset) formatted in any specific format, examples of which include CSV, JSON, XML, XLS, MySQL, binary, RDF, or other similar or suitable data formats. Dataset analyzer 1730 may be configured to analyze data file 1701a to detect and resolve data entry exceptions (e.g., whether a cell is empty or includes non-useful data, whether a cell includes non-conforming data, such as a string in a column that otherwise includes numbers, whether an image embedded in a cell of a tabular file, whether there are any missing annotations or column headers, etc.). Dataset analyzer 1730 then may be configured to correct or otherwise compensate for such exceptions.

Dataset analyzer 1730 also may be configured to classify subsets of data (e.g., each subset of data as a column) in data file 1701a as a particular data classification, such as a particular data type. For example, a column of integers may be classified as "year data," if the integers are in one of a number of year formats expressed in accordance with a Gregorian calendar schema. Thus, "year data" may be formed as a derived dataset attribute for the particular column. As another example, if a column includes a number of cells that each include five digits, dataset analyzer 1730 also may be configured to classify the digits as constituting a "zip code." Dataset analyzer 1730 can be configured to analyze data file 1701a to note the exceptions in the processing pipeline, and to append, embed, associate, or link user interface elements or features to one or more elements of data file 1701a to facilitate collaborative user interface functionality (e.g., at a presentation layer) with respect to a user interface. Further, dataset analyzer 1730 may be configured to analyze data file 1701a relative to dataset-related data to determine correlations among dataset attributes of data file 1701a and other datasets 1703b (and attributes, such as metadata 1703a). Once a subset of correlations has been determined, a dataset formatted in data file 1701a (e.g., as an annotated tabular data file, or as a CSV file) may be enriched, for example, by associating links to the dataset of data file 1701a to form the dataset of data file 1701b, which, in some cases, may have a similar data format as data file 1701a (e.g., with data enhancements, corrections, and/or enrichments). Note that while format converter 1740 may be configured to convert any CSV, JSON, XML, XLS, RDF, etc. into RDF-related data formats, format converter 1740 may also be configured to convert RDF and non-RDF data formats into any of CSV, JSON, XML, XLS, MySQL, binary, XLS, RDF, etc. Note that the operations of dataset analyzer 1730 and format converter 1740 may be configured to operate in any order serially as well as in parallel (or substantially in parallel). For example, dataset analyzer 1730 may analyze datasets to classify portions thereof, either prior to format conversion by formatter converter 1740 or subsequent to the format conversion. In some cases, at least one portion of format conversion may occur during dataset analysis performed by dataset analyzer 1730.

Format converter 1740 may be configured to convert dataset of data file 1701b into an atomized dataset 1701c, which, in turn, may be stored in system repositories 1740a that may include one or more atomized data store (e.g., including at least one triplestore). Examples of functionalities to perform such conversions may include, but are not limited to, CSV2RDF data applications to convert CVS datasets to RDF datasets (e.g., as developed by Rensselaer Polytechnic Institute and referenced by the World Wide Web Consortium ("W3C")), R2RML data applications (e.g., to perform RDB to RDF conversion, as maintained by the World Wide Web Consortium ("W3C")), and the like.

As shown, dataset analyzer 1730 may include an inference engine 1732, which, in turn, may include a data classifier 1734 and a dataset enrichment manager 1736. Inference engine 1732 may be configured to analyze data in data file 1701a to identify tentative anomalies and to infer corrective actions, and to identify tentative data enrichments (e.g., by joining with, or linking to, other datasets) to extend the data beyond that which is in data file 1701a. Inference engine 1732 may receive data from a variety of sources to facilitate operation of inference engine 1732 in inferring or interpreting a dataset attribute (e.g., as a derived attribute) based on the analyzed data. Responsive to a request input data via data signal 1701*d*, for example, a user may enter a correct annotation via a user interface, which may transmit corrective data 1701*d* as, for example, an annotation or column heading. Or, a user may present one or more user inputs from which to select to confirm a predictive corrective action via data transmit to computing device 109*a*. Thus, the user may correct or otherwise provide for enhanced accuracy in atomized dataset generation "in-situ," or during the dataset ingestion and/or graph formation processes. As another example, data from a number of sources may include dataset metadata 1703*a* (e.g., descriptive data or information specifying dataset attributes), dataset data 1703*b* (e.g., some or all data stored in system repositories 1740*a*, which may store graph data), schema data 1703*c* (e.g., sources, such as schema.org, that may provide various types and vocabularies), ontology data 1703*d* from any suitable ontology (e.g., data compliant with Web Ontology Language ("OWL"), as maintained by the World Wide Web Consortium ("W3C")), and any other suitable types of data sources.

In one example, data classifier 1734 may be configured to analyze a column of data to infer a datatype of the data in the column. For instance, data classifier 1734 may analyze the column data to infer that the columns include one of the following datatypes: an integer, a string, a Boolean data item, a categorical data item, a time, etc., based on, for example, data from UI data 1701*d* (e.g., data from a UI representing an annotation or other data), as well as based on data from data 1703*a* to 1703*d*. In another example, data classifier 1734 may be configured to analyze a column of data to infer a data classification of the data in the column (e.g., where inferring the data classification may be more sophisticated than identifying or inferring a datatype). For example, consider that a column of ten (10) integer digits is associated with an unspecified or unidentified heading. Data classifier 1734 may be configured to deduce the data classification by comparing the data to data from data 1701*d*, and from data 1703*a* to 1703*d*. Thus, the column of unknown 10-digit data in data 1701*a* may be compared to 10-digit columns in other datasets that are associated with an annotation of "phone number." Thus, data classifier 1734 may deduce the unknown 10-digit data in data 1701*a* includes phone number data.

In the above example, consider that data in the column (e.g., in a CSV or XLS file) may be stored in a system of layer files, whereby raw data items of a dataset is stored at layer zero (e.g., in a layer zero ("L0") file). The datatype of the column (e.g., string datatype) may be stored at layer one (e.g., in a layer one ("L1") file, which may be linked to the data item at layer zero in the L0 file). An inferred dataset attribute, such as a "derive annotation," may indicate a column of ten (10) integer digits can be classified as a "phone number," which may be stored as annotative description data stored at layer two (e.g., in a layer two ("L2") file, which may be linked to the classification of "integer" at layer one, which, in turn, may be linked to the 10 digits in a column at layer zero). While not shown in FIG. 17, the system of layer files may be adaptive to add or remove data items, under control of the dataset ingestion controller 1720 (or any of its constituent components), at the various layers as datasets are expanded or modified to include additional data as well as annotations, references, statistics, etc. Another example of a layer system is described in reference to FIG. 12, among other figures herein.

In yet another example, inference engine 1732 may receive data (e.g., a datatype or data classification, or both) from an attribute correlator 1763. As shown, attribute correlator 1763 may be configured to receive data, including attribute data (e.g., dataset attribute data), from dataset ingestion controller 1720. Also, attribute correlator 1763 may be configured to receive data from data sources (e.g., UI-related/user inputted data 1701*d*, and data 1703*a* to 1703*d*), and from system repositories 1740*a*. Further, attribute correlator 1763 may be configured to receive data from one or more of external public repository 1740*b*, external private repository 1740*c*, dominion dataset attribute data store 1762, and dominion user account attribute data store 1762, or from any other source of data. In the example shown, dominion dataset attribute data store 1762 may be configured to store dataset attribute data for which collaborative dataset consolidation system may have dominion, whereas dominion user account attribute data store 1762 may be configured to store user or user account attribute data for data in its domain.

Attribute correlator 1763 may be configured to analyze the data to detect patterns that may resolve an issue. For example, attribute correlator 1763 may be configured to analyze the data, including datasets, to "learn" whether unknown 10-digit data is likely a "phone number" rather than another data classification. In this case, a probability may be determined that a phone number is a more reasonable conclusion based on, for example, regression analysis or similar analyses. Further, attribute correlator 1763 may be configured to detect patterns or classifications among datasets and other data through the use of Bayesian networks, clustering analysis, as well as other known machine learning techniques or deep-learning techniques (e.g., including any known artificial intelligence techniques). Attribute correlator 1763 also may be configured to generate enrichment data 1707*b* that may include probabilistic or predictive data specifying, for example, a data classification or a link to other datasets to enrich a dataset. According to some examples, attribute correlator 1763 may further be configured to analyze data in dataset 1701*a*, and based on that analysis, attribute correlator 1763 may be configured to recommend or implement one or more added columns of data. To illustrate, consider that attribute correlator 1763 may be configured to derive a specific correlation based on data 1707*a* that describe three (3) columns, whereby those three columns are sufficient to add a fourth (4th) column as a derived column. Thus, the fourth column may be derived by supplementing data 1701*a* with other data from other datasets or sources to generate a derived column (e.g., supplementing beyond dataset 1701*a*). Thus, dataset enrichment may be based on data 1701*a* only, or may be based on 1701*a* and any other number of datasets. In some cases, the data in the 4th column may be derived mathematically via one or more formulae. One example of a derived column is described in FIG. 20 and elsewhere herein. Therefore, additional data may be used to form, for example, additional "triples" to enrich or augment the initial dataset.

In yet another example, inference engine 1732 may receive data (e.g., enrichment data 1707*b*) from a dataset attribute manager 1761, where enrichment data 1707*b* may include derived data or link-related data to form collaborative datasets. Consider that attribute correlator 1763 can detect patterns in datasets in repositories 1740*a* to 1740*c*, among other sources of data, whereby the patterns identify or correlate to a subset of relevant datasets that may be linked with the dataset in data 1701*a*. The linked datasets may form a collaborative dataset that is enriched with supplemental information from other datasets. In this case, attribute correlator 1763 may pass the subset of relevant datasets as enrichment data 1707b to dataset enrichment manager 1736, which, in turn, may be configured to establish the links for a dataset in 1701b. A subset of relevant datasets may be identified as a supplemental subset of supplemental enrichment data 1707b. Thus, converted dataset 1701c (i.e., an atomized dataset) may include links to establish collaborative datasets formed with collaborative datasets.

Dataset attribute manager 1761 may be configured to receive correlated attributes derived from attribute correlator 1763. In some cases, correlated attributes may relate to correlated dataset attributes based on data in data store 1762 or based on data in data store 1764, among others. Dataset attribute manager 1761 also monitors changes in dataset and user account attributes in respective repositories 1762 and 1764. When a particular change or update occurs, collaboration manager 1760 may be configured to transmit collaborative data 1705 to user interfaces of subsets of users that may be associated the attribute change (e.g., users sharing a dataset may receive notification data that the dataset has been created, modified, linked, updated, associated with a comment, associated with a request, queried, or has been associated with any other dataset interactions).

Therefore, dataset enrichment manager 1736, according to some examples, may be configured to identify correlated datasets based on correlated attributes as determined, for example, by attribute correlator 1763. The correlated attributes, as generated by attribute correlator 1763, may facilitate the use of derived data or link-related data, as attributes, to form associate, combine, join, or merge datasets to form collaborative datasets. A dataset 1701b may be generated by enriching a dataset 1701a using dataset attributes to link to other datasets. For example, dataset 1701a may be enriched with data extracted from (or linked to) other datasets identified by (or sharing similar) dataset attributes, such as data representing a user account identifier, user characteristics, similarities to other datasets, one or more other user account identifiers that may be associated with a dataset, data-related activities associated with a dataset (e.g., identity of a user account identifier associated with creating, modifying, querying, etc. a particular dataset), as well as other attributes, such as a "usage" or type of usage associated with a dataset. For instance, a virus-related dataset (e.g., Zika dataset) may have an attribute describing a context or usage of dataset, such as a usage to characterize susceptible victims, usage to identify a vaccine, usage to determine an evolutionary history of a virus, etc. So, attribute correlator 1763 may be configured to correlate datasets via attributes to enrich a particular dataset.

According to some embodiments, one or more users or administrators of a collaborative dataset consolidation system may facilitate curation of datasets, as well as assisting in classifying and tagging data with relevant datasets attributes to increase the value of the interconnected dominion of collaborative datasets. According to various embodiments, attribute correlator 1763 or any other computing device operating to perform statistical analysis or machine learning may be configured to facilitate curation of datasets, as well as assisting in classifying and tagging data with relevant datasets attributes. In some cases, dataset ingestion controller 1720 may be configured to implement third-party connectors to, for example, provide connections through which third-party analytic software and platforms (e.g., R, SAS, Mathematica, etc.) may operate upon an atomized dataset in the dominion of collaborative datasets. For instance, dataset ingestion controller 1720 may be configured to implement API endpoints to provide or access functionalities provided by analytic software and platforms, such as R, SAS, Mathematica, etc.

Figure 18:
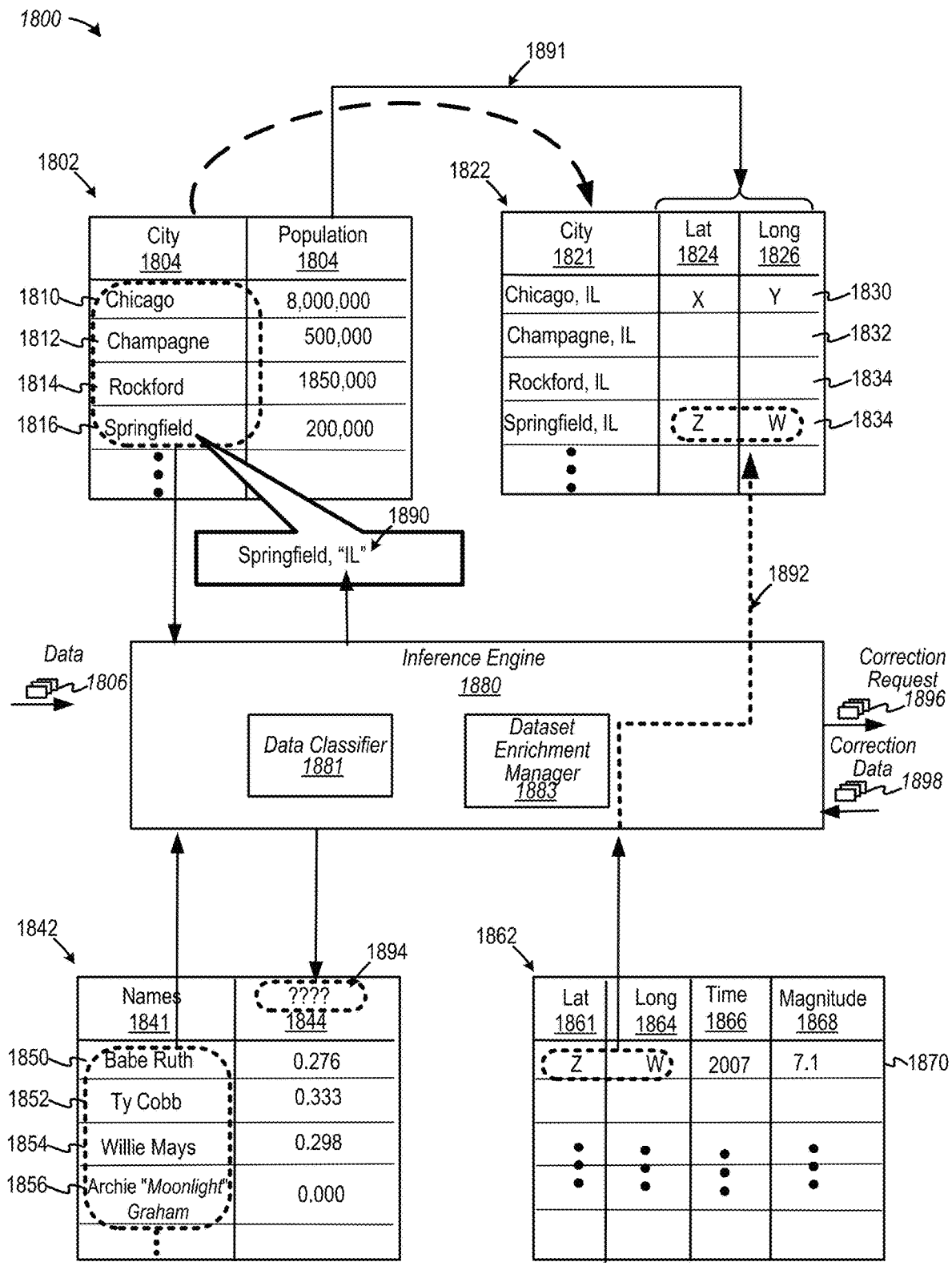
FIG. 18 is a diagram depicting operation of an example of an inference engine, according to some embodiments.

FIG. 18 is a diagram depicting operation of an example of an inference engine, according to some embodiments. Diagram 1800 depicts an inference engine 1880 including a data classifier 1881 and a dataset enrichment manager 1883, whereby inference engine 1880 is shown to operate on data 1806 (e.g., one or more types of data described in FIG. 17), and further operates on annotated tabular data representations of dataset 1802, dataset 1822, dataset 1842, and dataset 1862. Dataset 1802 includes rows 1810 to 1816 that relate each population number 1804 to a city 1802. Dataset 1822 includes rows 1830 to 1836 that relate each city 1821 to both a geo-location described with a latitude coordinate ("lat") 1824 and a longitude coordinate ("long") 1826. Dataset 1842 includes rows 1850 to 1856 that relate each name 1841 to a number 1844, whereby column 1844 omits an annotative description of the values within column 1844. Dataset 1862 includes rows, such as row 1870, that relate a pair of geo-coordinates (e.g., latitude coordinate ("lat") 1861 and a longitude coordinate ("long") 1864) to a time 1866 at which a magnitude 1868 occurred during an earthquake.

Inference engine 1880 may be configured to detect a pattern in the data of column 1804 in dataset 1802. For example, column 1804 may be determined to relate to cities in Illinois based on the cities shown (or based on additional cities in column 1804 that are not shown, such as Skokie, Cicero, etc.). Based on a determination by inference engine 1880 that cities 1804 likely are within Illinois, then row 1816 may be annotated to include annotative portion ("IL") 1890 (e.g., as derived supplemental data) so that Springfield in row 1816 can be uniquely identified as "Springfield, Ill." rather than, for example, "Springfield, Nebr." or "Springfield, Mass." Further, inference engine 1880 may correlate columns 1804 and 1821 of datasets 1802 and 1822, respectively. As such, each population number in rows 1810 to 1816 may be correlated to corresponding latitude 1824 and longitude 1826 coordinates in rows 1830 to 1834 of dataset 1822. Thus, dataset 1802 may be enriched by including latitude 1824 and longitude 1826 coordinates as a supplemental subset of data. In the event that dataset 1862 (and latitude 1824 and longitude 1826 data) are formatted differently than dataset 1802, then latitude 1824 and longitude 1826 data may be converted to an atomized data format (e.g., compatible with RDF). Thereafter, a supplemental atomized dataset can be formed by linking or integrating atomized latitude 1824 and longitude 1826 data with atomized population 1804 data in an atomized version of dataset 1802. Similarly, inference engine 1880 may correlate columns 1824 and 1826 of dataset 1822 to columns 1861 and 1864. As such, earthquake data in row 1870 of dataset 1862 may be correlated to the city in row 1834 ("Springfield, Ill.") of dataset 1822 (or correlated to the city in row 1816 of dataset 1802 via the linking between columns 1804 and 1821). The earthquake data may be derived via latitude and longitude coordinate-to-earthquake correlations as supplemental data for dataset 1802. Thus, new links (or triples) may be formed to supplement population data 1804 with earthquake magnitude data 1868.

Inference engine 1880 also may be configured to detect a pattern in the data of column 1841 in dataset 1842. For example, inference engine 1880 may identify data in rows 1850 to 1856 as "names" without an indication of the data classification for column 1844. Inference engine 1880 can analyze other datasets to determine or learn patterns associated with data, for example, in column 1841. In this example, inference engine 1880 may determine that names 1841 relate to the names of "baseball players." Therefore, inference engine 1880 determines (e.g., predicts or deduces) that numbers in column 1844 may describe "batting averages." As such, a correction request 1896 may be transmitted to a user interface to request corrective information or to confirm that column 1844 does include batting averages. Correction data 1898 may include an annotation (e.g., batting averages) to insert as annotation 1894, or may include an acknowledgment to confirm "batting averages" in correction request data 1896 is valid. Note that the functionality of inference engine 1880 is not limited to the examples describe in FIG. 18 and is more expansive than as described in the number of examples. In some examples, determination of a column header, such as column header 1844, may be associated with an annotation that may be automatically determined (e.g., based on inferred data that determines an annotative description of data for a column), or may be entered semi-automatically or manually.

Figure 19:
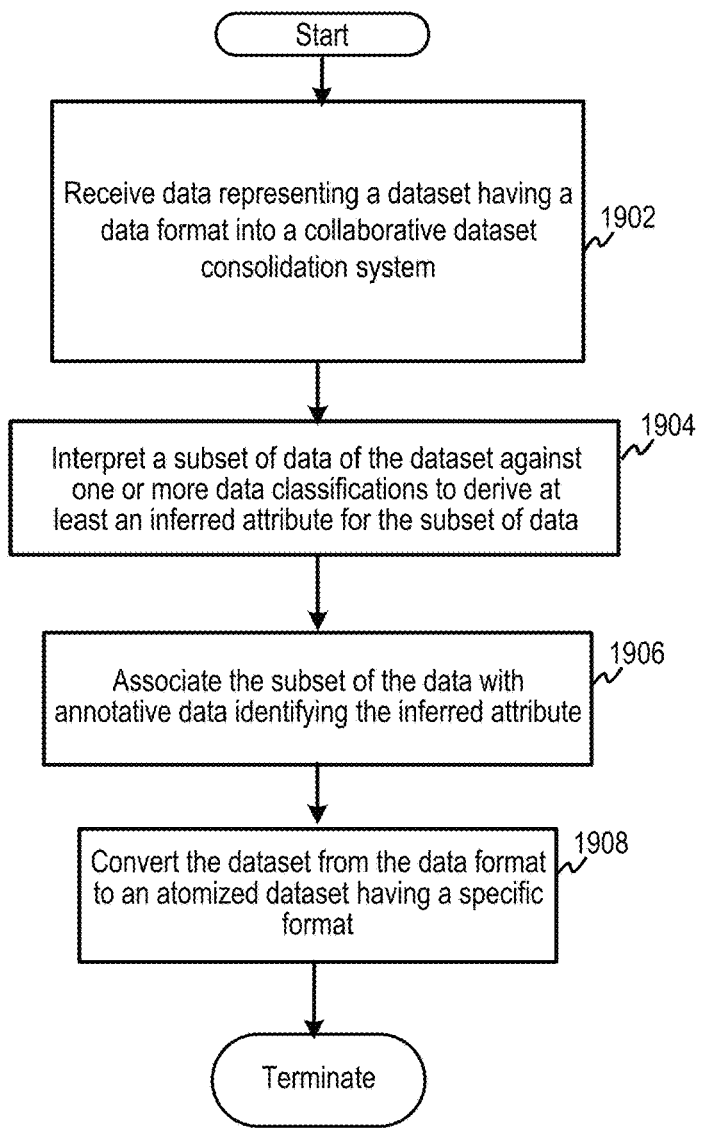
FIG. 19 is a diagram depicting a flow diagram as an example of ingesting an enhanced dataset into a collaborative dataset consolidation system, according to some embodiments.

FIG. 19 is a diagram depicting a flow diagram as an example of ingesting an enhanced dataset into a collaborative dataset consolidation system, according to some embodiments. Diagram 1900 depicts a flow for an example of inferring dataset attributes and generating an atomized dataset in a collaborative dataset consolidation system. At 1902, data representing a dataset having a data format may be received into a collaborative dataset consolidation system. The dataset may be associated with an identifier or other dataset attributes with which to correlate the dataset. At 1904, a subset of data of the dataset is interpreted against subsets of data (e.g., columns of data) for one or more data classifications (e.g., datatypes) to infer or derive at least an inferred attribute for a subset of data (e.g., a column of data). In some examples, the subset of data may relate to a columnar representation of data in a tabular data format, or CSV file, with, for example, columns annotated. Annotations may include descriptions of a data type (e.g., string, numeric, categorical, etc.), a data classification (e.g., a location, such as a zip code, etc.), or any other data or metadata that may be used to locate in a search or to link with other datasets.

To illustrate, consider that a subset of data attributes (e.g., dataset attributes) may be identified with a request to create a dataset (e.g., to create a linked dataset), or to perform any other operation (e.g., analysis, data insight generation, dataset atomization, etc.). The subset of dataset attributes may include a description of the dataset and/or one or more annotations the subset of dataset attributes. Further, the subset of dataset attributes may include or refer to data types or classifications that may be association with, for example, a column in a tabular data format (e.g., prior to atomization or as an alternate view). Note that in some examples, one or more data attributes may be stored in one or more layer files that include references or pointers to one or more columns in a table for a set of data. In response to a request for a search or creation of a dataset, the collaborative dataset consolidation system may retrieve a subset of atomized datasets that include data equivalent to (or associated with) one or more of the dataset attributes.

So if a subset of dataset attributes includes alphanumeric characters (e.g., two-letter codes, such as "AF" for Afghanistan), then a column can be identified as including country code data (e.g., a column includes data cells with AF, BR, CA, CN, DE, JP, MX, UK, US, etc.). Based on the country codes as a "data classification," the collaborative dataset consolidation system may correlate country code data in other atomized datasets to a dataset of interest (e.g., a newly-created dataset, an analyzed dataset, a modified dataset (e.g., with added linked data), a queried dataset, etc.). Then, the system may retrieve additional atomized datasets that include country codes to form a collaborative dataset. The consolidation may be performed automatically, semi-automatically (e.g., with at least one user input), or manually. Thus, these datasets may be linked together by country codes. Note that in some cases, the system may implement logic to "infer" that two letters in a "column of data" of a tabular, pre-atomized dataset includes country codes. As such, the system may "derive" an annotation (e.g., a data type or classification) as a "country code." Therefore, the derived classification of "country code" may be referred to as a derived attribute, which, for example, may be stored in a layer two (2) data file, examples of which are described herein (e.g., FIGS. 6 and 12, among others). A dataset ingestion controller may be configured to analyze data and/or dataset attributes to correlate the same over multiple datasets, the dataset ingestion controller being further configured to infer a data type or classification of a grouping of data (e.g., data disposed in a column or any other data arrangement), according to some embodiments.

At 1906, the subset of the data may be associated with annotative data identifying the inferred attribute. Examples of an inferred attribute include the inferred "baseball player" names annotation and the inferred "batting averages" annotation, as described in FIG. 18. At 1908, the dataset may be converted from the data format to an atomized dataset having a specific format, such as an RDF-related data format. The atomized dataset may include a set of atomized data points, whereby each data point may be represented as an RDF triple. According to some embodiments, inferred dataset attributes may be used to identify subsets of data in other dataset, which may be used to extend or enrich a dataset. An enriched dataset may be stored as data representing "an enriched graph" in, for example, a triplestore or an RDF store (e.g., based on a graph-based RDF model). In other cases, enriched graphs formed in accordance with the above, and any implementation herein, may be stored in any type of data store or with any database management system.

Figure 20:
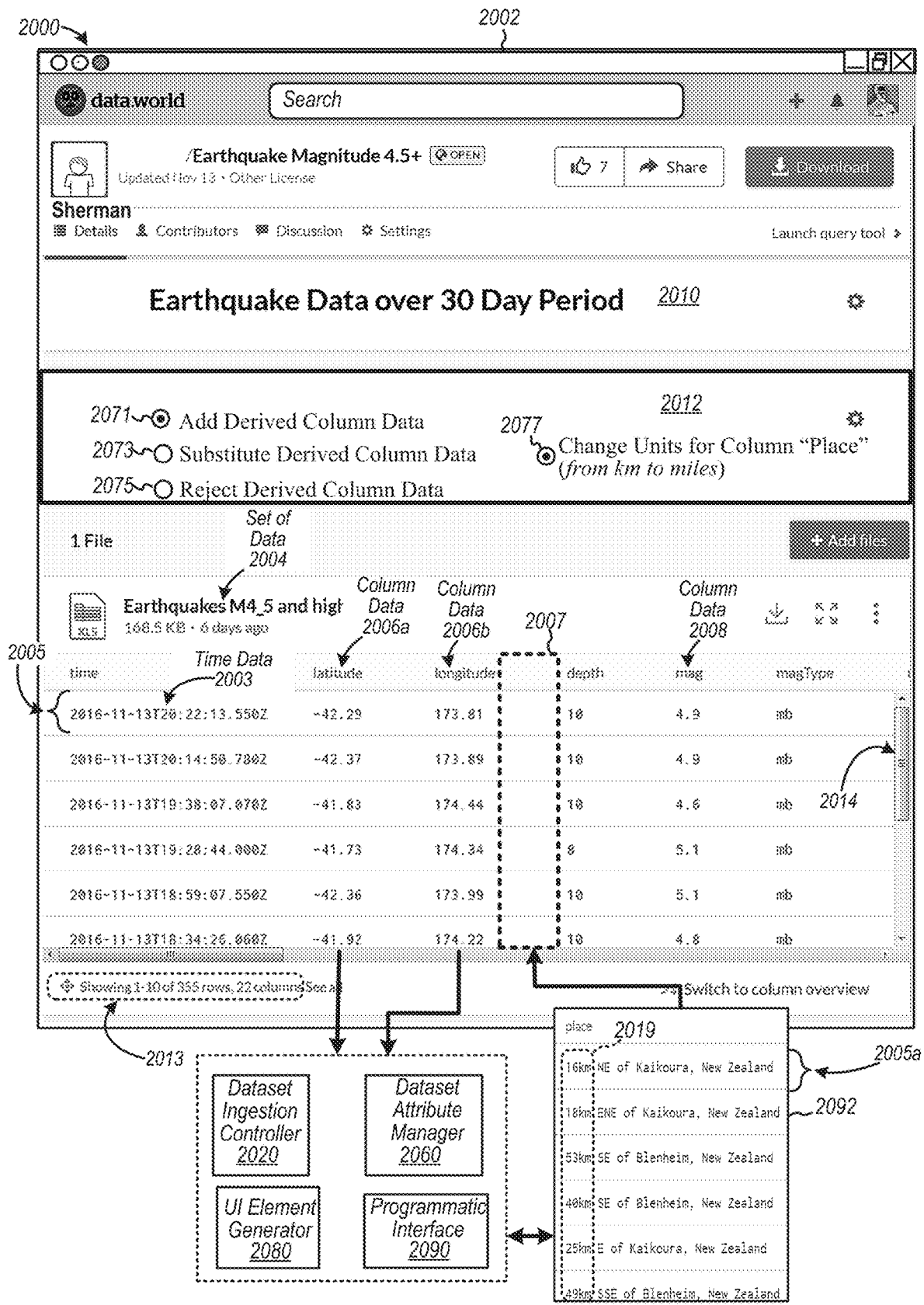
FIG. 20 is a diagram depicting a user interface in association with generation and presentation of the derived subset of data, according to some examples.

FIG. 20 is a diagram depicting a user interface in association with generation and presentation of the derived subset of data, according to some examples. Diagram 2000 depicts a user interface 2002 as an example of a computerized tool to modify collaborative datasets and to present such modified datasets automatically, semi-automatically, or manually. User interface 2002 presents the data preview of a dataset that includes earthquake data and is entitled "Earthquake Data over 30 Day Period" 2010. Data preview mode 2013 indicates that rows 1-10 of set of data 2004, which includes 355 rows and 22 columns of data, are available to preview via a user interface element 2014 (e.g., via "scroll bar"). The dataset originates from a set of data 2004, which is entitled "Earthquakes M4_5 and higher" and includes data describing geolocations, among other things (e.g., earthquake magnitudes, etc.), related to earthquakes having a magnitude 4.5 or higher.

Diagram 2000 depicts a dataset ingestion controller 2020, a dataset attribute manager 2060, a user interface generator 2080, and a programmatic interface 2090 configured to generate a derived column 2092 and to present user interface elements 2012 to determine data signals to control modification of the dataset. One or more elements depicted in diagram 2000 of FIG. 20 may include structures and/or functions as similarly-named or similarly-numbered elements depicted in other drawings, or as otherwise described herein, in accordance with one or more examples. As shown, the dataset may be presented in a tabular format arranged in rows of data in accordance with a specific time (e.g., column 2003 data). The dataset is shown to include column data 2006a (i.e., latitude coordinates), column data 2006b (i.e., longitude coordinates), a column including depth data (e.g., depth of earthquake in kilometers from surface), a column 2008 including magnitude data (e.g., size of earthquake), a column including a type of magnitude of the earthquake (e.g., magnitude type "mb" refers to an earthquake magnitude based on a short period body wave to compute the amplitude of a P body-wave).

Logic in one or more of dataset ingestion controller 2020, dataset attribute manager 2060, user interface generator 2080, and programmatic interface 2090 may be configured to analyze columns of data, such as latitude column data 2006a and longitude column data 2006b, to determine whether to derive one or more dataset attributes that may represent a derived column of data. In the example shown, the logic is configured to generate a derived column 2092, which may be presented automatically in portion 2007 of user interface 2002 as an additionally-derived column. As shown, derived column 2092 may include an annotated column heading "place," which may be determined automatically or otherwise. Hence, the "place" of an earthquake can be calculated (e.g., using a data derivation calculator or other logic) to determine a geographic location based on latitude and longitude data of an earthquake event (e.g., column data 2006a and 2006b) at a distance 2019 from a location of a nearest city. For example, an earthquake event and its data in row 2005 may include derived distance data of "16 km," as a distance 2019, from a nearest city "Kaikoura, New Zealand" in derived row portion 2005a. According to some examples, a data derivation calculator or other logic may perform computations to convert 16 km into units of miles and store that data in a layer file. Data in derived column 2092 may be stored in a layer file that references the underlying data of the dataset.

Further to user interface elements 2012, a number of user inputs may be activated to guide the generation of a modify dataset. For example, input 2071 may be activated to add derived column 2092 to the dataset. Input 2073 may be activated to substitute and replace columns 2006a and 2006b with derived column 2092. Input 2075 may be activated to reject the implementation of derived column 2092. In some examples, input 2077 may be activated to manually convert units of distance from kilometers to miles. The generation of the derived column 2092 is but one example, and various numbers and types of derived columns (and data thereof) may be determined.

Figure 21:
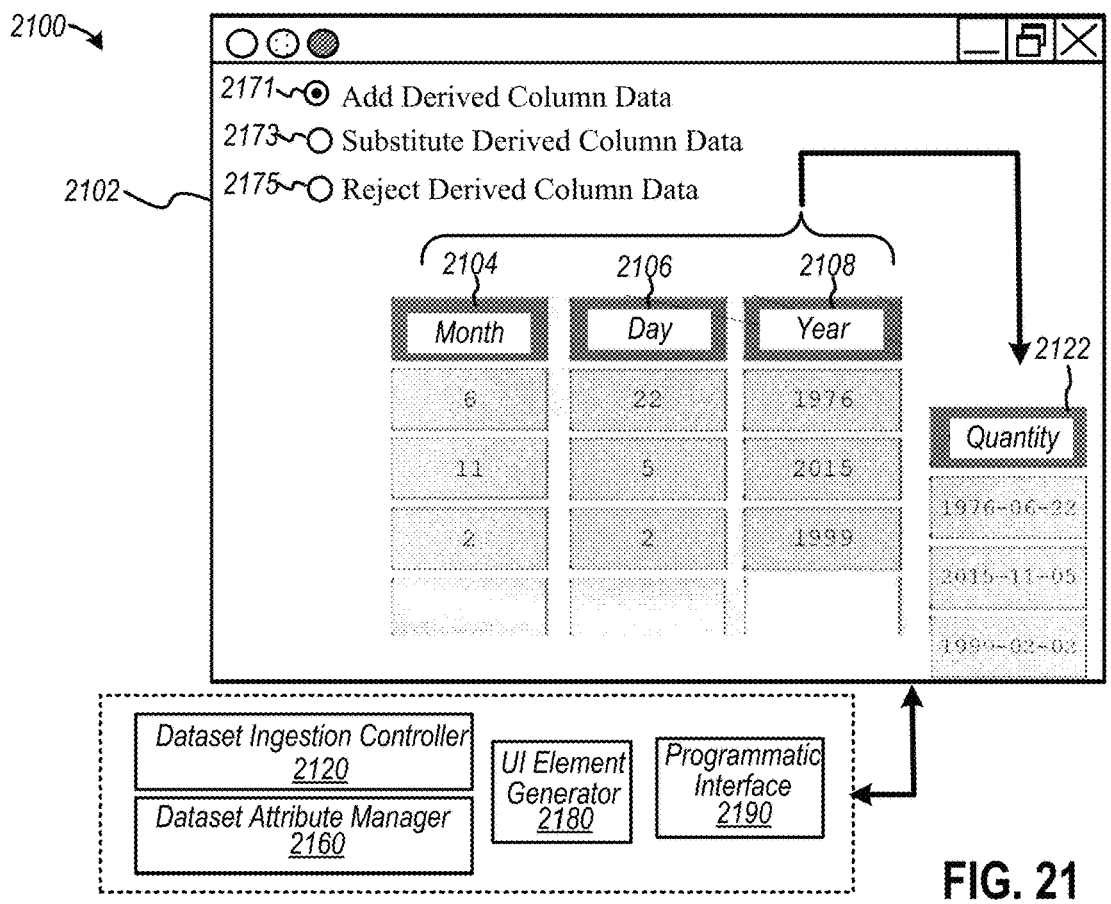
FIGS. 21 and 22 are diagrams depicting examples of generating and presenting derived columns and derived data, according to some examples.
Figure 22:
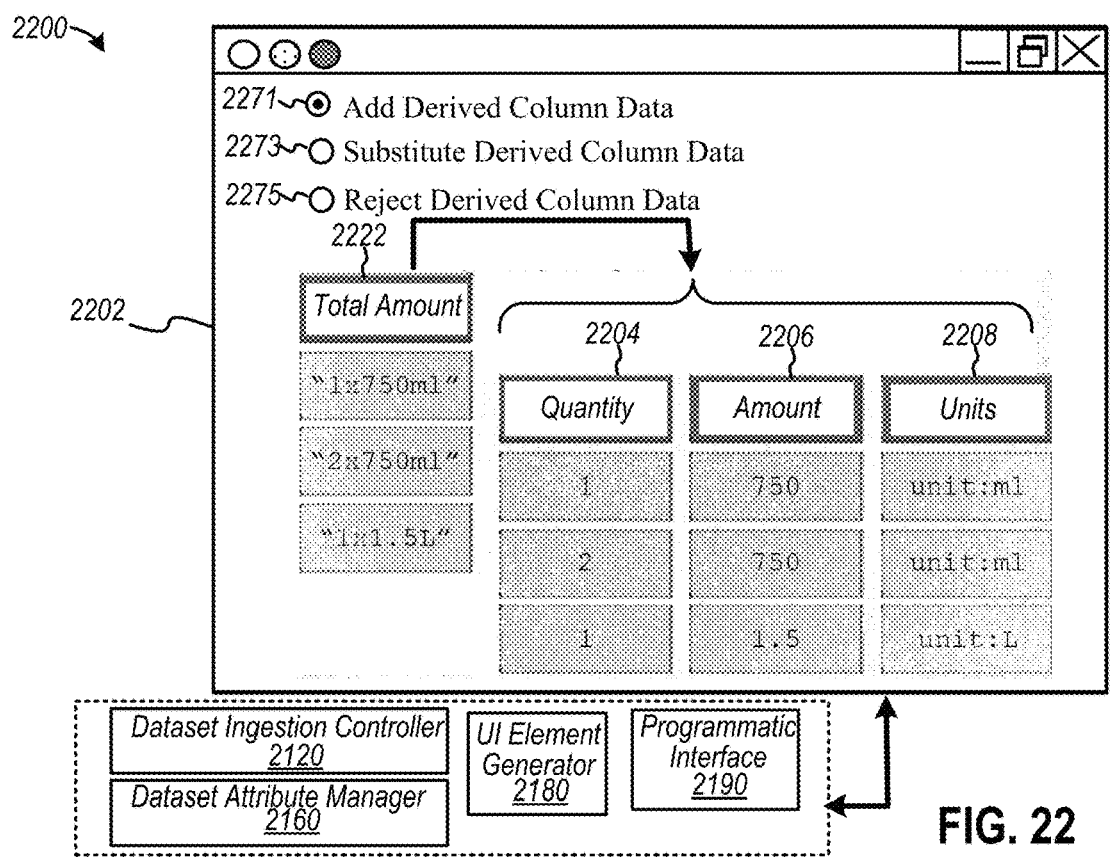

FIGS. 21 and 22 are diagrams depicting examples of generating derived columns and derived data, according to some examples. Diagram 2100 of FIG. 21 and diagram 2200 of FIG. 22 depict a dataset ingestion controller 2120, a dataset attribute manager 2160, a user interface generator 2180, and a programmatic interface 2190, one or more of which includes logic configured to each generate one or more derived columns. One or more elements depicted in diagrams 2100 and 2200 may include structures and/or functions as similarly-named or similarly-numbered elements depicted in other drawings, or as otherwise described herein, in accordance with one or more examples.

In diagram 2100, the logic may be configured to generate derived column 2122 (e.g., automatically) based on aggregating data in column 2104, which includes data representing a month, data in column 2106, which includes data representing a day, and data in column 2108, which includes data representing a year. Column 2122 may be viewed as a collapsed version of columns 2104, 2106, and 2108, according to some examples. Therefore, the logic can generate derived column 2122 that can be presented in user interface 2102 in a particular date format. Note, too, that column annotations, such as "month," "day," "year," and "quantity," can be used for linking and searching datasets as described herein. Further, diagram 2100 depicts that a user interface 2102 may optionally include user interface elements 2171, 2173, and 2175 to determine data signals to control modification of the dataset for respectively "adding," "substituting," or "rejecting," mentation of derived column data.

In diagram 2200, the logic may be configured to generate derived columns 2204, 2206, and 2208 based on data in column 2222 and related data characteristics. Derived columns 2204, 2206, and 2208 may also be presented in user interface 2202. Derived columns 2204, 2206, and 2208 may be viewed as expanded versions of column 2222, according to some examples. Therefore, the logic can extract data with which to, for example, infer additional or separate datatypes or data classifications. For example, the logic may be configured to split or otherwise transform (e.g., automatically) data in column 2222, which represents a "total amount," into derived column 2204, which represents a quantity, derived column 2206, which represents an amount, and derived column 2208, which includes data representing a unit type (e.g., milliliter, or "ml"). Note, too, that column annotations, such as "total amount," "quantity," "amount," and "units," can be used for linking and searching datasets as described herein. Further, diagram 2200 depicts that a user interface 2202 may optionally include user interface elements 2271, 2273, and 2275 to determine data signals to control modification of the dataset for respectively "adding," "substituting," or "rejecting," implementation of derived column data.

Figure 23:
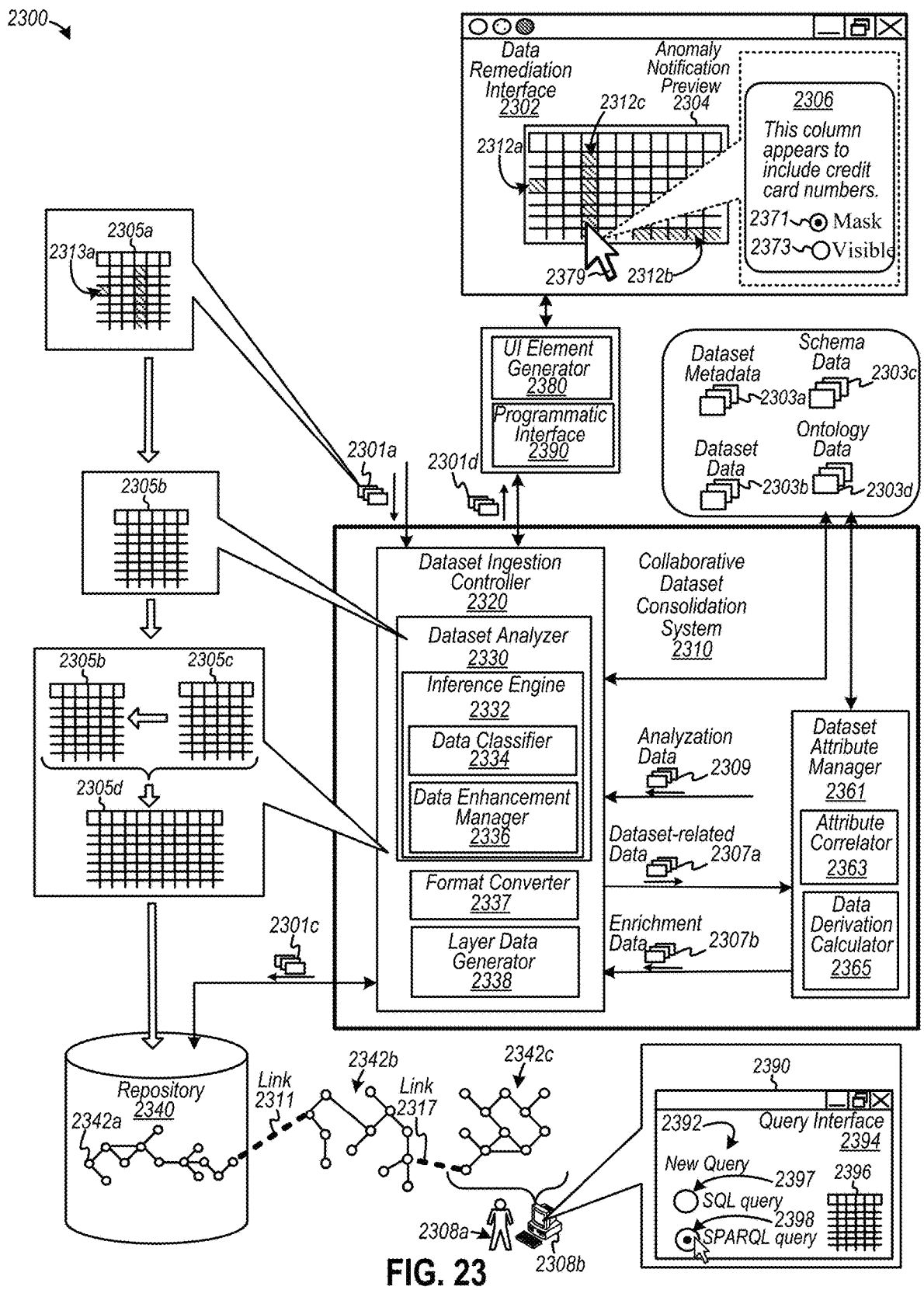
FIG. 23 is a diagram depicting an example of a dataset ingestion controller configured to analyze and modify datasets to enhance accuracy thereof, according to some embodiments.

FIG. 23 is a diagram depicting an example of a dataset ingestion controller configured to analyze and modify datasets to enhance accuracy thereof, according to some embodiments. Diagram 2300 depicts an example of a collaborative dataset consolidation system 2310 that may be configured to consolidate one or more datasets to form collaborative datasets based on remediated data to enhance, for example, accuracy and reliability of datasets configured to be shared and repurposed by a community of user datasets. Diagram 2300 depicts an example of a collaborative dataset consolidation system 2310, which is shown in this example as including a dataset ingestion controller 2320 configured to remediate datasets, such as dataset 2305a (ingested data 2301a), prior to optional conversion into another format (e.g., a graph data structure) that may be stored in repository 2340. As shown, dataset ingestion controller 2320 may also include a dataset analyzer 2330, a format converter 2337, and a layer data generator 2338. Also shown, dataset analyzer 2330 may include an inference engine 2332, which may include a data classifier 2334 and a data enhancement manager 2336. Further to diagram 2300, collaborative dataset consolidation system 2310 is shown also to include a dataset attribute manager 2361, which includes an attribute correlator 2363 and a data derivation calculator 2365. Dataset ingestion controller 2320 and dataset attribute manager 2361 may be communicatively coupled to dataset ingestion controller 2320 to exchange dataset-related data 2307a and enrichment data 2307b, both of which may exchange data from a number of sources (e.g., external data sources) that may include dataset metadata 2303a (e.g., descriptor data or information specifying dataset attributes), dataset data 2303b (e.g., some or all data stored in system repositories 2340, which may store graph data), schema data 2303c (e.g., sources, such as schema.org, that may provide various types and vocabularies), ontology data 2303d from any suitable ontology and any other suitable types of data sources. One or more elements depicted in diagram 2300 of FIG. 23 may include structures and/or functions as similarly-named or similarly-numbered elements depicted in other drawings, or as otherwise described herein, in accordance with one or more examples.

According to some examples, dataset analyzer 2330 and any of its components, including inference engine 2332, may be configured to analyze an imported or uploaded dataset 2305a to detect or determine whether dataset 2305a has an anomaly relating to data (e.g., improper or unexpected data formats, types or values) or to a structure of a data arrangement in which the data is disposed. For example, inference engine 2332 may be configured to analyze data in dataset 2305a to identify tentative anomalies and to determine (e.g., infer or predict) one or more corrective actions. In some cases, inference engine 2332 may predict a most-likely solution relative to other solutions for presentation via data 2301d in a user interface, such as data remediation interface 2302, to resolve a detected defect in dataset 2305a. Responsive to request input data via data signal 2301d, for example, data remediation interface 2302 may receive an instruction to correct an anomaly (e.g., correct or confirm data that refers to a U.S. state name, such as "Texas"), whereby data remediation interface 2302 may transmit the instruction to collaborative dataset consolidation system 2310 for remediation. Or, a user may confirm an action via data 2301d to be performed, whereby the action may be predicted or probabilistically determined by performing various computation, by matching data patterns, etc. For example, an action may be determined or predicted based on statistical computations, including Bayesian techniques, deep-learning techniques, etc.). In some implementations, a user may be presented with a set of selections (e.g., most probable corrective actions) via data remediation interface 2320 from which to select for execution. Therefore, data remediation interface 2302 may facilitate corrections to dataset 2305a "in-situ" or "in-line" (e.g., in real time or near real time) to enhance accuracy in atomized dataset generation during the dataset ingestion and/or graph formation processes.

In this example, dataset ingestion controller 2320 is shown to communicatively couple to a user interface, such as data remediation interface 2302 via one or both of a user interface ("UI") element generator 2380 and a programmatic interface 2390 to exchange data and/or commands (e.g., executable instructions) for facilitating data remediation of dataset 2305a. UI element generator 2380 may be configured to generate data representing UI elements to facilitate the generation of data remediation interface 2302 and graphical elements thereon. For example, UI generator 2380 may cause generation UI elements, such as a container window (e.g., icon to invoke storage, such as a file), a browser window, a child window (e.g., a pop-up window), a menu bar (e.g., a pull-down menu), a context menu (e.g., responsive to hovering a cursor over a UI location), graphical control elements (e.g., user input buttons, check boxes, radio buttons, sliders, etc.), and other control-related user input or output UI elements. Programmatic interface 2390 may include logic configured to interface collaborative dataset consolidation system 2310 and any computing device configured to present data remediation interface 2302 via, for example, any network, such as the Internet. In one example, programmatic interface 2390 may be implemented to include an applications programming interface ("API") (e.g., a REST API, etc.) configured to use, for example, HTTP protocols (or any other protocols) to facilitate electronic communication. According to some examples, user interface ("UI") element generator 2380 and a programmatic interface 2390 may be implemented in collaborative dataset consolidation system 2310, in a computing device associated with data remediation interface 2302, or a combination thereof.

To illustrate an example of operation of dataset analyzer 2330, consider that dataset analyzer 2330 (or any of its constituent components) may analyze dataset 2305a being ingested as data 2301a into collaborative dataset consolidation system 2310 for remediation, conversion and storage in repository 2340 as dataset 2342a in a graph data arrangement. In this example, dataset analyzer 2330 may receive data 2301a representing a subset of data disposed in data fields (e.g., cells of a spreadsheet) of a data arrangement in which dataset 2305a is disposed or otherwise associated. Dataset 2305a is depicted in diagram 2300 as having one or more deficiencies or anomalies 2313a.

According to some examples, dataset analyzer 2330 may be configured to receive analyzation data 2309 from, for example, a data repository (not shown) to define or direct operation of dataset analyzer 2330 to detect a subset of anomalies specified by analyzation data 2309. Analyzation data 2309 may include data representing one or more data attributes with which to analyze dataset 2305a. In some examples, a data attribute may be associated with a property or characteristic of data (or a structure in which the data resides) and a value (or range of values) with which dataset analyzer 2330 performs analysis. Analyzation data 2309 may also include executable instructions with which to execute to remediate a specific anomaly defined by a property and/or value.

In one example, data representing a property of data may describe, as an anomaly, a blank cell 2313a in dataset 2305a. A corresponding value for detecting a blank cell property may be a data value of "00" (e.g., as an ASCII control character) that represents a NULL value (or a non-value) within, for example, a cell of a spreadsheet data arrangement. Responsive to receiving analyzation data 2309 to detect a blank cell, dataset analyzer 2330 may be configured to analyze a subset of data of dataset 2305a to detect whether a non-compliant data attribute exists. So, dataset analyzer 2330 may match a blank cell property value of "00" (e.g., a null value) against cells of spreadsheet data structure, and upon detecting a match, dataset analyzer 2330 may generate an indication that a condition is detected in which a non-compliant data attribute (i.e., a blank cell) is present. For example, dataset analyzer 2330 may transmit data 2301d to data remediation interface 2302 to present an anomaly notification preview 2304 depicting a location 2312a as a "blank cell" in a table. While not shown, data remediation interface 2302 may present a user input selection with which interface 2302 may invoke an action to modify dataset 2305a to address or otherwise correct a condition (e.g., an anomalous condition). For example, a user input transmitted as data 2301d to dataset analyzer 2330 may initiate an action, such as "ignoring" the blank cell, modifying the blank cell to include "48" (e.g., an ASCII representation of the value "zero"), or any other action.

In another example, data representing another property can define an anomaly as "a duplicated row of data" in dataset 2305a. In this case, the value of the data attribute is extracted from dataset 2305a and matched against other fields or cells in rows of 2305a. So, dataset analyzer 2330 may match a row against other rows (portions thereof), and upon detecting a match, dataset analyzer 2330 may generate an indication that a condition is present in which at least one row is a duplicate row. Dataset analyzer 2330 may transmit data 2301*d* to data remediation interface 2302 to present an indication of "a duplicated row of data" in anomaly notification preview 2304. While not shown, data remediation interface 2302 may present a user input selection with which interface 2302 may invoke an action to modify dataset 2305*a* to remediate the condition, such as deleting the duplicate row of data.

In yet another example, data representing a property may define "a numeric outlier" as an anomaly in dataset 2305*a*. In this case, the value of the data attribute may define a threshold value (or range of values) specifying that a numeric value in a cell in dataset 2305*a* is an "outlier" or "out-of-range," and thus may not be a valid value. So, dataset analyzer 2330 may analyze values of a row or a column to compute, for example, standard deviation values, and if any data value in a cell exceeds a threshold value of, for example, four (4) standard deviation, dataset analyzer 2330 may transmit data 2301*d* to present an indication that "a numeric outlier" is present in dataset 2305*a*. While not shown, data remediation interface 2302 may present a user input selection with which interface 2302 may invoke an action to modify dataset 2305*a* to remediate the condition, such as "ignoring" the numeric outlier value, modifying cell data to include a corrected and valid value that is, for instance, within four standard deviations. Or, data remediation interface 2302 may present any other action.

In one example, data representing a property may define "restricted data value" as an anomaly in dataset 2305*a*. A detected "restricted data value" may indicate the presence of sensitive or confidential data that ought be inaccessible to external entities that may wish to link to, or otherwise use, data within dataset 2305*a*. Examples of restricted data values include credit card numbers, Social Security numbers, bank routing numbers, names, contact information, and the like. In this case, value(s) of a data attribute may define patterns of data matching numeric values having, for example, a format "000-00-0000," which specifies whether a cell includes a Social Security number (if matched). Or, value(s) of a data attribute may define patterns of data that match numeric values having, for example, a credit card number format "3xxx xxxxxx xxxxx" (e.g., AMEX™), a format "4xxx xxxx xxxx xxxx" (e.g., VISA™) or the like. So, dataset analyzer 2330 may match values in dataset 2305*a* to detect whether a credit card is present. Upon detecting a column having restricted data values, dataset analyzer 2330 may transmit an indication via data 2301*d* to present a column having a condition 2312*c* in data remediation interface 2302. As shown, user interface 2302 may present a user input selection 2306 within interface 2302 to invoke an action to modify dataset 2305*a* to remediate the condition, such as "masking" restricted data values, deleting restricted data values, or performing any other action. As shown, an action to "mask" restricted data values may be invoked via input 2371, or an action to "ignore" the data may be invoked via input 2373. The actions may be selectable by a pointing device 2379 (e.g., a cursor or via a touch-sensitive display).

Analyzation data 2309 may include a set (e.g., a superset) of attributes (e.g., attribute properties and values) that are directed to remediating any number of different datasets in various data structures. According to yet still another example, analyzation data 2309 may be configured to include configurable attribute properties and values with which to remediate or correct a specific type of dataset 2305*a*, such as a proprietary dataset. For example, a user or entity may wish to import into collaborative dataset consolidation system 2310 a subset of configurable data attributes with which to apply against subset of data during ingestion that are specific to that entity. If, for instance, the entity is a merchant, configurable data attributes may be formed to test whether entity-specific data meets certain levels of quality. For example, the merchant may include in an entity-specific dataset 2305*a* a column that includes a list of valid stock keeping units ("SKUs") associated with a merchant's product offering. The column may be tagged or labeled "product identifiers," and may also have a column header with the same text. Therefore, the merchant may generate and entities-specific property of "product identifiers" that has values representing valid SKUs. So, as subsequent datasets 2305*a* are uploaded, dataset analyzer 2330 may detect and flag or remediate an invalid SKU that fails to match against a list of valid SKUs. In at least one example, a configurable data attribute is an attribute adapted or created external to collaboration dataset consolidation system 2310, and may be uploaded from a client computing device to guide customized data ingestion. According to various examples, any number of attributes, attribute properties, and values may be implemented in analyzation data 2309. Note that according to some examples, the term "attribute" may refer to, or may interchangeable with, the term "property."

Subsequent to performing corrective actions to remediate issues related to dataset 2305*a*, dataset analyzer 2330 may generate or form dataset 2305*b*, which is a remediated version of 2305*a*. Remediated dataset 2305*b* may be formatted in, or adapted to conform to, a tabular arrangement. Further, one or more components of dataset analyzer 2330, including data enhancement manager 2336, may operate collaboratively with dataset attribute manager 2361 to correlate dataset attributes of 2305*b* to other dataset attributes of other datasets, such as datasets 2342*b* and 2342*c*, and to generate a consolidated datasets 2305*d*. As such, data in dataset 2305*a* may be linked to data in dataset 2305*b*. Format converter 2337 may be configured to convert consolidated dataset 2305*d* into another format, such as a graph data arrangement 2342*a*, which may be transmitted as data 2301*c* for storage in data repository 2340. Graph data arrangement 2342*a* in diagram 2300 may include links with one or more modified subsets of the data, which may have been modified to remediate the underlying data. Also, graph data arrangement 2342*a* may be linkable (e.g., via links 2311 and 2317) to other graph data arrangements to form a collaborative dataset.

Format converter 2337 may be configured to generate ancillary data or descriptor data (e.g., metadata) that describe attributes associated with each unit of data in dataset 2305*d*. The ancillary or descriptor data can include data elements describing attributes of a unit of data, such as, for example, a label or annotation (e.g., header name) for a column, an index or column number, a data type associated with the data in a column, etc. In some examples, a unit of data may refer to data disposed at a particular row and column of a tabular arrangement (e.g., originating from a cell in dataset 2305*a*). Layer data generator 2336 may be configured to form linkage relationships of ancillary data or descriptor data to data in the form of "layers" or "layer data files." As such, format converter 2337 may be configured to form referential data (e.g., IRI data, etc.) to associate a datum (e.g., a unit of data) in a graph data arrangement to a portion of data in a tabular data arrangement. Thus, data operations, such as a query, may be applied against a datum of the tabular data arrangement as the datum in the graph data arrangement.

Further to diagram 2300, a user 2308a may be presented via computing device 2308b a query interface 2394 in a display 2390. Query interface 2394 facilitates performance of a query (e.g., new query 2392) applied against a collaborative dataset including datasets 2342a, dataset 2342b, and dataset 2342c. In some examples, query interface 2394 may present data of the collaborative dataset in a tabular form 2396, whereby data in tabular form 2396 may be linked to an underlying graph data arrangement. Thus, query 2397 may be applied as either a query against a tabular data arrangement (e.g., based on a relational data model) or graph data arrangement (e.g., based on a graph data model, such using RDF). In the example shown, either a SQL query 2397 (e.g., a table-directed query) or a SPARQL query 2398 (e.g., a graph-directed query) may be used against, for example, a common subset of data including datasets 2342a, dataset 2342b, and dataset 2342c.

In view of the foregoing, the structures and/or functionalities depicted in FIG. 23 illustrate dataset ingestion controller 2320 being configured to analyze, compensate, and/or remediate anomalies in data during ingestion of a set of data 2305a to remediated dataset 2305b (or during any other data operation). Further, data ingestion controller 2320 may be configured to form data representing graph-based data arrangements and associated ancillary or descriptor data (e.g., metadata disposed in layered data files) to facilitate, for example, interrelations in a graph data arrangement and/or graph database interrelated to a system of networked collaborative datasets, according to some embodiments. According to various examples, dataset analyzer 2330 is configured to generate a "clean" dataset 2305b, which is remediated to reduce or eliminate deficiencies or anomalies in regional dataset 2305a. With reduced defects, various users, such as data scientists 2308a, may be encouraged to use and share datasets generated by collaborative dataset consolidation system 2310, as the structures and/or functions depicted in diagram 2300 are designed to enhance reliability and accuracy of data in datasets 2342a, dataset 2342b, and dataset 2342c. And since dataset analyzer 2330 is configured to perform tasks that typically may be performed manually, confidence in the data in repository 2340 may promote usage of collaborative dataset consolidation system 2310 to form remediated datasets, which in turn, may facilitate adoption by other users to link subsequently formed datasets to those stored in repository 2340, thereby fueling growth of accessible data.

Dataset ingestion controller 2320 also facilitates usage of configurable data attributes to enhance resultant functionality of analyzation data 2309. Configurable data attributes provide an ability to customize detection of "conditions" based on a particular user's or entity's specific datasets. So, configurable data attributes may be added to analyzation data 2309 to create customized analyzation data 2309 for a particular dataset. Also, analyzation data 2309 may include criteria in which to restrict presentation or inclusion of data in a dataset, such as Social Security numbers, credit card numbers, etc. Therefore, data ingestion and subsequent integration or links to collaborative datasets may prevent sensitive or restricted data from being publicized.

Additionally, since the structures and/or functionalities of collaborative dataset consolidation system 2310 enable a query written against either against a tabular data arrangement or graph data arrangement to extract data from a common set of data, any user (e.g., data scientist) that favors usage of either SQL-equivalent query languages or SPARQL-equivalent query languages, or any other equivalent programming languages. As such, a data practitioner may more easily query a common data set of data using a familiar query language. Thereafter, a resultant may be stored as a graph data arrangement in repository 2340.

In some cases, dataset analyzer 2330 is configured to identify an action relative to a number of actions to remediate a condition, and may be further configured to execute instructions to invoke an action to remediate the condition. Accordingly, dataset analyzer 2330 may be configured to automatically detect an anomalous condition, predict which one of several actions that may remediate the condition (e.g., based on confidence levels a specific anomaly is identified and that the corrective action will remediate the problem), and automatically implement the corrective action, according to some examples. A user need not engage in ingestion of dataset 2305a. In some cases, dataset analyzer 2330 may present information in data remediation interface 2302 that informs a user of automatic corrections, or enables the user to either approve or deny (e.g., reverse) the automatically implemented corrective action.

According to some examples, dataset 2305a may include data originating from repository 2340 or any other source of data. Hence, dataset 2305a need not be limited to, for example, data introduced initially into collaborative dataset consolidation system 2310, whereby format converter 2337 converts a dataset from a first format into a second format (e.g., from a table into graph-related data arrangement). In instances when dataset 2305a originates from repository 2340, dataset 2305a may include links formed within a graph data arrangement (i.e., dataset 2342a). Subsequent to introduction into collaborative dataset consolidation system 2310, data in dataset 2305a may be included in a data operation as linked data in dataset 2342a, such as a query. In this case, one or more components of dataset ingestion controller 2320 and dataset attribute manager 2361 may be configured to enhance dataset 2342a by, for example, detecting and linking to additional datasets that may have been formed or made available subsequent to ingestion or use of data in dataset 2342a.

In at least one example, additional datasets to enhance dataset 2342a may be determined through collaborative activity, such as identifying that a particular dataset may be relevant to dataset 2342a based on electronic social interactions among datasets and users. For example, data representations of other relevant dataset to which links may be formed may be made available via a dataset activity feed. A dataset activity feed may include data representing a number of queries associated with a dataset, a number of dataset versions, identities of users (or associated user identifiers) who have analyzed a dataset, a number of user comments related to a dataset, the types of comments, etc.). Thus, dataset 2342a may be enhanced via "a network for datasets" (e.g., a "social" network of datasets and dataset interactions). While "a network for datasets" need not be based on electronic social interactions among users, various examples provide for inclusion of users and user interactions (e.g., social network of data practitioners, etc.) to supplement the "network of datasets." According to various embodiments, one or more structural and/or functional elements described in FIG. 23, as well as below, may be implemented in hardware or software, or both.

Figure 24:
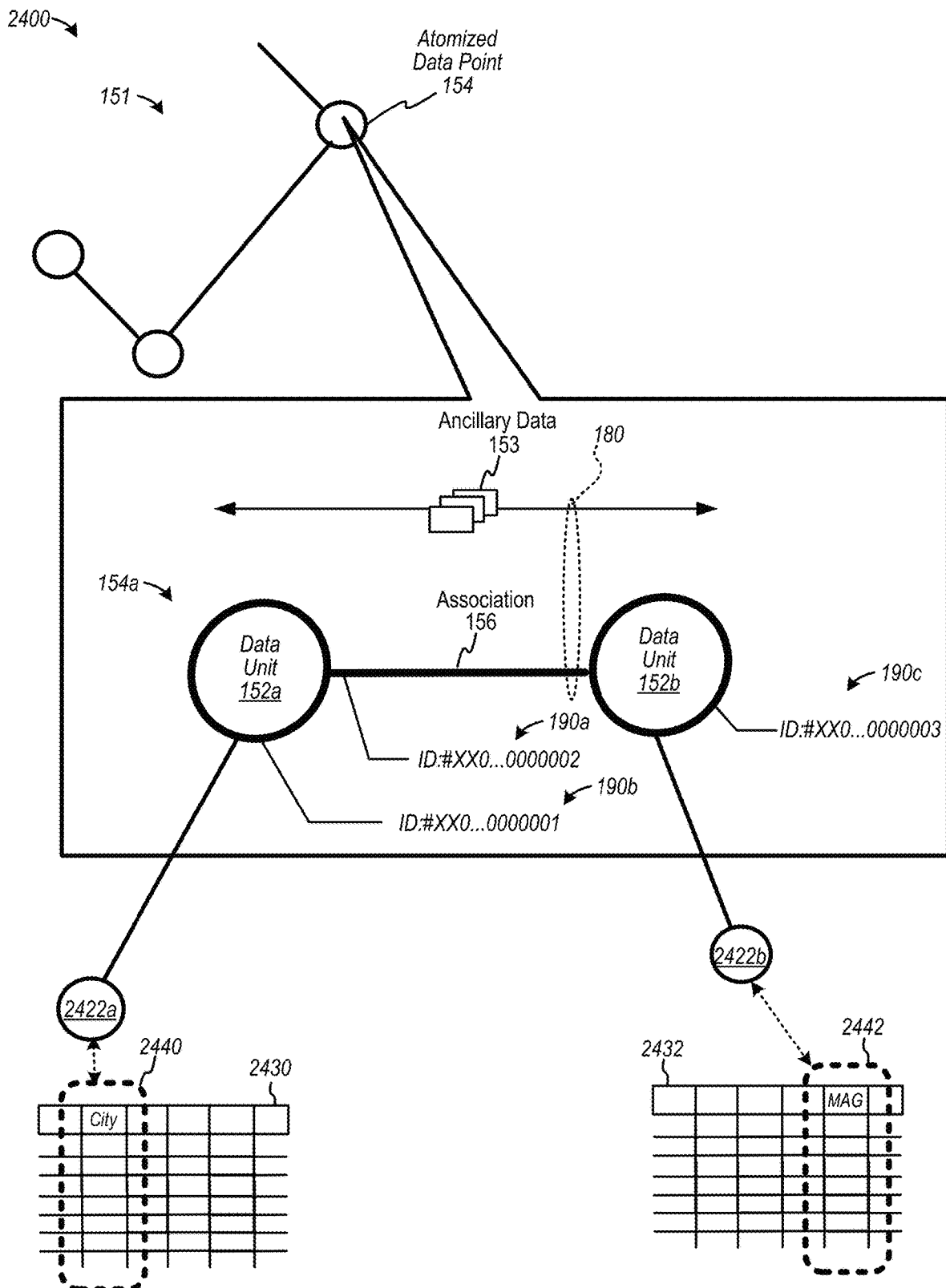
FIG. 24 is a diagram depicting an example of an atomized data point configured to link different subsets of data in different datasets, according to some embodiments.

FIG. 24 is a diagram depicting an example of an atomized data point configured to link different subsets of data in different datasets, according to some embodiments. Diagram 2400 depicts a portion 151 of an atomized dataset that includes an atomized data point 154. In some examples, the atomized dataset is formed by converting a data in a tabular format into a format associated with a graph format. In some cases, portion 151 of the atomized dataset can describe a portion of a graph that includes one or more subsets of linked data. Further to diagram 2400, one example of atomized data point 154 is shown as a data representation 154*a*, which may be represented by data representing two data units 152*a* and 152*b* (e.g., objects) that may be associated via data representing an association 156 with each other. One or more elements of data representation 154*a* may be configured to be individually and uniquely identifiable (e.g., addressable), either locally or globally in a namespace of any size. For example, elements of data representation 154*a* may be identified by identifier data 190*a*, 190*b*, and 190*c*, which may represent IRI data or other referential data. One or more elements depicted in diagram 2400 of FIG. 24 may include structures and/or functions as similarly-named or similarly-numbered elements depicted in other drawings, such as FIG. 1B, or as otherwise described herein, in accordance with one or more examples.

In the example shown, atomized data point 154 may be configured to serve as a link from one dataset 2430 to another dataset 2432, both of which are depicted as tabular data arrangements linked to underlying graph data arrangements (not shown). Dataset 2430 includes a subset of data, such as column 2440 that includes city identifier data (e.g., city names), whereas dataset 2432 includes column 2442 that includes earthquake magnitude data (e.g., earthquake magnitudes, or "MAG"). Column 2440 is associated with a node 2422*a*, which is associated with referential data that links to data unit 152*a*. Column 2442 is associated with a node 2422*b*, which is associated with referential data that links to data unit 152*b*. By linking dataset 2430 and 2432 to form a consolidated dataset, any user interested with data concerning either a city or an earthquake magnitude may have the other linked to the dataset. Thus, linked datasets 2430 and 2433 may form a collaborative dataset that enables a query to access both city name data and earthquake magnitude data, thereby expanding dataset and applicability to greater numbers of users (or potential users).

Figure 25:
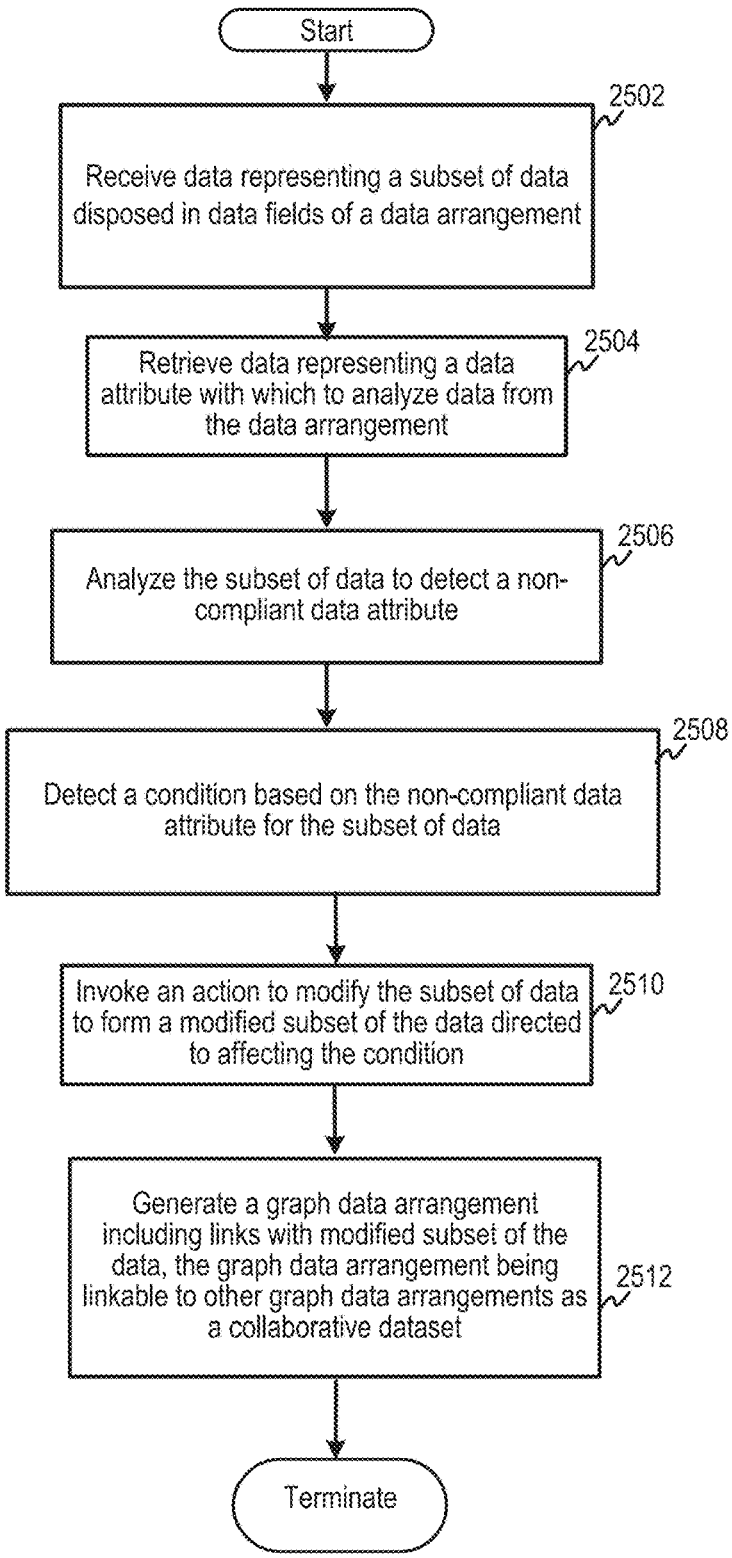
FIG. 25 is a diagram depicting a flow diagram as an example of remediating a dataset during ingestion, according to some embodiments.

FIG. 25 is a diagram depicting a flow diagram as an example of remediating a dataset during ingestion, according to some embodiments. Flow 2500 may begin at 2502, at which data representing a subset of data disposed in data fields (e.g., cells) of a data arrangement (e.g., a spreadsheet) may be received. A data field may include any unit of data that can be extracted from an original data structure. For example, a tabular arrangement of data in a PDF document may be analyzed to extract data from the PDF document (e.g., using logic functioning similar to optical character recognition) and format the data into a table, whereby a unit of data may include data at an intersection of a specific row and column.

At 2504, data representing a data attribute with which to analyze data from the data arrangement may be retrieved. In one example, data representing a data attribute may include property data that describes or defines a characteristic of data or a data structure that is to be analyzed. The data representing the data attribute may also include one or more values of the characteristic that may be evaluated to determine whether an anomalous condition exists. A value may be data representing invalid data values (e.g., a null data value). A value may be data representing a string with which to match data in a dataset undergoing ingestion. Examples of such strings include "city names," "state names," "zip codes," as well as noise text or inadvertent text, such as "asdfasdf" or "qwerty," which may serve as placeholders. A value may include a set of values, such as a number of state abbreviation codes, such as "AL," "AK," "AZ," "AR," "CA," "CO," etc.

At 2506, a subset of data to detect a non-compliant data attribute may be analyzed by, for example, matching or comparing (within or excluding a tolerance level value) data defined by analyzation data to data in a dataset being ingested. A non-compliant data attribute may be referred to as a data attribute that may be non-compliant with one or more values set forth in the analyzation data. For example, a detected numeric value that is more than 4 standard deviations from a mean value for a subset of data (e.g., a column of data) may be deemed "an outlier" or "out-of-range," and, thus, deemed non-compliant with a range of valid numeric values.

At 2508, a condition based on the non-compliant data attribute for a subset of data may be detected. For example, a condition of a dataset undergoing ingestion may be identified by a dataset analyzer, whereby the condition may invoke an action to modify a subset may be undertaken. Note that a condition need not be a defect, such as an invalid value, but rather may have a characteristic that may necessitate modification to a dataset undergoing ingestion. For example, a dataset including bank routing numbers or other sensitive information that, while valid, may constitute a condition of the dataset sufficient to invoke an action to restrict access to that data. As such, sensitive data may be "masked" from discernment. For example, a dataset analyzer may be configured to encrypt or otherwise obscure the sensitive information.

At 2510, an action to modify a subset of data may be invoked to form a modified subset of the data directed to affecting the condition (e.g. addressing or correcting the condition). In some examples, the action to modify a subset of data may be initiated by receiving input data that causes invocation of the action. In other cases, the action to modify the subset of data may occur automatically. At 2512, a graph data arrangement may be generated, whereby the graph data arrangement may include links with modified subset of the data. The graph data arrangement is linkable to other graph data arrangements to form a collaborative dataset.

Figure 26:
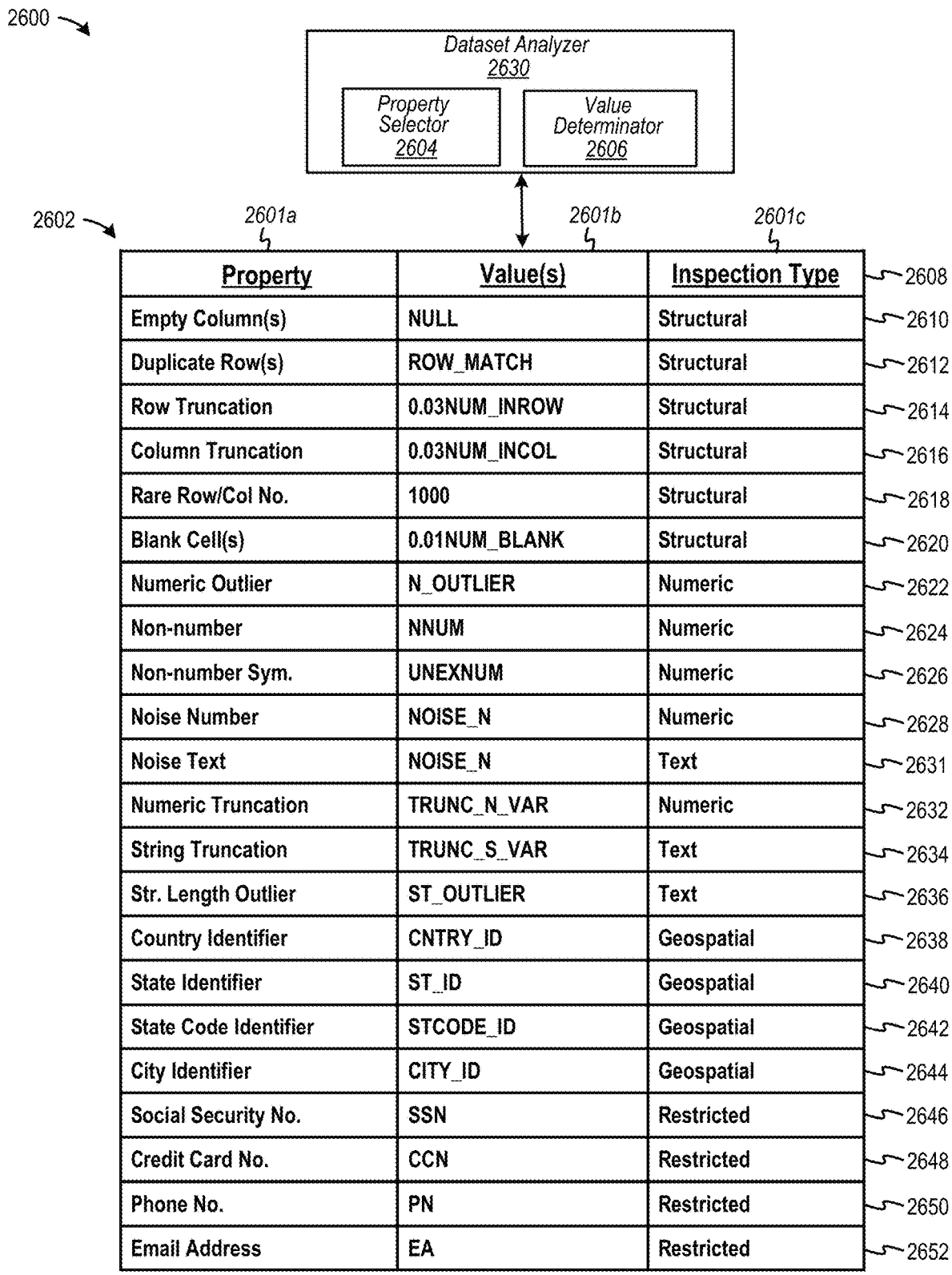
FIG. 26 is a diagram depicting a dataset analyzer configured to access analyzation data to remediate a dataset, according to some examples.

FIG. 26 is a diagram depicting a dataset analyzer configured to access analyzation data to remediate a dataset, according to some examples. Diagram 2600 depicts a dataset analyzer 2630 configured to access analyzation data 2602 (or a portion thereof) to evaluate whether a dataset undergoing ingestion is associated with a condition, such as an anomalous condition. In the example shown, dataset analyzer 2630 is represented as a table for purposes of explanation and is not intended to be limiting. Analyzation data 2602 includes a number of rows 2610 to 2652 representing attributes of an imported dataset that may be analyzed to determine whether any deficiencies, issues, or conditions may arise. Attributes to be tested may include a property 2601*a*, one or more values 2601*b*, and optionally an inspection type 2601*c* that describes a type of attribute being inspected. Note that values 2601*b* are depicted as variables, such as ROW_MATCH for row 2612, which may represent values of each cell in a row of a table that may be used to compare against other rows to determine whether one of the rows is a duplicate.

In the example shown, dataset analyzer 2630 includes a property selector 2604 and a value determinator 2606, whereby property selector 2604 may be configured to select a property 2601*a* for analysis to determine compliance against a threshold value or a range of values. Value determinator 2606 may be configured to identify a particular value 2601b associated with a corresponding property 2601a as, for example, a threshold value or values. In some cases, value determinator 2606 may be configured to calculate a range of compliant values based on, for example, a mathematical expression or instruction to modify a value to adapt to a particular dataset.

Further to the example shown, rows 2610 through 2620 define attributes or properties regarding the structure of data or a data arrangement that may be analyzed to determine whether a condition exists. Row 2610 sets forth an attribute, or property, of "empty columns," whereby the determination that a column is empty uses a NULL value 2601a to compare against data in that column. Row 2612 defines a property of the dataset in which two (2) or more rows are duplicated, whereby a value ROW_MATCH 2601a may represent values of one row that are used to compare against other rows to determine whether redundancy exists. Rows 2614 and 2616 relate to attributes of a data structure having either a row that is truncated (relative to other row lengths) or a column that is truncated (relative to other column lengths). In these cases, a row or a column may be truncated inadvertently and the result maybe a clipped amount of data. Row 2618 defines a property of a data structure in which a "rare" number of rows or columns (or any other structural configuration) may be detected, such as 1,000 rows as indicated by "1000" for value 2601b. A "rare" structural configuration is generally "suspicious" in that, for example, certain multiple-numbered set of rows or columns generally do not arise in data collection efforts. Thus, such numbers ought be flagged as a possible aberration or anomaly.

Rows 2622 through 2628 define attributes or properties regarding numeric values of data. Row 2622 defines an "outlier" value of a number by a value 2601b defined as N_OUTLIER, which may define a range of 4 standard deviations about a mean value to demarcate valid numeric values. Row 2624 may define one or more values, NNUM, that are non-numbers. For example, a dataset analyzer may identify a subset of data predominantly being numeric in nature, but detects a value that is non-numeric (e.g., text, other non-numbered characters, or non-N/A values). Row 2626 may define or more values, UNEXNUM, associated with unexpected non-numeric symbols or data formats, such as percentage characters or numbers formatted as a currency when other portions of data are not currency-related. Rows 2628 and 2631 set forth values NOISE_N and NOISE_T that may represent "noise" or gibberish. For example, a value of NOISE_N may include a likely placeholder number, such as Jenny's phone number "867-5309" from a song, and a value of NOISE_S may include likely placeholder text, such as "asdf" or "qwerty," respectively.

Rows 2632 and 2634 set forth values for determining whether to indicate that either a numeric truncation or string truncation has occurred. For example, a dataset analyzer may determine whether a numeric value or a string is truncated relative to other numeric values or strings. Row 2636 sets forth a value ST_OUTLIER that defines a value with which to deem a string as an outlier. For example, a string "supercalifragilisticexpialidocious" in a column of data that otherwise represents state abbreviations (e.g., TX, MI, CA, etc.) may be determined to be an outlier. Rows 2638 to rows 2644 set forth criteria with which to determine whether a subset of data describing a country, state, or city excludes errant data. Row 2646 through 2652 may define values 2601b for matching against a dataset to determine whether data includes restrictive or sensitive data that may be masked from view.

Figure 27:
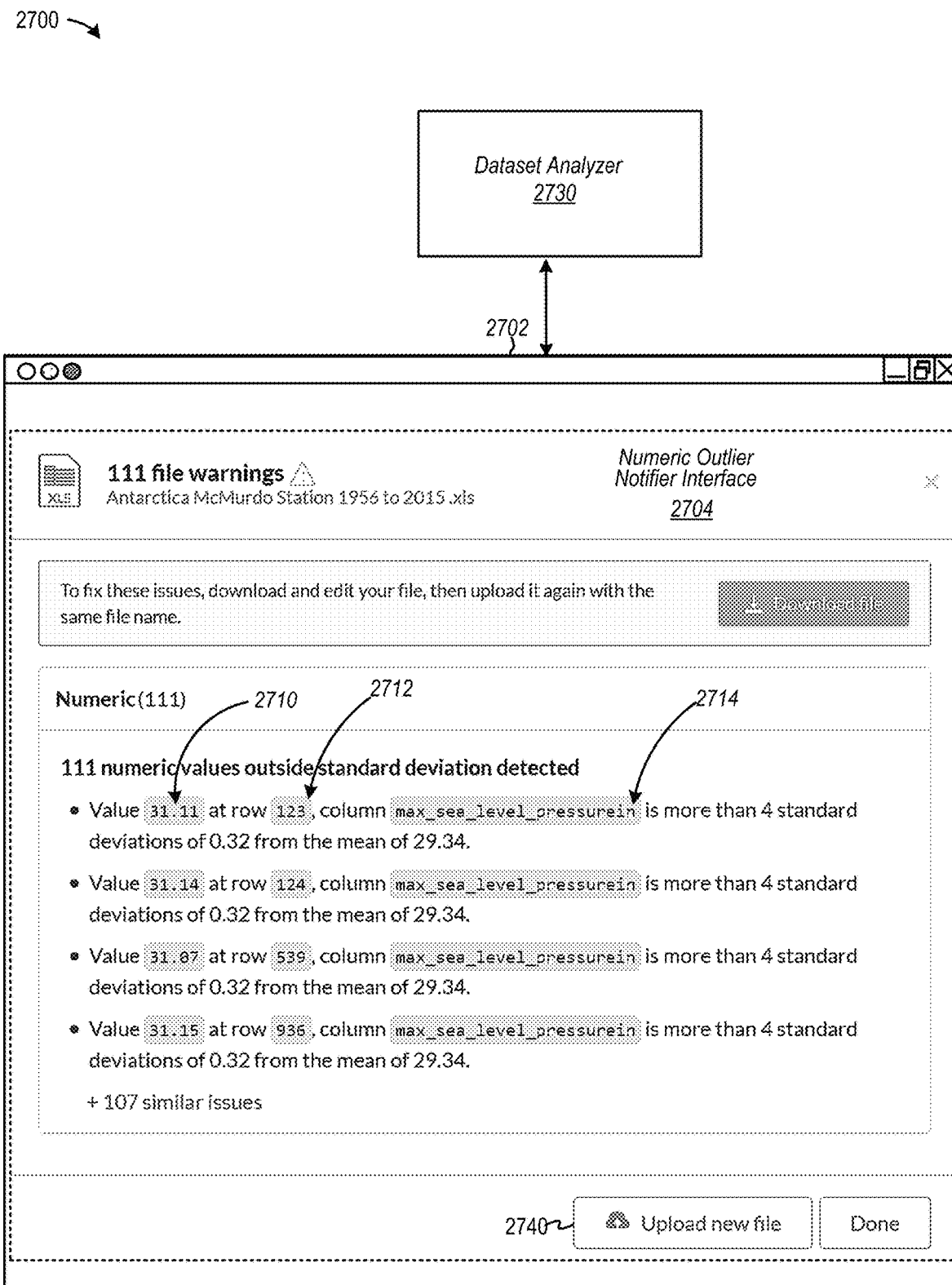
FIG. 27 is a diagram depicting a dataset analyzer configured to generate data to present an anomalous condition, according to some examples.

FIG. 27 is a diagram depicting a dataset analyzer configured to generate data to present an anomalous condition, according to some examples. Diagram 2700 depicts a dataset analyzer 2730 configured to generate data for presentation in interface 2702. As shown, interface 2702 includes a numeric outlier notifier interface 2704. In the example shown, numeric values 2710 are presented in a display to identify noncompliant values that are more than 4 standard deviations of a mean. Rows 2712 and columns 2714 at which an outlier numeric value resides are shown. In this case, interface 2702 provides user interface 2740 configured to upload another file with corrected data.

Figure 28A:
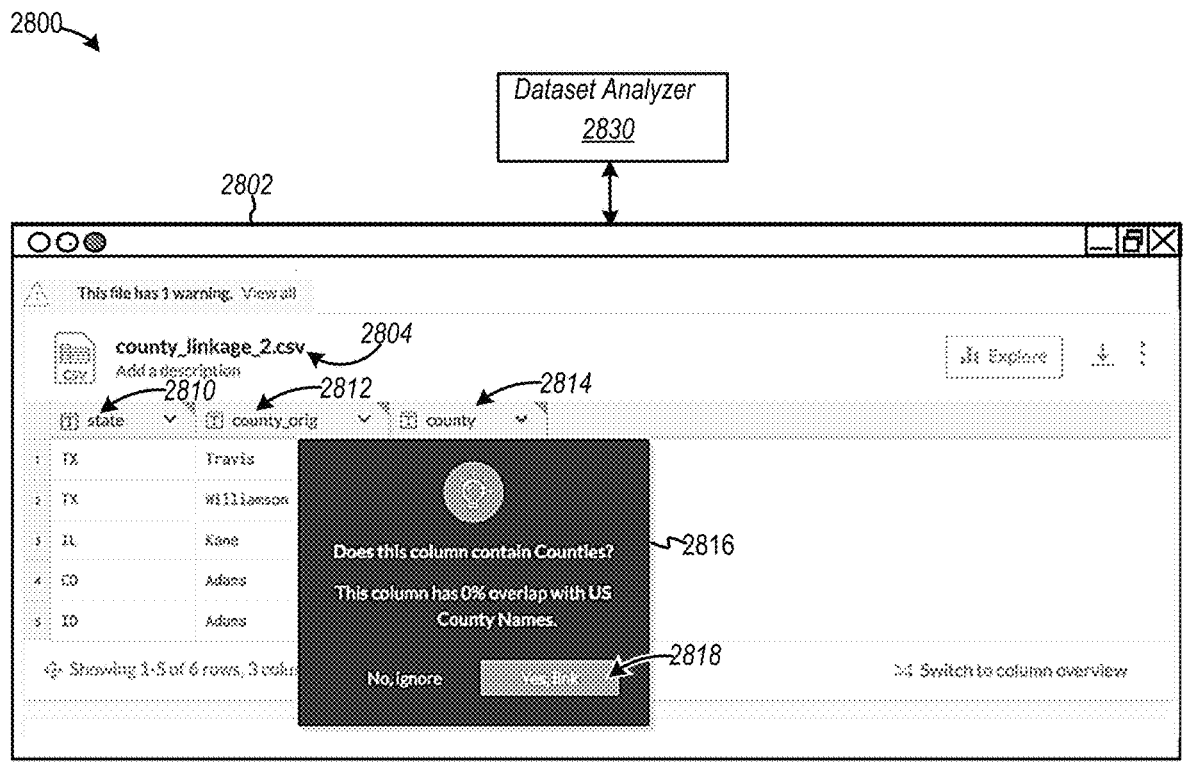
FIGS. 28A to 28B are diagrams depicting an example of a dataset analyzer configured to remediate datasets, according to some examples.
Figure 28B:
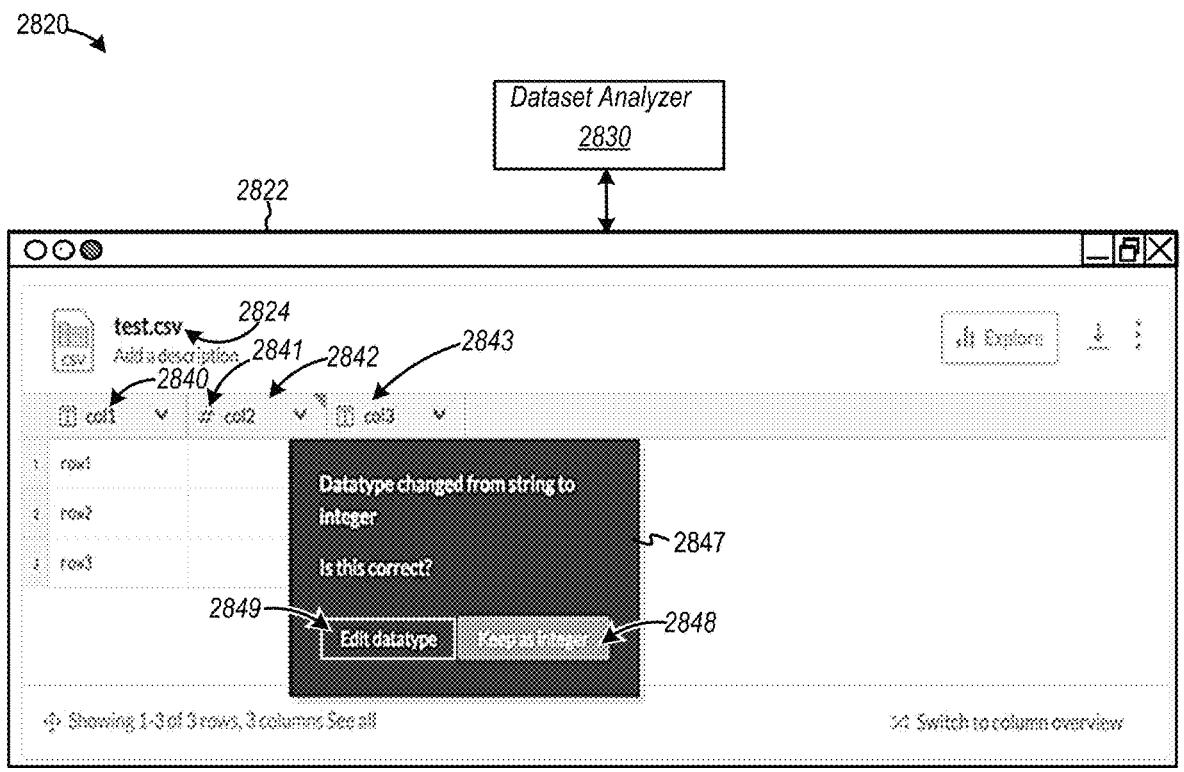

FIGS. 28A to 28B are diagrams depicting an example of a dataset analyzer configured to remediate datasets, according to some examples. Diagram 2800 of FIG. 28A includes a dataset analyzer 2830 coupled to an interface 2802 for displaying a notification 2816 for a data file ("county_linkage_2.csv") 2804 undergoing ingestion. Column ("state") 2810 includes state abbreviation data and column ("county_orig") 2812 includes data that may or may not include county names. In this example, consider that column 2810 is associated with an indication (e.g., a category variable associated with a data classification) that data in column 2810 is confirmed to include state abbreviations, whereas data in column 2810 may not be associated with an indication that column or data are names of counties in the U.S.

Dataset analyzer 2830 and/or its components, such as an inference engine, may be configured to analyze data within column 2812 to identify, predict, and/or infer a classification of the data within the column. For example, an inference engine may analyze each data value, such as "Travis," "Williamson," "Kane," "Adams," and "Adams" by, for example, matching the data values against any one of a number of sets of data, each of which may be associated with a particular category, such as "county" or "surnames." See FIG. 6, as an example. An inference engine may select a specific set of data based on one or more phrases, words, or textual strings in a column header. As shown, the term "county" is included in "county_orig," and as such, the inference engine may initially match the data values against a set of data (i.e., a counties data repository) including county names, which may be set forth in a "county name" format, such as "(County Name)_COUNTY, STATE." To enhance predictability that the names and column 2812 are counties rather than surnames, an inference engine of dataset analyzer 2830 may examine other columns, including column 2810, which include state abbreviations of "TX," "TX," "IL," "CO," and "ID," each of which are associated with a corresponding name in column 2812. The inference engine may predict data value "Travis" of column 2812 is associated with the state of Texas ("TX"), thereby inferring that the data value Travis may be associated with a county name of "Travis County, Texas."

According to some examples, dataset analyzer 2830 may generate a notification 2816 in user interface 2802 specifying that column 2812 may include predicted US county names (rather than surnames), but 0% of the data values are either confirmed as being names of counties or of the form "(County Name)_COUNTY, STATE." A user may override the conclusion that 0% of the data values represent county names and select a user input 2818, which may be configured to transmit an instruction to categorize data in column 2812 as "counties." In at least one example, dataset analyzer 2830 may link, responsive to activation of user input 2812, each data value in column 2812 to a "County Name," such as Adams County, Idaho. The linked data of county names (through which other data may be linked) may be used to dispose the county names in column 2814, which may be a derived column, according to some examples. In view of the foregoing, dataset analyzer 2030 is configured to inspect columns and suggest entities or other datasets with which to link (or suggest a linkage). In this case, an inference engine can use county columns and state columns to disambiguate whether "Adams" is a county either in Colorado (i.e., Adams County, Colorado) or in Idaho (i.e., Adams County, Idaho).

FIG. 28B depicts a diagram in which dataset analyzer 2830 is shown coupled to an interface 2822 for displaying a notification 2846 for a data file 2824 undergoing ingestion or any other operation (e.g., such as query). Column ("col1") 2840 includes a column of data values having a string datatype, column ("col2") 2842 includes a column of data values having an integer data type (as indicated by graphic representation ("#") 2841), and column ("col3") 2843 includes having a string datatype. Dataset analyzer 2830 may detect, such as during ingestion or any other operation (e.g., a query), that a dataset associated with file 2824 has had the datatype of column 2842 change to an "integer" datatype from another datatype. To confirm accuracy, dataset analyzer 2830 may generate a notification 2847 that includes a user input 2848 to confirm that the integer datatype is correct (e.g., "keep as integer"). Or, user input 2849 may be activated to edit the datatype of column 2042 to specify, for example, a string datatype.

Figure 29A:
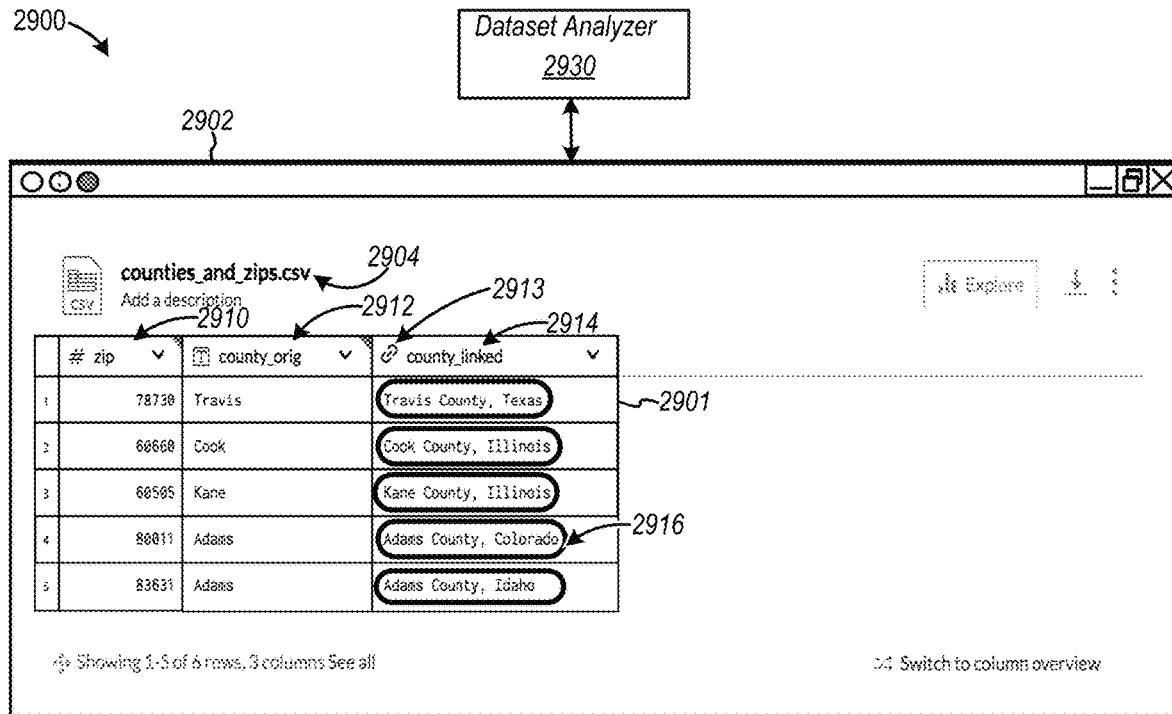
FIGS. 29A and 29B depict diagrams in which an example of a dataset analyzer facilitates formation of a subset of linked data, according to some examples.
Figure 29B:
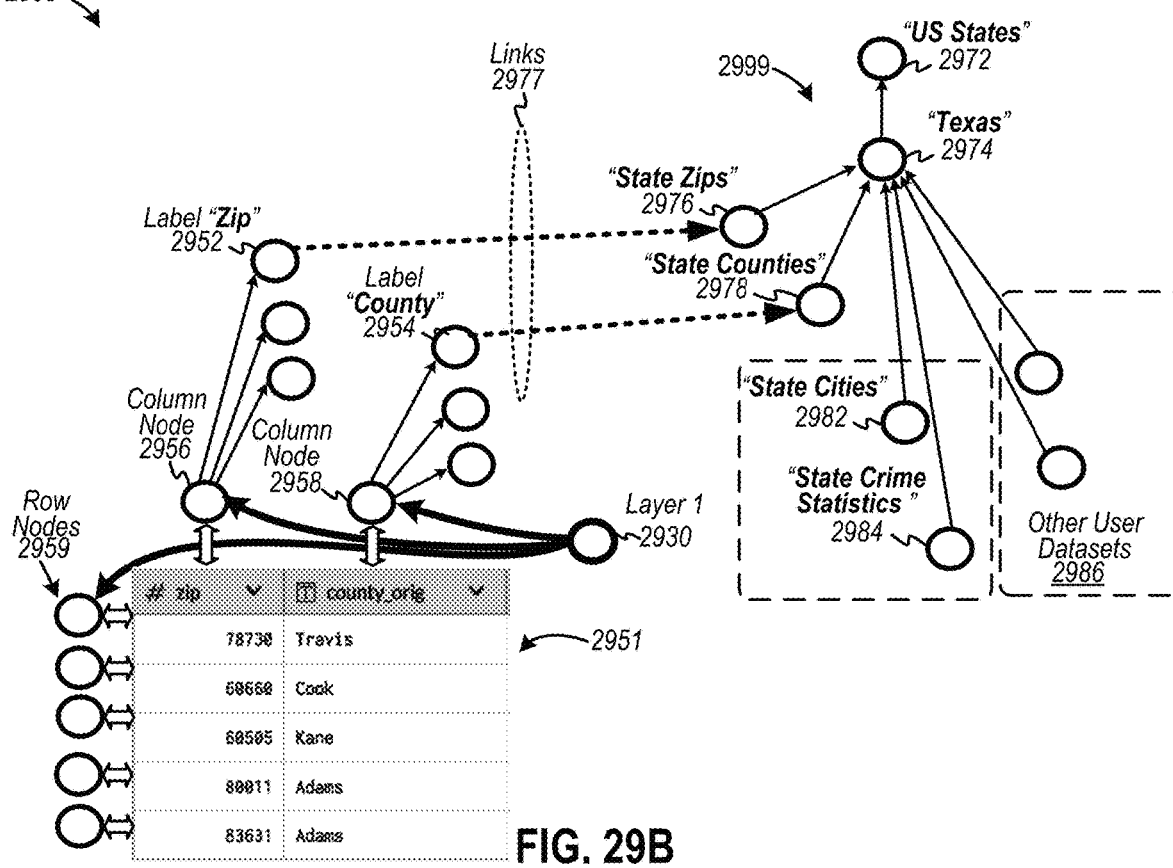

FIGS. 29A and 29B depict diagrams in which an example of a dataset analyzer facilitates formation of a subset of linked data, according to some examples. Diagram 2900 of FIG. 29A includes a dataset analyzer 2930 coupled to an interface 2902 for depicting data in data file ("counties_and_zips.csv") 2904 as being disposed in a tabular data arrangement 2901. Tabular data arrangement 2901 includes a column ("zip") 2910 of zip code data, a column ("county_orig") 2912 of name data (which may or may not be county data), and a column ("county_linked") 2914 of county name data. Column 2914 is shown to be a column of "linked data," as indicated by graphic indicator 2913. Further, data values in column 2914 are depicted as being encapsulated by graphic element 2916 to communicate that an encapsulated data value is linked to one or more other datasets and/or subsets of data (e.g., data in columns in 2910 and 2912) to disambiguate whether the names in column names in column 2912 are county names. An inference engine may infer name data in column 2912 are to be treated as "names of counties" relative to corresponding unique zip codes in column 2910. In at least one example, the linked data in column 2914 may be established responsive to activation of user input to form the link, such as activating user input 2818 of FIG. 28A. Subsequent to forming the links, data values within column 2914 may be described as being associated to a linked data type.

FIG. 29B is a diagram depicting formation of linked data for data in a data arrangement depicted in FIG. 29A, according to some examples. Diagram 2950 includes a portion 2951 of data arrangement 2901 of FIG. 29A, whereby columns may be associated with column nodes 2956 and 2958, and row nodes may be associated with row nodes 2959. A layer data generator (not shown) may be configured to generate referential data, such as node data, to associate a subset of nodes to a layer ("layer 1") 2930. Nodes 2956, 2958, and 2959 may include referential data (e.g., IRI data, etc.) that links data via data structures associated with layer 2930, as well as to other layers. For example, nodes 2952 and 2954, which may be associated with a second layer, may be linked to column node 2956 and column node 2958, respectively. Column 2952 is associated with an annotation "Zip" to indicate that data values within column 2952 relate to ZIP Codes, whereas column 2954 is associated with an annotation "County" to indicate that data values within column 2954 relate to county names.

According to some examples, dataset analyzer of FIG. 29A may be configured to form links 2977 to data in a graph data arrangement 2999, which includes a node 2972 associated with states of the United States and is linked to a node 2974 representing the state of Texas. Further to diagram 2950, state of Texas node 2974 is linked to a number of other nodes, such as node 2976 (associated with ZIP Codes within the state of Texas), node 2978 (associated with county names within the state of Texas), node 2982 (associated with city names within the state of Texas), node 2984 (associated with statistics for crimes in the state of Texas), and other sets of data. The state of Texas node 2974 may also be linked to other user datasets 2986, thereby enabling data within a portion 2951 of the tabular data arrangement to link via links 2977 to an expansive amount of data related to Texas and other datasets. Accordingly, dataset analyzer 2930 of FIG. 29A may be configured to use links 2977 to establish that ZIP Codes in column 2910 of FIG. 29A and names in column 2912 of FIG. 29A relate to a state of Texas, thereby enabling formation of linked data in column 2914 of FIG. 29A. The linked data in column 2914 may facilitate dataset enrichment to supplement data in dataset 2901 with data from other datasets, according to some examples.

Figure 30A:
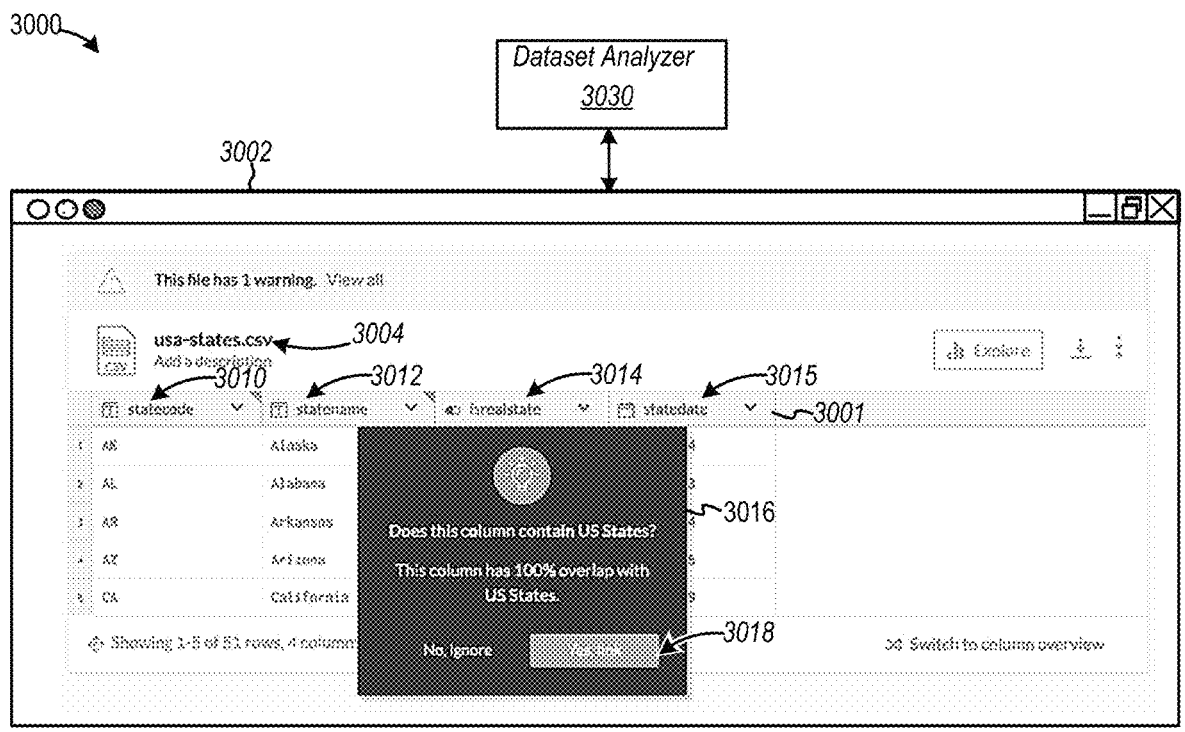
FIGS. 30A and 30B depict diagrams in which another example of a dataset analyzer facilitates formation of another subset of linked data, according to some examples.
Figure 30B:
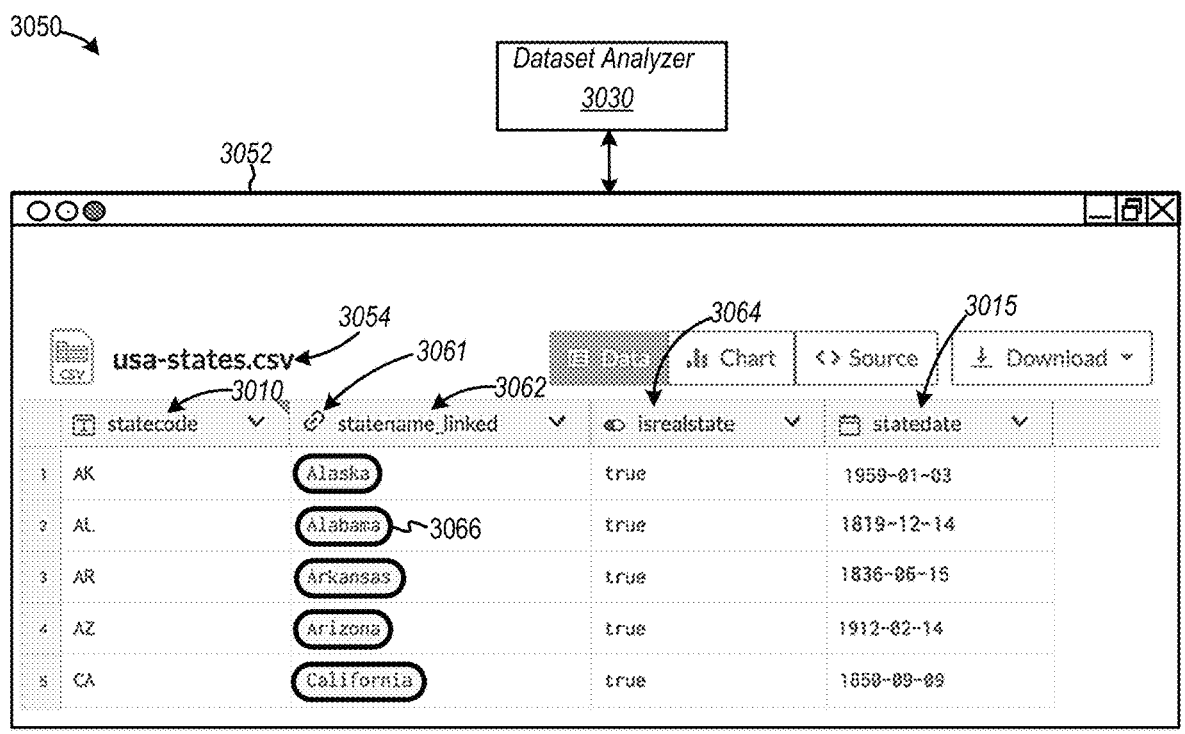

FIGS. 30A and 30B depict diagrams in which another example of a dataset analyzer facilitates formation of another subset of linked data, according to some examples. Diagram 3000 of FIG. 30A includes a dataset analyzer 3030 coupled to an interface 3002 for depicting data in data file ("usa-states.csv") 3004 as being disposed in a tabular data arrangement 3001. Tabular data arrangement 3001 includes a column ("statecode") 3010 of state abbreviation data, a column ("statename") 3012 of name data (which may or may not be names of U.S. states), a column ("isrealstate") 3014 of boolean indications whether name in column 3014 is a valid state name, and a column ("statedate") 3014 of statehood date data. Dataset analyzer 3030 may detect, such as during ingestion or any other operation (e.g., a query), that data values in column 3012 may represent names of U.S. states. To confirm accuracy, dataset analyzer 3030 may generate a notification 3016 that includes a user input 3018 to confirm that column 3012 includes names of U.S. states. Upon activation of user input 3018, dataset analyzer 3030 forms links to data in column 3014 to established linked data.

Diagram 3050 of FIG. 30B depicts column 3012 of FIG. 30A begin formatted as a column of linked data, and is depicted as column ("statename_linked") 3062. Graphical indicator 3061 specifies that column 3062 includes linked data types and graphic 3066 that indicates associated data values may be linked to other data sources. Subsequent to activation of user input 3018 of FIG. 30A, column 3064 includes data values "true" to affirm that names in column 3062 are data values representative of states and state names.

Figure 31:
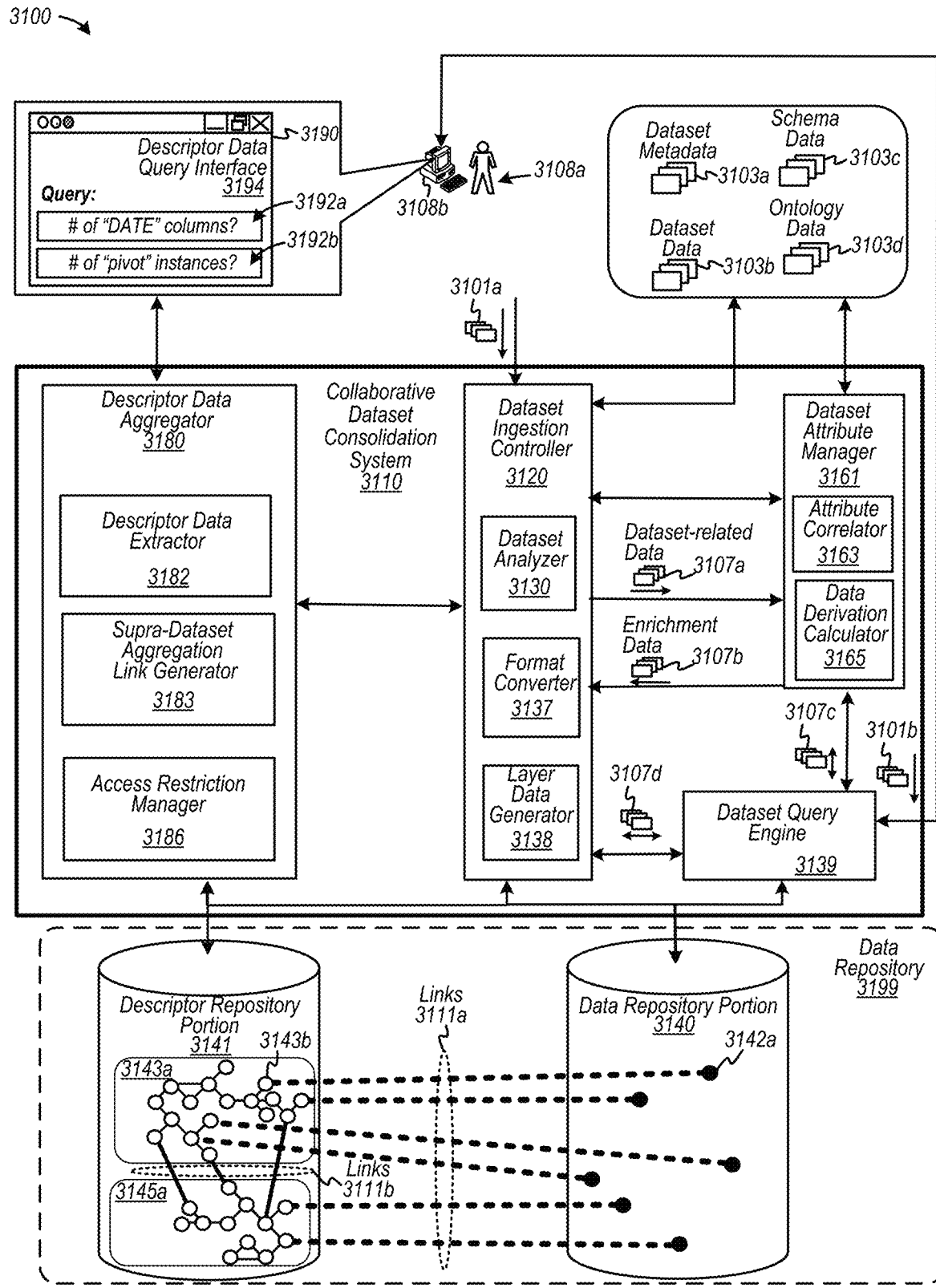
FIG. 31 is a diagram depicting an example of a collaborative dataset consolidation system configured to aggregate descriptor data to form a linked dataset of ancillary data, according to some examples.

FIG. 31 is a diagram depicting an example of a collaborative dataset consolidation system configured to aggregate descriptor data to form a linked dataset of ancillary data, according to some examples. Diagram 3100 depicts a collaborative dataset consolidation system 3110 including a dataset ingestion controller 3120, a dataset attribute manager 3161, and a descriptor data aggregator 3180, which is configured to receive descriptor data associated with source data for aggregations. Descriptor data aggregator 3180 may be configured to aggregate related descriptor data to form a linked dataset of descriptor data (e.g., in a graph data arrangement exclusive of source data), which may be stored in a portion of a data repository 3199, such as a descriptive repository portion 3141.

According to some examples, descriptor data may include ancillary data (e.g., ancillary to source data upon which data operations are performed), and may be exclusive of source data. Thus, descriptive repository portion 3141 need not include source data, and may be linked via links 3111a to source data 3142a (e.g., data points including source data). In some examples, descriptor data includes descriptive data associated with source data, such as layered data and links, query-related contextual data and links, collaborative-related (e.g., activity feed-related data) contextual data and links, or any other data operation contextual data and links. The aforementioned links may include at least a subset of links 3111a that are pointers to source data. According to various examples, descriptor data may include dataset attributes, such as annotations (or labels), data classifications, data types, a number of data points, a number of columns, a column index (as an identifier), a "shape" or distribution of data and/or data values, a normative rating (e.g., a number between 1 to 10 (e.g., as provided by other users)) indicative of the "applicability" or "quality" of the dataset, a number of queries associated with a dataset, a number of dataset versions, identities of users (or associated user identifiers) that analyzed a dataset, a number of user comments related to a dataset, etc.), etc.

Further, descriptor data may include other data attributes, such as data representing a user account identifier, a user identity (and associated user attributes, such as a user first name, a user last name, a user residential address, a physical or physiological characteristics of a user, etc.), one or more other datasets linked to a particular dataset, one or more other user account identifiers that may be associated with the one or more datasets, data-related activities associated with a dataset (e.g., identity of a user account identifier associated with creating, modifying, querying, etc. a particular dataset), and other similar attributes. Another example of descriptor data as a dataset attribute is a "usage" or type of usage associated with a dataset. For instance, a virus-related dataset (e.g., Zika dataset) may have an attribute describing usage to understand victim characteristics (i.e., to determine a level of susceptibility), an attribute describing usage to identify a vaccine, an attribute describing usage to determine an evolutionary history or origination of the Zika, SARS, MERS, HIV, or other viruses, etc. According to some examples, aggregation of descriptor data by descriptor data aggregator 3180 may include, or be referred to as, metadata associated with source data of, for example, dataset 3101a.

Diagram 3100 depicts an example of a collaborative dataset consolidation system 3110, which is shown in this example as including a dataset ingestion controller 3120 configured to remediate datasets, such as dataset 3101, prior to an optional conversion into another format (e.g., a graph data structure) that may be stored in data repository 3199. As shown, dataset ingestion controller 3120 may also include a dataset analyzer 3130, a format converter 3137, and a layer data generator 3138. While not shown, dataset analyzer 3130 may include an inference engine, a data classifier, and a data enhancement manager. Further to diagram 3100, collaborative dataset consolidation system 3110 is shown also to include a dataset attribute manager 3161, which includes an attribute correlator 3163 and a data derivation calculator 3165. Dataset ingestion controller 3120 and dataset attribute manager 3161 may be communicatively coupled to dataset ingestion controller 3120 to exchange dataset-related data 3107a and enrichment data 3107b. And dataset ingestion controller 3120 and dataset attribute manager 3161 may exchange data from a number of sources (e.g., external data sources) that may include dataset metadata 3103a (e.g., descriptive data or information specifying dataset attributes), other dataset data 3103b (e.g., some or all data stored in system repositories, which may store graph data), schema data 3103c (e.g., sources, such as schema.org, that may provide various types and vocabularies), ontology data 3103d from any suitable ontology and any other suitable types of data sources.

Collaborative dataset consolidation system 2310 is shown to also include a dataset query engine 3139 configured to generate one or more queries, responsive to receiving data representing one or more queries 3130b via, for example, computing device 3108b associated with user 3108a. User 3108a may be an agent authorized to access or control collaborative dataset consolidation system 2310, or may be an authorized user. Dataset query engine 3139 is configured to receive query data 3101b via at least a programmatic interface (not shown) for application against one or more collaborative datasets, whereby queries against source data may be applied against data repository portion 3140 to query source data points 3142a, which may include remediated source data. A collaborative dataset may include linked data of descriptor repository portion 3141 and linked data of data repository portion 3140, according to at least one example.

Dataset query engine 3139 may also be configured to apply query data to one or more descriptor data datasets 3143a and 3145a via links 3111b disposed in descriptor repository portion 3141, the query being directed to, for example, metadata stored in descriptor repository portion 3141. Dataset query engine 3139 may be configured to provide query-related data 3107d (e.g., a number of queries performed on a dataset, a number of "pivot" clauses implemented in different queries, etc.) to dataset ingestion controller 3120 to enhance descriptor data datasets (via a data enhancement manager) to include new query-related attributes exclusive of the source data. Dataset query engine 3139 may also be configured to exchange data 3107c with dataset attribute manager 3161 to manage attributes associated with queries. In view of the foregoing, descriptor data repository portion 3041 may include a superset of aggregated data attributes, each aggregated data attribute being linked over a pool of datasets. Therefore, descriptor data datasets 3143a and 3145a may facilitate queries to perform diagnostics, analytics, and other investigatory data operations on the "data about the source data," and not on source data, at least according to some examples. One or more elements depicted in diagram 3100 of FIG. 31 may include structures and/or functions as similarly-named or similarly-numbered elements depicted in other drawings, or as otherwise described herein, in accordance with one or more examples.

As shown, computing device 3108b may be configured to implement a descriptor data query interface 3190 in a display 3190, whereby a query of descriptor repository portion 3141 may be applied via dataset query engine 3139 and/or descriptor data aggregator 3180. In the example shown, a query 3192a may be applied against descriptor data datasets 3143a and 3145a to determine a number of columns having a "date" header or otherwise includes data values representing "date" information (e.g., Dec. 7, 1941). Further to this example, a query 3192b may be applied against descriptor data datasets 3143a and 3145a to determine a number of instances when a "pivot" clause is used to apply against queries of source data in data repository portion 3140. Consequently, descriptor data query interface 3190 may be configured to query characteristics of any data attribute or descriptive data.

Descriptor data aggregator 3180 is shown to include a descriptor data extractor 3182, a supra-dataset aggregation link generator 3183, and an access restriction manager 3186. In some examples, descriptor data aggregator 3180 (or portions thereof) may be integrated into dataset ingestion controller 3120, or may be distributed anywhere internally or externally to collaborative dataset consolidation system 3110. In various instances, descriptor data aggregator 3180, dataset ingestion controller 3120, dataset attribute manager 3161, and dataset query engine 3139, each may be configured to exchange data with another. In some examples, descriptor repository portion 3141 may store descriptor data separately, or physically removed from, source data 3142a stored in data repository portion 3140 of data repository 3199. Thus, descriptor repository portion 3141 may be stored local to collaborative dataset consolidation system 3110, whereas data repository portion 3140 may be store remotely (e.g., on a number of client computing device storage devices (not shown), etc.). Or, repositories 3141 and 3140 may be integrated or stored in a common repository.

To illustrate operation of descriptive data aggregator 3180, consider ingestion of a dataset 3101a into dataset ingestion controller 3120 to form a collaborative dataset, whereas dataset 3101a may be received as having a first data format. Dataset analyzer 3130 may be configured to analyze at least a subset of data of dataset 3101a to determine dataset attributes. Examples of dataset attributes include computed statistics, such as a mean of the dataset distribution, a minimum value, maximum value, a value of standard deviation, a value of skewness, a value of kurtosis, etc., among any type of statistic or characteristic. Other examples of dataset attributes include data types, annotations, data classifications (e.g., inferred subset of data relating to phone numbers, ZIP Codes, etc.), and the like. Therefore, dataset analyzer 3130 may be configured to generate descriptor data based on dataset attributes.

Dataset ingestion controller 3120 and/or format converter 3137 may be configured to convert dataset 3101a from a first data format to form an atomized dataset in a graph data arrangement, the atomized dataset being the collaborative dataset that, for example, may include atomized descriptor data and atomized source data. According to some examples, atomized source data may include units of source data, each of which may be represented by an atomized source data point 3142a (depicted as a black dot), whereas atomized descriptor data may include units of descriptor data, each of which may be represented by an atomized descriptor data point 3143b (depicted as a white dot). Layer data generator 3138 may be configured to generate layered data to associate subsets of descriptor data with a corresponding layer, each layer being described as a dataset attribute that may be identified as descriptor data. In some examples, dataset ingestion controller 3120 and/or format converter 3137 may be configured to generate referential data (e.g., an addressable identifier, such as an IRI) for assignment to link descriptor data (e.g., a dataset attribute) that links to a subset of data (e.g., a column of data).

Descriptor data extractor 3182 may be configured to extract data describing dataset attributes (e.g., descriptor data) for inclusion in formation of an aggregation of descriptor data over a pool of datasets processed and managed by collaborative dataset consolidation system 3110. Descriptor data extractor 3182 may extract data representing, for example, data types, annotations, data classifications, and the like as descriptor data, as well as links (or pointer references) to source data. Supra-dataset aggregation link generator 3183 may be configured to identify (over a pool of datasets processed and managed by collaborative dataset consolidation system 3110) a type or class of each unit of descriptor data, such as a datatype of "string," "boolean," "integer," etc., as well as each unit of descriptor data describing column data (e.g., column header data), such as subsets of ZIP Code data, subsets of state name data, subsets agricultural crop data (e.g., corn, wheat, soybeans, etc.), and the like. Further, supra-dataset aggregation link generator 3183 may be configured to generate links from descriptor data received from dataset ingestion controller 3120 to supra-dataset representations (e.g., nodes in a graph) for the same descriptor or data attribute. For example, supra-dataset aggregation link generator 3183 may have link to a data representation for a specific data attribute to every dataset portion (e.g., column) including data having the same data attribute. In at least one implementation, supra-dataset aggregation link generator 3183 may be configured to assign an addressable identifier of a global dataset attribute (e.g., a unit of supra-descriptor data), such as a data classification of "opioid," to an addressable identifier of the descriptor data (e.g., column data of opioid-related data) for dataset 3101a.

Thus, supra-dataset aggregation link generator 3183 is configured to form an association between a unit of the descriptor data (e.g., a data attribute) and a corresponding unit of supra-descriptor data (e.g. an aggregation or group of linked data attributes), which is a data representation of an aggregation of equivalent descriptor data. A data representation of supra-descriptor data may link to multiple datasets that include equivalent data associated with the descriptor data. In some examples, supra-dataset aggregation link generator 3183 is further configured to form another graph data arrangement including supra-descriptor data and associations to descriptor data, exclusive of source data. Hence, the other graph data arrangement may include pointers to any number of atomized collaborative datasets or the source data therein. This other graph data arrangement may be stored in descriptor repository portion 3141, relative to a graph data arrangement for a collaborative dataset that includes source data.

Access restricted manager 3186 is configured to manage access to one or more portions of descriptor repository portion 3141 or to one or more subsets of descriptor data datasets therein. In this example, subsets of descriptor data (e.g., dataset attributes, or metadata) of the various the datasets associated with collaborative dataset consolidation system 3110 may be made available to authorized users 3108a having credentials to access specific portions of data in descriptor repository portion 3141. Therefore, description data aggregator 3180 is configured to facilitate formation of a supra-dataset that is composed of many datasets, including ancillary data exclusive of source data. Thus, aggregation of "data-of-data," or metadata, provides a solid basis from which to analyze and determine, for examples, trends relating to numbers of types of queries, types of data being queried, classifications of data being queried, or any other data operation for any type of data managed or processed by collaborative data consolidation system 3110. Accordingly, access to the various descriptor data datasets 3143 and 3145a enables data practitioners to explore formation and uses of data, according to various examples.

Figure 32:
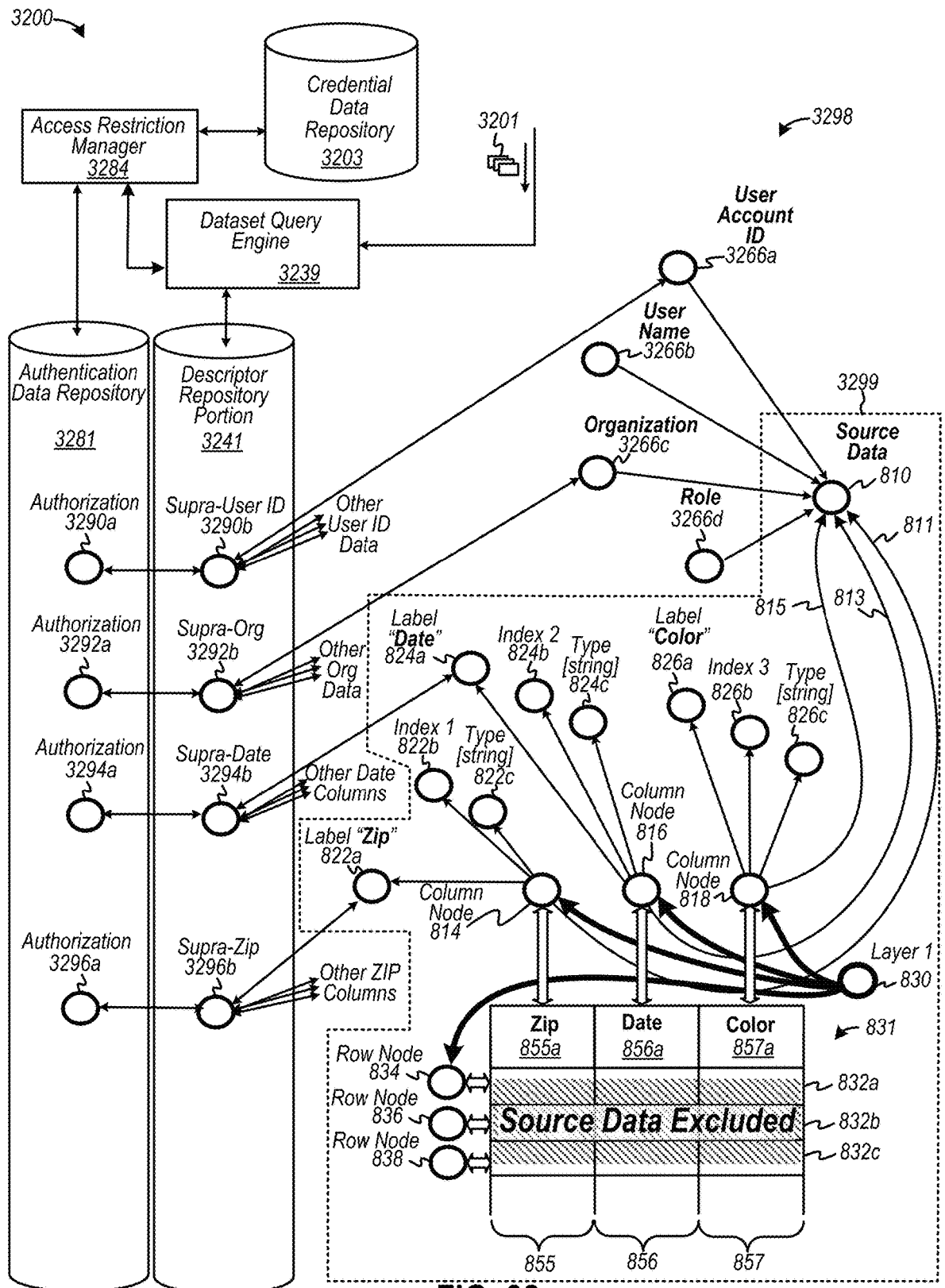
FIG. 32 is a diagram depicting restricted access to a graph data arrangement of descriptor data, according to some examples.

FIG. 32 is a diagram depicting restricted access to a graph data arrangement of descriptor data, according to some examples. Diagram 3200 depicts a dataset query engine 3239 configured to query a descriptor repository portion 3241 responsive to a query request 3201, and an access restriction manager 3284 configured to manage permissions for accessing data in a graph data arrangement 3298, as set forth in authentication data repository 3281. A credential data repository 3203 may store authentication data with which to provide authorization to access restriction manager 3284 to determine whether access ought to be granted to access one or more portions of graph data arrangement 3298. In this example, graph data arrangement 3298 depicts an example of a graph data arrangement that includes data graph portion 3299 and additional links to a user account identifier 3266a node, a username node 3266b, an organization (e.g., a corporation, a university, etc.) node 3266c, and a role (e.g., job title or position) node 3266d. Nodes 3266a to 3266d are shown to be linked to a node 810 representing source data (e.g., underlying data) of graph data arrangement 3299. Note that graph data arrangement 3299 may include data and links similar to that set forth in FIG. 8A, and, as such, similar reference numerals may apply. However, in this example, column headers or annotations 855a, 856a, and 857a respectively describe zip codes, dates, and colors. Also, tabular representation 831 is shown to "exclude" source data in cells relating to the rows and columns.

In some examples, access restriction manager 3284 may be configured to associate authorization data 3290a to 3296a (and states thereof) in authentication data repository 3281 to data representing supra-descriptor data, such as supra-user ID 3290b, supra-organization 3292b, supra-date 3294b, or supra-zip code 3296b, respectively. Data representing supra-user ID 3290b, as depicted as a node, may represent a global reference or descriptor data referencing (via links to) datasets including data representing user account identifiers ("ID"). For example, supra-user ID 3290b may be a node linked to various nodes, including node 3266a, which is associated with a user account ID in graph data arrangement 3298. Data representing supra-organization ID 3292b, as depicted as a node, may represent a global reference or descriptor data referencing (via links to) datasets including data representing an organization identifier ("ID"). For example, supra-organization ID 3292b may be a node linked to various other nodes, including node 3266c. Supra-date 3294b and supra-zip 3296b may represent global references or descriptor data referencing (via links to) datasets including data representing subsets of date data and subsets of ZIP Code data, respectively. As shown, a node 3294b representing supra-date data is shown to reference an annotation "date" 824a for column 856 and the data therein. Also, node 3296b representing supra-zip data is shown to reference an annotation "zip" 822a for column 855 and the data therein.

Access restriction manager 3284 may be configured to restrict access to one or more portions or one or more subsets of descriptor data datasets exclusive of source data. As shown, each of nodes 3290b, 3292b, 3294b, and 3296b are linked to authorization nodes 3290a, 3292a, 3294a, and 3296a. As such, each of nodes in authentication data repository 3281 may represent a state of authorized access to enable access to a corresponding node in descriptor repository portion 3241 and corresponding linked data. In one example, access restriction manager 3284 is configured to receive a request to access graph data arrangement 3298 from a computing device associated with a user identifier. Access restriction manager 3284 may be configured to determine permissions associated with the user identifier, and manage a state of authorized access to one or more nodes 3290b, 3292b, 3294b, and 3296b based on authorization nodes 3290a, 3292a, 3294a, and 3296a, respectively, each of which may specify an associated node in descriptor repository portion 3241 that is authorized for access.

Figure 33:
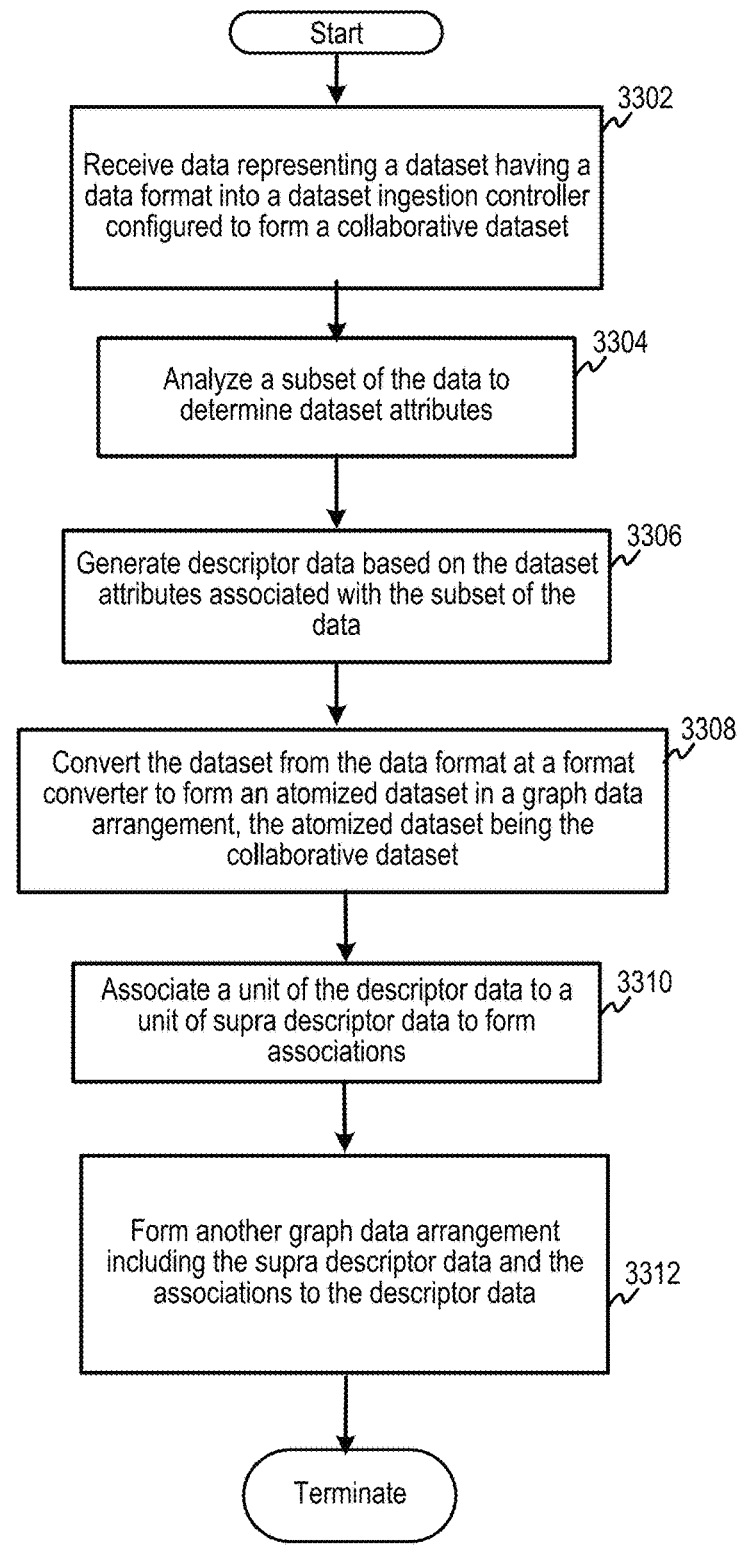
FIG. 33 is a diagram depicting a flow diagram as an example of forming a dataset including descriptor data, according to some embodiments.

FIG. 33 is a diagram depicting a flow diagram as an example of forming a dataset including descriptor data, according to some embodiments. Flow 3300 may begin at 3302, at which data representing a dataset having a data format is received into a dataset ingestion controller configured to form a collaborative dataset. At 3304 a subset of the data may be analyzed to determine dataset attributes. For example, an ingested dataset may be analyzed to determine ancillary data, or metadata, regarding the source data therein. At 3306, descriptor data based on dataset attributes may be generated, whereby the data attributes associated with a subset of data, for example, of an ingested dataset. At 3308, a dataset having a data format may be converted, for example, and a format converter may be configured to form an atomized dataset in a graph data arrangement. An atomized dataset may include atomized descriptor data (e.g., units of data describing attributes) and atomized source data (e.g., units of source data). At 3310, a unit of descriptor data for ingested source data may be associated with a corresponding unit of supra-descriptor data to form an association therebetween. Thus, the supra-descriptor data is enhanced to include additional units of descriptor data (e.g., attribute data) derived from an ingested dataset. At 3312, a graph data arrangement including supra-descriptor data and newly-formed associations (e.g., links) to descriptor data may be formed. Thus, a graph-based data arrangement directed to attribute data exclusive of source data may be enhanced to include descriptor data from ingested datasets. In some cases, descriptor data, attribute data, and metadata may be used interchangeably, at least in one example.

Figure 34:
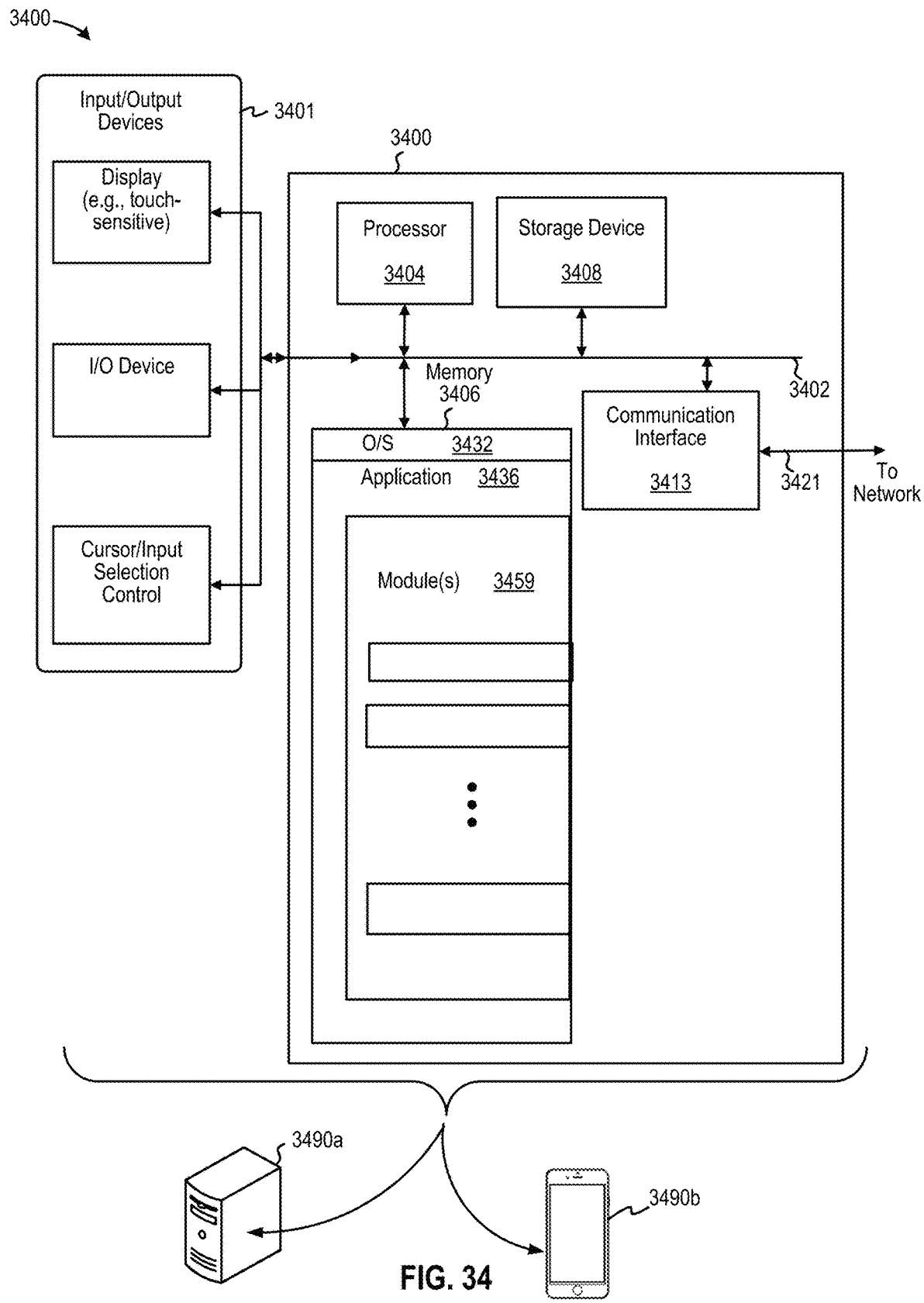
FIG. 34 illustrates examples of various computing platforms configured to provide various functionalities to components of a collaborative dataset consolidation system, according to various embodiments.

FIG. 34 illustrates examples of various computing platforms configured to provide various functionalities to components of a collaborative dataset consolidation system, according to various embodiments. In some examples, computing platform 3400 may be used to implement computer programs, applications, methods, processes, algorithms, or other software, as well as any hardware implementation thereof, to perform the above-described techniques.

In some cases, computing platform 3400 or any portion (e.g., any structural or functional portion) can be disposed in any device, such as a computing device 3490a, mobile computing device 3490b, and/or a processing circuit in association with initiating the formation of collaborative datasets, as well as analyzing and presenting summary characteristics for the datasets, via user interfaces and user interface elements, according to various examples described herein.

Computing platform 3400 includes a bus 3402 or other communication mechanism for communicating information, which interconnects subsystems and devices, such as processor 3404, system memory 3406 (e.g., RAM, etc.), storage device 3408 (e.g., ROM, etc.), an in-memory cache (which may be implemented in RAM 3406 or other portions of computing platform 3400), a communication interface 3413 (e.g., an Ethernet or wireless controller, a Bluetooth controller, NFC logic, etc.) to facilitate communications via a port on communication link 3421 to communicate, for example, with a computing device, including mobile computing and/or communication devices with processors, including database devices (e.g., storage devices configured to store atomized datasets, including, but not limited to triplestores, etc.). Processor 3404 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 3400 exchanges data representing inputs and outputs via input-and-output devices 3401, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 3401 may be implemented as, or otherwise substituted with, a user interface in a computing device associated with a user account identifier in accordance with the various examples described herein.

According to some examples, computing platform 3400 performs specific operations by processor 3404 executing one or more sequences of one or more instructions stored in system memory 3406, and computing platform 3400 can be implemented in a client-server arrangement, peer-to-peer arrangement, or as any mobile computing device, including smart phones and the like. Such instructions or data may be read into system memory 3406 from another computer readable medium, such as storage device 3408. In some examples, hard-wired circuitry may be used in place of or in combination with software instructions for implementation. Instructions may be embedded in software or firmware. The term "computer readable medium" refers to any tangible medium that participates in providing instructions to processor 3404 for execution. Such a medium may take many forms, including but not limited to, non-volatile media and volatile media. Non-volatile media includes, for example, optical or magnetic disks and the like. Volatile media includes dynamic memory, such as system memory 3406.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 3402 for transmitting a computer data signal.

In some examples, execution of the sequences of instructions may be performed by computing platform 3400. According to some examples, computing platform 3400 can be coupled by communication link 3421 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 3400 may transmit and receive messages, data, and instructions, including program code (e.g., application code) through communication link 3421 and communication interface 3413. Received program code may be executed by processor 3404 as it is received, and/or stored in memory 3406 or other non-volatile storage for later execution.

In the example shown, system memory 3406 can include various modules that include executable instructions to implement functionalities described herein. System memory 3406 may include an operating system ("O/S") 3432, as well as an application 3436 and/or logic module(s) 3459. In the example shown in FIG. 34, system memory 3406 may include any number of modules 3459, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 3459 of FIG. 34, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 3459 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 3459 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 3459 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided. Further, none of the above-described implementations are abstract, but rather contribute significantly to improvements to functionalities and the art of computing devices.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
receiving data representing a dataset having a data format into a dataset ingestion controller configured to form a collaborative dataset;
analyzing a subset of the data to determine dataset attributes;
generating descriptor data based on the dataset attributes associated with the subset of the data;
converting the dataset from the data format at a format converter to form an atomized dataset in a graph data arrangement, the atomized dataset being the collaborative dataset including atomized descriptor data and atomized source data, the atomized descriptor data being implemented as a first triple data point and the atomized source data being implemented as a second triple data point;
associating a unit of the descriptor data to a corresponding unit of supra-descriptor data to form associations;
forming another graph data arrangement including the supra-descriptor data and the associations to the descriptor data,
wherein the another graph data arrangement includes pointers to a plurality of atomized collaborative datasets.

2. The method of claim 1 wherein another graph data arrangement excludes the data of the dataset.

3. The method of claim 1 further comprising:
associating the descriptor data to a unit of data representing a state of authorized access.

4. The method of claim 3 further comprising:
receiving a request to access the another graph data arrangement from a computing device associated with a user identifier;
determining permissions associated with the user identifier; and
ensuring the state of authorized access for each unit of the descriptor data facilitates access by the computing device based on the permissions.

5. The method of claim 4 further comprising:
granting access to a portion of the another graph data arrangement.

6. The method of claim 1 further comprising:
revising data representing the supra-dataset attribute descriptor data in a supra-dataset descriptor data repository to link the descriptor data of the collaborative dataset to other descriptor data for other collaborative datasets.

7. The method of claim 1 further comprising:
receiving a request to query the supra-descriptor data; and
performing the query to return resultant data based on the supra-descriptor data.

8. The method of claim 1 wherein converting the dataset to form the atomized dataset in the graph data arrangement comprises:
generating referential data to link a dataset attribute to the subset of data.

9. The method of claim 8 wherein generating the referential data comprises:
linking an first addressable identifier of the dataset attribute to an second addressable identifier of the subset of data.

10. The method of claim 1 wherein associating the descriptor data to supra-dataset attribute descriptor data comprises:
linking descriptor data for a dataset attribute to descriptor data for a supra-dataset attribute.

11. The method of claim 1 wherein analyzing the data to determine dataset attributes comprises:
determining correlated attributes of dataset originating at multiple disparate data sources.

12. An apparatus comprising:
a memory including executable instructions; and
a processor, responsive to executing the instructions, is configured to:
receive data representing a dataset having a data format into a dataset ingestion controller configured to form a collaborative dataset;

analyze a subset of the data to determine dataset attributes;

generate descriptor data based on the dataset attributes associated with the subset of the data;

convert the dataset from the data format at a format converter to form an atomized dataset in a graph data arrangement, the atomized dataset being the collaborative dataset;

associate a unit of the descriptor data to a unit of supra descriptor data to form associations, wherein the unit of the descriptor data is implemented as a first triple data point and the unit of the supra descriptor data is implemented as a second triple data point; and form another graph data arrangement including the supra descriptor data and the associations to the descriptor data, wherein the another graph data arrangement includes pointers to a plurality of atomized collaborative datasets.

13. The apparatus of claim 12 wherein the another graph data arrangement excludes the data of the dataset.

14. The apparatus of claim 1 the processor further configured to:

associate the descriptor data to a unit of data representing a state of authorized access.

15. The apparatus of claim 14 wherein the processor is further configured to:

receive a request to access the another graph data arrangement from a computing device associate with a user identifier;

determine permissions associated with the user identifier; and ensure the state of authorized access for each unit of the descriptor data facilitates access by the computing device based on the permissions.

16. The apparatus of claim 15 the processor further configured to:

grant access to a portion of the another graph data arrangement.

* * * * *